US012566987B2

(12) United States Patent
You et al.

(10) Patent No.: US 12,566,987 B2
(45) Date of Patent: Mar. 3, 2026

(54) QUANTUM COMPUTING BASED DEEP LEARNING FOR DETECTION, DIAGNOSIS AND OTHER APPLICATIONS

(71) Applicant: Cornell University, Ithaca, NY (US)

(72) Inventors: Fengqi You, Ithaca, NY (US); Akshay Sukumar Ajagekar, Ithaca, NY (US)

(73) Assignee: Cornell University, Ithaca, NY (US)

( * ) Notice: Subject to any disclaimer, the term of this patent is extended or adjusted under 35 U.S.C. 154(b) by 755 days.

(21) Appl. No.: 17/796,154

(22) PCT Filed: Feb. 12, 2021

(86) PCT No.: PCT/US2021/017801
§ 371 (c)(1),
(2) Date: Jul. 28, 2022

(87) PCT Pub. No.: WO2021/257128
PCT Pub. Date: Dec. 23, 2021

(65) Prior Publication Data
US 2023/0094389 A1 Mar. 30, 2023

Related U.S. Application Data

(60) Provisional application No. 63/021,718, filed on May 8, 2020, provisional application No. 62/976,862, filed on Feb. 14, 2020.

(51) Int. Cl.
*G06N 10/20* (2022.01)
*G06N 3/0475* (2023.01)

(52) U.S. Cl.
CPC ........... *G06N 10/20* (2022.01); *G06N 3/0475* (2023.01)

(58) Field of Classification Search
CPC ...... G06N 10/20; G06N 20/20; G06N 3/0475; G06N 5/01
See application file for complete search history.

(56) References Cited

U.S. PATENT DOCUMENTS 10,339,466 B1 7/2019 Ding et al.
10,862,465 B1 12/2020 Cohen et al.
(Continued)

FOREIGN PATENT DOCUMENTS

CA 2681147 A1 10/2008
WO 2020072661 A1 4/2020

OTHER PUBLICATIONS

Adachi et al., "Application of Quantum Annealing to Training of Deep Neural Networks", Oct. 21, 2015, arXiv:1510.06356, pp. 1-18. (Year: 2015).*
(Continued)

*Primary Examiner* — Brent Johnston Hoover
(74) *Attorney, Agent, or Firm* — Ryan, Mason & Lewis, LLP

(57) ABSTRACT

A method in an illustrative embodiment comprises configuring a machine learning system with a multi-layer network architecture comprising at least one neural network and one or more additional network layers, training the neural network at least in part utilizing quantum sampling performed by a quantum computing device, obtaining data characterizing a monitored system, processing at least a portion of the obtained data through at least a portion of the multi-layer network architecture of the machine learning system to generate a prediction of at least one characteristic of the monitored system from the obtained data, and executing at least one automated action relating to the monitored system based at least in part on the generated prediction. The neural network may comprise, for example, a deep belief network (DBN) that includes at least first and second restricted Boltzmann machines (RBMs) of respective first and second different types, or at least one conditional restricted Boltzmann machine (CRBM).

22 Claims, 30 Drawing Sheets

(56) References Cited

U.S. PATENT DOCUMENTS

| | | | |
|---|---|---|---|
| 2003/0167098 A1 | 9/2003 | Walser et al. | |
| 2008/0065573 A1 | 3/2008 | Macready | |
| 2008/0270331 A1 | 10/2008 | Taylor et al. | |
| 2008/0313114 A1 | 12/2008 | Rose | |
| 2011/0238378 A1 | 9/2011 | Allen et al. | |
| 2013/0132001 A1 | 5/2013 | Yacout et al. | |
| 2015/0205759 A1 | 7/2015 | Israel et al. | |
| 2016/0224515 A1 | 8/2016 | Ronagh et al. | |
| 2017/0177544 A1 | 6/2017 | Zaribafiyan et al. | |
| 2017/0293542 A1* | 10/2017 | Xu | G06N 3/084 |
| 2017/0364796 A1 | 12/2017 | Wiebe et al. | |
| 2018/0308007 A1 | 10/2018 | Amin et al. | |
| 2019/0080255 A1 | 3/2019 | Allen et al. | |
| 2019/0121566 A1 | 4/2019 | Gold et al. | |
| 2019/0220733 A1 | 7/2019 | Fisher et al. | |
| 2020/0118025 A1 | 4/2020 | Romero et al. | |
| 2020/0175408 A1 | 6/2020 | Baughman et al. | |
| 2020/0210876 A1 | 7/2020 | Rolfe et al. | |
| 2020/0213276 A1* | 7/2020 | Luongo | G06F 18/2155 |
| 2020/0401916 A1 | 12/2020 | Rolfe et al. | |
| 2020/0410384 A1 | 12/2020 | Aspuru-Guzik et al. | |
| 2022/0414518 A1 | 12/2022 | You et al. | |

OTHER PUBLICATIONS

Yamashita et al., "To be Bernoulli or to be Gaussian, for a Restricted Boltzmann Machine", Dec. 6, 2014, 2014 22nd International Conference on Pattern Recognition, pp. 1520-1525. (Year: 2014).*
Kerenidis et al., "Quantum Algorithms for Deep Convolutional Neural Networks", Nov. 4, 2019, arXiv:1911.01117v1, pp. 1-40. (Year: 2019).*
International Search Report of PCT/US2021/017801, Feb. 2, 2022, 14 pages.
S. J. Nawaz et al., "Quantum Machine Learning for 6G Communication Networks: State-of-the-Art and Vision for the Future," IEEE Open Access, vol. 7, Apr. 17, 2019, pp. 46317-46350.
A. Ajagekar et al., "Quantum Computing Assisted Deep Learning for Fault Detection and Diagnosis in Industrial Process Systems," arXiv:2003.00264v2, Oct. 2, 2020, 35 pages.
C. Shang et al., "Data Analytics and Machine Learning for Smart Process Manufacturing: Recent Advances and Perspectives in the Big Data Era," Engineering, vol. 5, Oct. 18, 2019, pp. 1010-1016.
J. MacGregor et al., "Monitoring, Fault Diagnosis, Fault-Tolerant Control and Optimization: Data Driven Methods," Computers & Chemical Engineering, vol. 47, Dec. 20, 2012, 12 pages.
T. Kadowaki et al., "Quantum Annealing in the Transverse Ising Model," Physical Review E—Statistical Physics, Plasmas, Fluids, and Related Interdisciplinary Topics, arXiv:cond-mat/9804280v1, Apr. 25, 1998, 23 pages.
A. Ajagekar et al., "Quantum Computing for Energy Systems Optimization: Challenges and Opportunities," Energy, vol. 179, Jul. 15, 2019, 34 pages.
A. Perdomo-Ortiz et al., "Finding Low-energy Conformations of Lattice Protein Models by Quantum Annealing," Scientific Reports, vol. 2, No. 571, Aug. 13, 2012, 7 pages.
A. Ajagekar et al., "Quantum Computing based Hybrid Solution Strategies for Large-scale Discrete-Continuous Optimization Problems," Computers & Chemical Engineering, vol. 132, Jan. 2020, 50 pages.
D. Venturelli et al., "Job Shop Scheduling Solver Based on Quantum Annealing," 26th International Conference on Automated Planning and Scheduling, arXiv:1506.08479v2, Oct. 17, 2016, 15 pages.
T. T. Tran et al., "A Hybrid Quantum-Classical Approach to Solving Scheduling Problems," Proceedings of the Ninth International Symposium on Combinatorial Search, vol. 7, No. 1, Jul. 2016, pp. 98-106.
F. Neukart et al., "Traffic Flow Optimization Using a Quantum Annealer," Frontiers in ICT, vol. 4, No. 29, Dec. 20, 2017, 6 pages.

E. G. Rieffel et al., "A Case Study in Programming a Quantum Annealer for Hard Operational Planning Problems," Quantum Information Processing, arXiv:1407.2887v1, Jul. 14, 2014, 19 pages.
A. Lucas, "Ising Formulations of Many NP Problems," Frontiers in Physics, vol. 2, No. 5, Feb. 2014, 15 pages.
K. E. Hamilton et al., "Identifying the Minor Set Cover of Dense Connected Bipartite Graphs via Random Matching Edge Sets," Quantum Information Processing, arXiv:1612.07366v1, Dec. 21, 2016, 9 pages.
S. Okada et al., "Improving Solutions by Embedding Larger Subproblems in a D-Wave Quantum Annealer," Scientific Reports, vol. 9, No. 2098, Feb. 14, 2019, 10 pages.
D-Wave Systems Inc., "D-Wave System Documentation," https://docs.dwavesys.com/docs/latest/index.html, Accessed Mar. 21, 2022, 2 pages.
D. Venturelli et al., "Quantum Optimization of Fully Connected Spin Glasses," Physical Review X, vol. 5, Sep. 18, 2015, 8 pages.
N. Wiebe et al., "Quantum Algorithm for Data Fitting," Physical Review Letters, arXiv:1204.5242v2, Jul. 3, 2012, 6 pages.
S. Aaronson, "Quantum Machine Learning Algorithms: Read the Fine Print." Nature Physics, vol. 11, No. 4, Apr. 2015, 5 pages.
X. Gao et al., "An Efficient Quantum Algorithm for Generative Machine Learning," arXiv:1711.02038v1, Nov. 6, 2017, 22 pages.
S. H. Adachi et al., "Application of Quantum Annealing to Training of Deep Neural Networks," arXiv:1510.06356v1, Oct. 21, 2015, 18 pages.
I. Kerenidis et al., "Quantum Recommendation Systems," arXiv:1603.08675v3, Sep. 22, 2016, 22 pages.
L. H. Chiang et al., "Fault Diagnosis in Chemical Processes Using Fisher Discriminant Analysis, Discriminant Partial Least Squares, and Principal Component Analysis," Chemometrics and Intelligent Laboratory Systems, vol. 50 Jan. 2000, pp. 243-252.
S. Yin et al., "A Comparison Study of Basic Data-Driven Fault Diagnosis and Process Monitoring Methods on The Benchmark Tennessee Eastman Process," Journal of Process Control, vol. 22, Jul. 21, 2012, pp. 1567-1581.
V. Venkatasubramanian et al., "A Review of Process Fault Detection and Diagnosis Part III: Process History Based Methods," Computers & Chemical Engineering, Mar. 15, 2003, vol. 27, No. 3, pp. 327-346.
T. Sorsa et al., "Application of Artificial Neural Networks in-Process Fault-Diagnosis," IFAC Proceedings vols. vol. 24, No. 6, Sep. 1991, pp. 423-428.
V. Venkatasubramanian et al., "A Neural Network Methodology for Process Fault Diagnosis," AIChE Journal, vol. 35, No. 12, Dec. 1989, pp. 1993-2002.
F. Lv et al., "Fault Diagnosis Based on Deep Learning," American Control Conference, Jul. 6-8, 2016, pp. 6851-6856.
T. Albash et al., "Adiabatic Quantum Computing," Reviews of Modern Physics, arXiv:1611.04471v2, Feb. 2, 2018, 71 pages.
M. Kano et al., "A New Multivariate Statistical Process Monitoring Method Using Principal Component Analysis," Computers and Chemical Engineering, vol. 25, Aug. 15, 2001, pp. 1103-1113.
J. F. Macgregor et al., "Process Monitoring and Diagnosis by Multiblock PLS Methods," AIChE Journal, vol. 40, No. 5, May 1994 pp. 826-838.
J.-M. Lee et al., "Statistical Process Monitoring with Independent Component Analysis," Journal of Process Control, vol. 14, No. 5, Aug. 2004, pp. 467-485.
J. Roland et al., "Noise Resistance of Adiabatic Quantum Computation Using Random Matrix Theory," Physical Review A, arXiv:quant-ph/0409127v1, Sep. 20, 2004, 9 pages.
D. S. Wild et al., "Adiabatic Quantum Search in Open Systems," Physical Review Letters, arXiv:1606.01898v2, Oct. 7, 2016, 16 pages.
M. H. S. Amin et al., "Thermally Assisted Adiabatic Quantum Computation," Physical Review Letters, arXiv:cond-mat/0609332v3, Feb. 1, 2008, 4 pages.
P. Smolensky, "Information Processing in Dynamical Systems: Foundations of Harmony Theory," Chapter 6 in Parallel Distributed Processing: Explorations in the Microstructure of Cognition: Foundations, Feb. 1986, pp. 194-281.

(56) References Cited

OTHER PUBLICATIONS

G. E. Hinton et al., "Reducing the Dimensionality of Data with Neural Networks," Science, vol. 313, Jul. 28, 2006, pp. 504-507.

R. Salakhutdinov et al., "Restricted Boltzmann Machines for Collaborative Filtering," Proceedings of the 24th International Conference on Machine Learning, Jun. 20-24, 2007, 8 pages.

A.-R. Mohamed et al., "Phone Recognition Using Restricted Boltzmann Machines," IEEE International Conference on Acoustics, Speech and Signal Processing, Mar. 14-19, 2010, 4 pages.

A. Fischer et al., "Training Restricted Boltzmann Machines: An Introduction," Pattern Recognition, vol. 47, No. 1, Jan. 2014, 27 pages.

J. J. Hopfield, "Neural Networks and Physical Systems with Emergent Collective Computational Abilities," Proceedings of the National Academy of Sciences, vol. 79, Apr. 1982, pp. 2554-2558.

G. Hinton, "A Practical Guide to Training Restricted Boltzmann Machines," Version 1, Aug. 2, 2010, 21 pages.

G. E. Hinton, "Training Products of Experts by Minimizing Contrastive Divergence," Neural Computation, vol. 14, No. 8, Aug. 2002, pp. 1771-1800.

G. E. Hinton, "Deep Belief Networks," Scholarpedia, vol. 4, No. 5, May 2009, 4 pages.

M. Welling et al., "Exponential Family Harmoniums with an Application to Information Retrieval," Proceedings of the 17th International Conference on Neural Information Processing Systems, Dec. 2004, pp. 1481-1488.

G. E. Hinton et al., "A Fast Learning Algorithm for Deep Belief Nets," Neural Computation, vol. 18, No. 7, Jul. 2006, pp. 1527-1554.

A. Perdomo-Ortiz et al., "Determination and Correction of Persistent Biases in Quantum Annealers," arXiv:1503.05679v1, Mar. 19, 2015, 11 pages.

Z. Bian et al., "Solving SAT and MaxSAT with a Quantum Annealer: Foundations, Encodings, and Preliminary Results," arXiv:1811.02524v1, Nov. 6, 2018, 56 pages.

M. Benedetti et al., "Estimation of Effective Temperatures In Quantum Annealers for Sampling Applications: A Case Study with Possible Applications in Deep Learning," Physical Review A, arXiv:1510.07611v4, Aug. 9, 2006, 15 pages.

International Search Report of PCT/US2020/055019, Jan. 27, 2021, 12 pages.

M. Neshat et al., "Artificial Fish Swarm Algorithm: A Survey of the State-of-the-Art, Hybridization, Combinatorial and Indicative Applications," Artificial Intelligence Review, vol. 42, May 6, 2012, pp. 965-997.

M. Booth et al., "Partitioning Optimization Problems for Hybrid Classical/Quantum Execution," D-WaveSystems Inc., Technical Report, Jan. 9, 2017, 13 pages.

J. Gao et al., "Shale Gas Supply Chain Design and Operations toward Better Economic and Life Cycle Environmental Performance: MINLP Model and Global Optimization Algorithm," ACS Sustainable Chemistry & Engineering, vol. 3, May 31, 2015, pp. 1282-1291.

S. Koziel et al., "Computational Optimization, Methods and Algorithms," Studies in Computational Intelligence, vol. 356, Springer, 2011, 292 pages.

T. F. Edgar et al., "Optimization of Chemical Processes," 2nd Edition, McGraw-Hill Chemical Engineering Series, 2001, 666 pages.

L. T. Biegler et al., "Retrospective on Optimization," Computers and Chemical Engineering, vol. 28, Jul. 15, 2004, pp. 1169-1192.

I. E. Grossmann et al., "Part II: Future Perspective on Optimization," Computers and Chemical Engineering, vol. 28, Jul. 15, 2004, 54 pages.

C. A. Floudas et al., "A Review of Recent Advances in Global Optimization," Journal of Global Optimization, vol. 45, No. 3, Aug. 12, 2008, 36 pages.

S. Kirkpatrick et al., "Optimization by Simulated Annealing," Science, vol. 220, No. 4598, May 13, 1983, pp. 671-680.

C. Reeves, "Genetic Algorithms," Handbook of Metaheuristics, Chapter 3, 2010, pp. 55-82.

C. A. Mack, "Fifty Years of Moore's Law," IEEE Transactions of Semiconductor Manufacturing, vol. 24, No. 2, May 2011, pp. 202-207.

J. F. Benders, "Partitioning Procedures for Solving Mixed-variables Programming Problems," Numerische Mathematik, vol. 4, 1962, pp. 238-252.

G. Laporte, "The Vehicle Routing Problem: An Overview of Exact and Approximate Algorithms," European Journal of Operational Research, vol. 59, Jun. 25, 1992, pp. 345-358.

L. K. Grover, "Quantum Mechanics Helps in Searching for a Needle in a Haystack," Physical Review Letters, vol. 79, Jul. 14, 1997, pp. 325-328.

A. W. Harrow et al., "Quantum Algorithm for Linear Systems of Equations," Physical Review Letters, vol. 103, No. 15, Oct. 9, 2009, 4 pages.

A. Montanaro, "Quantum Algorithms: An Overview," Nature, vol. 2, No. 15023, Jan. 12, 2016, 8 pages.

J. Preskill, "Quantum Computing in the NISQ Era and Beyond," arXiv:1801.00862v3, Jul. 31, 2018, 20 pages.

B. Golden et al., "The Vehicle Routing Problem: Latest Advances and New Challenges," vol. 43, Springer Science & Business Media, 2008, 601 pages.

T. S. Humble et al., "Quantum Realism," Computer, vol. 52, Jun. 2019, pp. 13-17.

C. Coffrin et al., "Evaluating Ising Processing Units with Integer Programming," arXiv:1707.00355v2, Jun. 19, 2019, 19 pages.

J. K. Lenstra et al., "Complexity of Vehicle Routing and Scheduling Problems," Econometric Institute Report 7917/0, Mar. 4, 1980, 15 pages.

S. Feld et al., "A Hybrid Solution Method for the Capacitated Vehicle Routing Problem Using a Quantum Annealer," arXiv:1811.07403v2, Jun. 14, 2019, 19 pages.

Y. Wang et al., "16-qubit IBM Universal Quantum Computer Can Be Fully Entangled," Nature Partner Journals Quantum Information, vol. 4, Sep. 27, 2018, 6 pages.

E. Gibney, "D-Wave upgrade: How Scientists Are Using the World's Most Controversial Quantum Computer," Nature, vol. 541, No. 7638, Jan. 26, 2017, pp. 447-448.

L. Gyongyosi et al., "Quantum Circuit Design for Objective Function Maximization in Gate-Model Quantum Computers," arXiv:1803.02460v2, Sep. 3, 2019, 33 pages.

G. Laporte et al., "Classical and Modern Heuristics for the Vehicle Routing Problem," International Transactions in Operational Research, vol. 7, Sep. 1, 2000, pp. 285-300.

D. Aharonov et al., "Adiabatic Quantum Computation is Equivalent to Standard Quantum Computation," SIAM Journal of Computing, arXiv:quant-ph/0405098v2, Mar. 26, 2005, 30 pages.

E. Zahedinejad et al., "Combinatorial Optimization on Gate Model Quantum Computers: A Survey," arXiv:1708.05294v1, Aug. 16, 2017, 19 pages.

H. Johnston, "Quantum-computing Firm Opens the Box," https://physicsworld.com/a/quantum-computing-firm-opens-the-box/#:~:text=A%20small%20firm%20based%20in,part%20of%20its%20technology%20works. May 12, 2011, 4 pages.

P. Munari et al., "A Generalized Formulation for Vehicle Routing Problems," arXiv:1606.01935v2, Sep. 16, 2017, 19 pages.

C. Klymko et al., "Adiabatic Quantum Programming: Minor Embedding With Hard Faults," Quantum Information Processing, arXiv:1210.8395v2, Nov. 7, 2012, 12 pages.

P. Ji et al., "Quadratic Programming for the Vehicle Routing Problem," The 7th International Symposium on Operations Research and Its Applications, Nov. 2008, pp. 82-90.

T. D. Goodrich et al., "Optimizing Adiabatic Quantum Program Compilation using a Graph-Theoretic Framework," Quantum Information Processing, arXiv:1704.01996v2, Jul. 27, 2017, 26 pages.

T. Benoist et al., "Randomized Local Search for Real-life Inventory Routing," Transportation Science, Aug. 2011, 23 pages.

J. Cai et al., "A Practical Heuristic for Finding Graph Minors," arXiv:1406.2741v1, Jun. 10, 2014, 16 pages.

(56) References Cited

OTHER PUBLICATIONS

T. S. Humble et al., "An Integrated Development Environment for Adiabatic Quantum Programming," Computational Science & Discovery, arXiv:1309.3575v1, Sep. 13, 2013, 26 pages.

Z. Zhong et al., "Globally Convergent Exact and Inexact Parametric Algorithms for Solving Large-scale Mixed-integer Fractional Programs and Applications in Process Systems Engineering," Computers & Chemical Engineering, vol. 61, Feb. 11, 2014, pp. 90-101.

Y. Chu et al., "Integrated Scheduling and Dynamic Optimization of Complex Batch Processes with General Network Structure Using a Generalized Benders Decomposition Approach," Industrial & Engineering Chemistry Research, vol. 52, May 13, 2013, pp. 7867-7885.

V. S. Denchev et al., "What is the Computational Value of Finite-Range Tunneling?" Physical Review X, vol. 6, Aug. 1, 2016, 19 pages.

P. Toth et al., "An Overview of Vehicle Routing Problems," in The Vehicle Routing Problem, Society for Industrial and Applied Mathematics, 2002, pp. 1-26.

P. Toth et al., "Exact Solution of the Vehicle Routing Problem," in Fleet Management and Logistics, Springer, 1998, pp. 1-31.

D. Yue et al., "Global Optimization of Large-Scale Mixed-Integer Linear Fractional Programming Problems: A Reformulation-Linearization Method and Process Scheduling Applications," AIChE Journal, Nov. 2013, vol. 59, No. 11, pp. 4255-4272.

D. Applegate et al., "A Computational Study of the Job-Shop Scheduling Problem," ORSA Journal on Computing, vol. 3, No. 2, Spring 1991, pp. 149-156.

C. D. Maranas et al., "Global Minimum Potential Energy Conformations of Small Molecules," Journal of Global Optimization, vol. 4, March 1, 1004, pp. 135-170.

C. D. Maranas et al., "A Deterministic Global Optimization Approach for Molecular Structure Determination," The Journal of Chemical Physics, vol. 100, No. 2, Jan. 15, 1994, pp. 1247-1261.

T. Babej et al., "Coarse-grained Lattice Protein Folding on a Quantum Annealer," arXiv: 1811.00713v1, Nov. 2, 2018, 12 pages.

R. S. Maier et al., "A Discrete-continuous Algorithm for Molecular Energy Minimization," Proceedings of the 1992 ACM/IEEE Conference on Supercomputing, Dec. 1992, pp. 778-786.

I. Harjunkoski et al., "Decomposition Techniques for Multistage Scheduling Problems Using Mixed-integer and Constraint Programming Methods," Computers & Chemical Engineering, vol. 26, Apr. 2002, 29 pages.

V. Jain et al., "Algorithms for Hybrid MILP/CP Models for a Class of Optimization Problems," Informs Journal on Computing, Feb. 6, 2001, 36 pages.

G. Papaioannou et al., "The Evolution of Cell Formation Problem Methodologies Based on Recent Studies (1997-2008): Review and Directions for Future Research," European Journal of Operational Research, May 10, 2011, 39 pages.

D. Bienstock, "Computational Study of a Family of Mixed-integer Quadratic Programming Problems," Mathematical Programming, Aug. 1995, 21 pages.

J. C. Meza et al., "A Direct Search Method for the Molecular Conformation Problem," Sandia National Laboratories, SAND93-8233, Unlimited Release, May 1993, 14 pages.

A. T. Phillips et al., "A Quadratic Assignment Formulation of the Molecular-Conformation Problem," Journal of Global Optimization, vol. 4, Mar. 1994, 14 pages.

W. E. Hart et al., "Pyomo: Modeling and Solving Mathematical Programs in Python," Mathematical Programming Computation, vol. 3, pp. 219-260.

J. Blazewicz et al., "The Job Shop Scheduling Problem: Conventional and New Solution Techniques," European Journal of Operational Research, vol. 93, No. 1, Aug. 23, 1996, 33 pages.

M. Gendreau et al., "Tabu Search," Chapter 2 in Handbook of Metaheuristics, International Series in Operations Research & Management Science 146, Sep. 30, 2010, pp. 41-59.

G. E. Santoro et al., "Optimization Using Quantum Mechanics: Quantum Annealing Through Adiabatic Evolution," Journal of Physics A: Mathematical and General, vol. 39, Aug. 18, 2006, pp. R393-R433.

R. S. Judson et al., "Do Intelligent Configuration Search Techniques Outperform Random Search for Large Molecules?" International Journal of Quantum Chemistry, vol. 44, No. 2, Sep. 5, 1992, pp. 277-290.

T. F. Havel et al., "The Combinatorial Distance Geometry Method for the Calculation of Molecular Conformation. I. A New Approach to an Old Problem," Journal of Theoretical Biology, vol. 104, No. 3, Oct. 7, 1983 pp. 359-381.

G. Xue, "Molecular Conformation on the CM-5 By Parallel Two-Level Simulated Annealing," Journal of Global Optimization, vol. 4, No. 2, Mar. 1, 1994, pp. 187-208.

H. Yu et al., "Neural Network and Genetic Algorithm-Based Hybrid Approach to Expanded Job-Shop Scheduling," Computers & Industrial Engineering, vol. 39, No. 3-4, Apr. 1, 2001, pp. 337-356.

U. Wemmerlöv et al., "Procedures for the Part Family/Machine Group Identification Problem in Cellular Manufacturing," Journal of Operations Management, vol. 6, No. 2, Feb. 1986, pp. 125-147.

J.-S. Chen et al., "Stepwise Decomposition Approaches for Large Scale Cell Formation Problems," European Journal of Operational Research, vol. 113, Feb. 16, 1999, pp. 64-79.

R. Lazimy, "Mixed-Integer Quadratic Programming," Mathematical Programming, vol. 22, Dec. 1982, pp. 332-349.

N. C. Suresh et al., "Group Technology and Cellular Manufacturing: Updated Perspectives," Introduction of Group Technology and Cellular Manufacturing: A State-of-the-Art Synthesis of Research and Practice, Kluwer Academic, 1998, 14 pages.

N. M. D. Oliveira et al., "QUBO Formulation For The Contact Map Overlap Problem," International Journal of Quantum Information, vol. 16, No. 8, Nov. 22, 2018, 19 pages.

Y. Chu et al., "Integration of Production Scheduling and Dynamic Optimization for Multi-Product CSTRS: Generalized Benders Decomposition Coupled with Global Mixed-Integer Fractional Programming," Computers & Chemical Engineering, vol. 58, Nov. 11, 2013, pp. 315-333.

Y. Chu et al., "Integration of Scheduling and Dynamic Optimization of Batch Processes under Uncertainty: Two-Stage Stochastic Programming Approach and Enhanced Generalized Benders Decomposition Algorithm," Industrial & Engineering Chemistry Research, vol. 52, Oct. 18, 2013, pp. 16851-16869.

A.M. Gaouda et al., "Pattern Recognition Applications for Power System Disturbance Classification," IEEE Transactions on Power Delivery, vol. 17, No. 2, Jul. 2002, 8 pages.

J. G. Vlachogiannis et al., "A Comparative Study on Particle Swarm Optimization for Optimal Steady-State Performance of Power Systems," IEEE Transactions on Power Systems, vol. 21, No. 4, Nov. 2006, pp. 1718-1728.

Z.-L. Gaing, "Wavelet-Based Neural Network for Power Disturbance Recognition and Classification," IEEE Transactions on Power Delivery, vol. 19, No. 4, Oct. 2004, pp. 1560-1568.

M. A. Nielsen et al., "Quantum Computation and Quantum Information," Cambridge University Press, 2010, 704 pages.

V. Mnih et al., "Conditional Restricted Boltzmann Machines for Structured Output Prediction," The 27th Conference on Uncertainty in Artificial Intelligence, Jul. 2011, 9 pages.

R. Salakhutdinov, "Learning Deep Generative Models," Annual Review of Statistics and Its Application, vol. 2, No. 1, 2015, pp. 361-385.

P. K. Dash et al., "Application of Minimal Radial Basis Function Neural Network to Distance Protection," IEEE Transactions on Power Delivery, vol. 16, No. 1, Jan. 2001, pp. 68-74.

M. A. Carreira-Perpinan et al., "On Contrastive Divergence Learning," Proceedings of the Tenth International Workshop on Artificial Intelligence and Statistics, Jan. 2005, 8 pages.

L. Xu et al., "A Classification Approach for Power Distribution Systems Fault Cause Identification," IEEE Transactions on Power Systems, vol. 21, No. 1, Feb. 2006, pp. 53-60.

University of Washington, "Power Systems Test Case Archive," http://labs.ece.uw.edu/pstca/, Accessed Jul. 28, 2022, 2 pages.

(56) References Cited

OTHER PUBLICATIONS

J. Sun et al., "Automated Fault Detection Using Deep Belief Networks for the Quality Inspection of Electromotors," Technisches Messen, vol. 81, No. 5, Apr. 28, 2014, pp. 255-263.

S. R. Samantaray, "Decision Tree-Based Fault Zone Identification and Fault Classification in Flexible AC Transmissions-Based Transmission Line," IET Generation, Transmission & Distribution, vol. 3, No. 5, May 2009, pp. 425-436.

G. W. Taylor et al., "Factored Conditional Restricted Boltzmann Machines for Modeling Motion Style," Proceedings of the 26th International Conference on Machine Learning, Jun. 2009, 8 pages.

A. Ajagekar et al., "Quantum Computing based Hybrid Deep Learning for Fault Diagnosis in Electrical Power Systems," Supplementary Information, Applied Energy, Aug. 23, 2021, 31 pages.

P, Y. Moon et al., "A Logic Based Expert System (LBES) for Fault Diagnosis of Power System," IEEE Transactions on Power Systems, vol. 12, No. 1, Feb. 1997, pp. 363-369.

G. T. Heydt et al., "Applications of the Windowed FFT to Electric Power Quality Assessment," IEEE Transactions on Power Delivery, vol. 14, No. 4, Oct. 1999, pp. 1411-1416.

D. Chanda et al., "A Wavelet Multiresolution Analysis for Location of Faults on Transmission Lines," International Journal of Electrical Power & Energy Systems, vol. 25, No. 1, Jan. 2003, pp. 59-69.

P. K. Dash et al., "Power Quality Analysis Using S-Transform," IEEE Transactions on Power Delivery, vol. 18, No. 2, Apr. 2003, pp. 406-411.

R. Aggarwal et al., "Artificial Neural Networks In Power Systems: Part 2—Types Of Artificial Neural Networks," Power Engineering Journal, vol. 12, No. 1, Feb. 1998, pp. 41-47.

U. B. Parikh et al., "Fault Classification Technique for Series Compensated Transmission Line Using Support Vector Machine," International Journal of Electrical Power & Energy Systems, vol. 32, No. 6, Jul. 2010, pp. 629-636.

K. M. Silva et al., "Fault Detection and Classification in Transmission Lines Based on Wavelet Transform and ANN," IEEE Transactions on Power Delivery, vol. 21, No. 4, Oct. 2006, pp. 2058-2063.

P. Tamilselvan et al., "Failure Diagnosis Using Deep Belief Learning Based Health State Classification," Reliability Engineering & System Safety, vol. 115, Jul. 2013, pp. 124-135.

Y. Wang et al., "Using Conditional Restricted Boltzmann Machines for Spectral Envelope Modeling in Speech Bandwidth Extension," IEEE International Conference on Acoustics, Speech and Signal Processing (ICASSP), Mar. 2016, pp. 5930-5934.

W. A. Dos Santos Fonseca et al., "Simultaneous Fault Section Estimation and Protective Device Failure Detection Using Percentage Values of the Protective Devices Alarms," IEEE Transactions on Power Systems, vol. 28, No. 1, Feb. 2013, pp. 170-180.

A. Ajagekar et al., "Quantum Computing based Hybrid Deep Learning for Fault Diagnosis in Electrical Power Systems," Applied Energy, vol. 303, Dec. 2021, 11 pages.

A. Ajagekar et al., "Quantum Computing Assisted Deep Learning for Fault Detection and Diagnosis in Industrial Process Systems," Computers & Chemical Engineering, vol. 143, Dec. 5, 2020, 17 pages.

K. E. S. Pilario et al., "Mixed Kernel Canonical Variate Dissimilarity Analysis for Incipient Fault Monitoring in Nonlinear Dynamic Processes," Computers and Chemical Engineering, vol. 123, Apr. 6, 2019, 32 pages.

S. J. Reddi et al., "On the Convergence of Adam and Beyond," arXiv:1904.09237v1, Apr. 19, 2019, 23 pages.

J. J. Downs et al., "A Plant-Wide Industrial-Process Control Problem," Chemical Engineering, vol. 17, No. 3, Mar. 1993, pp. 245-255.

I. Sutskever et al., "On the Convergence Properties of Contrastive Divergence," Proceedings of the Thirteenth International Conference on Artificial Intelligence and Statistics, vol. 9, Mar. 31, 2010, pp. 789-795.

S. J. Qin, "Survey on Data-driven Industrial Process Monitoring and Diagnosis," Annual Reviews in Control, vol. 36, No. 2, Dec. 2012, pp. 220-234.

H. Wu et al., "Deep Convolutional Neural Network Model Based Chemical Process Fault Diagnosis," Computers and Chemical Engineering, vol. 115, Jul. 12, 2018, pp. 185-197.

A. K. Jain et al., "Dimensionality and Sample Size Considerations in Pattern Recognition Practice," Handbooks of Statistics, vol. 2, Chapter 39, 1982, pp. 835-855.

Z. Zhang et al., "A Deep Belief Network Based Fault Diagnosis Model for Complex Chemical Processes," Computers & Chemical Engineering, vol. 107, Dec. 2017, pp. 385-407.

M. J. Willis et al., "Artificial Neural Networks in Process Estimation and Control," Automatica, vol. 28, No. 6, Nov. 1992, pp. 1181-1187.

K. B. Lee et al., "A Convolutional Neural Network for Fault Classification and Diagnosis in Semiconductor Manufacturing Processes," IEEE Transactions on Semiconductor Manufacturing, vol. 30, No. 2, May 2017, pp. 135-142.

J.-M. Lee et al., "Fault Detection and Diagnosis Based on Modified Independent Component Analysis," AIChE Journal, vol. 52, No. 10, Oct. 2006, pp. 3501-3514.

Q. P. He et al., "A New Fault Diagnosis Method Using Fault Directions in Fisher Discriminant Analysis," AIChE Journal, vol. 51, No. 2, Feb. 2005, pp. 555-571.

J. C. Hoskins et al., "Fault Diagnosis in Complex Chemical Plants Using Artificial Neural Networks," AIChE Journal, vol. 37, No. 1, Jan. 1991, pp. 137-141.

L. Luo et al., "Hierarchical Monitoring of Industrial Processes for Fault Detection, Fault Grade Evaluation, and Fault Diagnosis," AIChE Journal, vol. 63, No. 7, Jul. 2017, pp. 2781-2795.

M. Kano et al., "Comparison of Multivariate Statistical Process Monitoring Methods with Applications to The Eastman Challenge Problem," Computers and Chemical Engineering, vol. 26, No. 2, Feb. 15, 2002, pp. 161-174.

A. Miao et al., "An Improved Fisher Discriminant Analysis Algorithm Based on Procrustes Analysis for Adaptive Fault Recognition," Measurement and Control, vol. 52, No. 7-8, Sep. 1, 2019, pp. 1063-1071.

L. H. Chiang et al., "Fault Detection and Diagnosis in Industrial Systems," Springer-Verlag London, 2001, 281 pages.

L. H. Chiang et al., "Fault Diagnosis Based on Fisher Discriminant Analysis and Support Vector Machines," Computers & Chemical Engineering, vol. 28, No. 8, Jul. 15, 2004, pp. 1389-1401.

E. Russell et al., "Data-driven Methods for Fault Detection and Diagnosis in Chemical Processes," Springer-Verlag London, 2000, 193 pages.

A. Perdomo-Ortiz et al., "Opportunities and Challenges for Quantum-Assisted Machine Learning in Near-Term Quantum Computers," arXiv:1708.09757v2, Mar. 19, 2018, 13 pages.

M. Benedetti et al., "Quantum-Assisted Learning of Hardware-Embedded Probabilistic Graphical Models," Physical Review X, vol. 7, Nov. 30, 2017, 17 pages.

Z. Gao et al., "A Survey of Fault Diagnosis and Fault-Tolerant Techniques Part I: Fault Diagnosis with Model-Based and Signal-Based Approaches," IEEE Transactions on Industrial Electronics, vol. 62, No. 6, Mar. 26, 2015, 12 pages.

J. Biamonte et al., "Quantum Machine Learning," arXiv:1611.09347v2, May 10, 2018, 24 pages.

P. W. Shor, "Algorithms for Quantum Computation: Discrete Logarithms and Factoring," Proceedings 35th Annual Symposium on Foundations of Computer Science, Nov. 1994, 11 pages.

K. Chen et al., "Fault Detection, Classification and Location for Transmission Lines and Distribution Systems: A Review on the Methods," High Voltage, vol. 1, No. 1, Apr. 2016, pp. 25-33.

* cited by examiner

*FIG. 2*

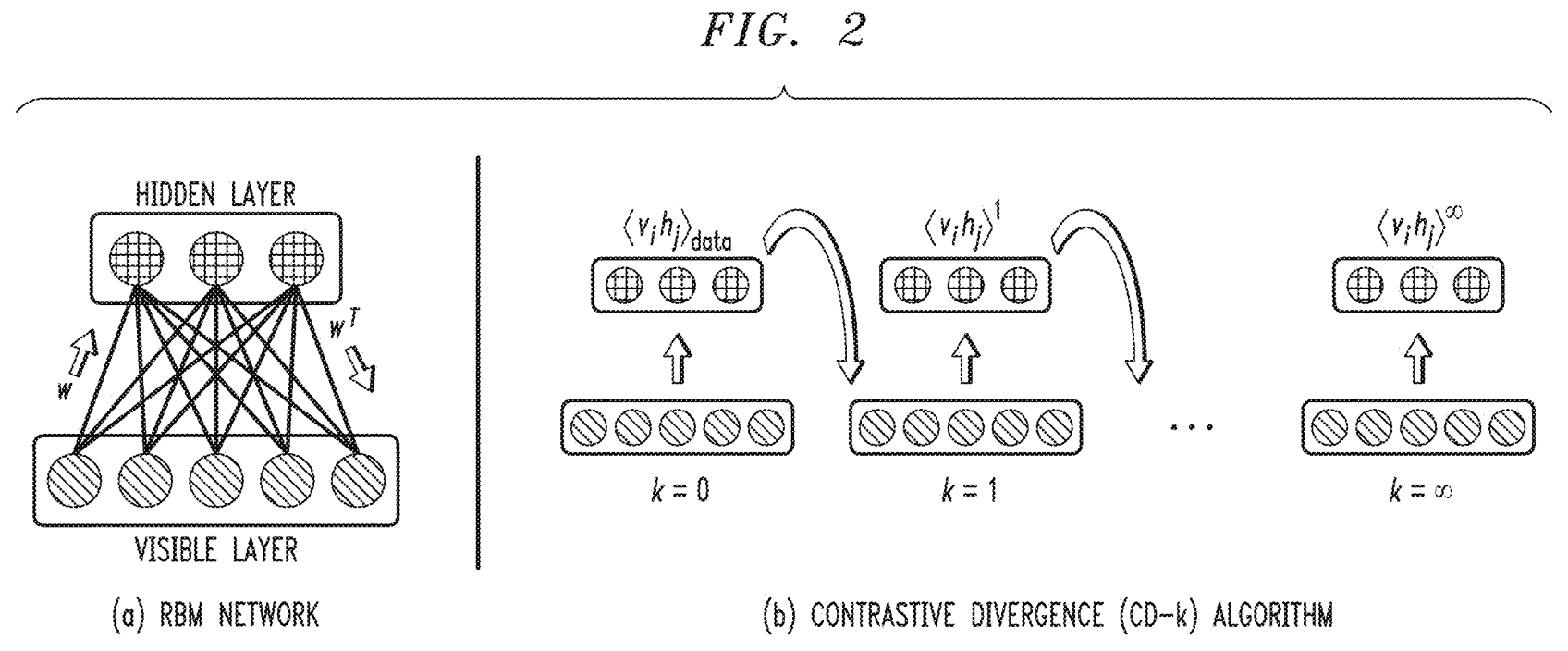

$\langle v_i h_j \rangle_{data}$ $k=0$ $\langle v_i h_j \rangle^1$ $k=1$ $\langle v_i h_j \rangle^\infty$ $k=\infty$ (b) CONTRASTIVE DIVERGENCE (CD-k) ALGORITHM

HIDDEN LAYER $W^T$ $W$

VISIBLE LAYER (a) RBM NETWORK

QUANTUM COMPUTING BASED DEEP LEARNING FOR DETECTION, DIAGNOSIS AND OTHER APPLICATIONS

RELATED APPLICATIONS

The present application claims priority to U.S. Provisional Patent Applications Ser. No. 62/976,862, filed Feb. 14, 2020, and Ser. No. 63/021,718, filed May 8, 2020, each entitled "Quantum Computing Assisted Deep Learning for Fault Detection and Diagnosis in Industrial Process Systems," and incorporated by reference herein in its entirety.

FIELD

The field relates generally to quantum computing and machine learning, and more particularly to utilization of quantum computing techniques in conjunction with implementation of machine learning in, for example, industrial process systems, electrical power systems and numerous other systems and applications.

BACKGROUND

Fault detection and diagnosis has been an active area of research in process systems engineering due to the growing demand for ensuring safe operations and preventing malfunctioning of industrial processes by detecting abnormal events. Furthermore, the advent of chemical plant accidents causing tremendous environmental and economic losses provide an extra incentive to develop process monitoring techniques that effectively assure process safety and product quality in complex chemical process systems. Data-driven approaches often termed as multivariate statistical process monitoring methods have attracted significant attention and have been widely applied to monitor industrial processes. Such methods rely on historical process data and rarely require detailed knowledge of the governing physical models, thus making them relatively easier to implement.

Quantum computing (QC) based applications have been gaining traction recently due to their unique capabilities with a significant portion of its presence perceived in the area of optimization with applications in energy systems, molecular design, process scheduling and operations, logistics optimization, and operational planning. The randomness and uncertainty inherently associated with QC operations, subject to internal magnetic fields, thermal fluctuations, and other noise sources, could be a hindrance to optimization applications. However, this non-ideal behavior can be exploited to develop efficient statistical machine learning techniques. QC-enhanced machine learning techniques have been proposed for data fitting, pattern recognition, generative machine learning, handwriting recognition, and quantum recommendation systems. These QC-based data-driven techniques can also be used in process control and monitoring for industrial processes. Quantum advantages offered by QC in terms of speed and method of operation could benefit fault monitoring in complex process systems where swift and precise fault detection is desired. However, the applicability of QC-based techniques is limited in these and other contexts due at least in part to the commercially available quantum computers facing several limitations like low number of quantum bits (also termed as qubits), limited connectivity, and lack of quantum memory.

The applicability and capacity of some basic classical data-driven methods in industrial process monitoring such as principal component analysis (PCA), partial least squares (PLS), independent component analysis (ICA), and fisher discriminant analysis (FDA) has been extensively studied. PCA and FDA are dimensionality reduction techniques that can be used to detect faults and discriminate among classes of data by describing the trends in historical data through lower dimensional representations. PLS and ICA are other powerful multivariate statistical tools widely used for fault detection and diagnosis. Monitoring techniques based on these methods face some limitations which directly affect their anomaly detection efficiency in complex process systems. PCA-based methods do not take into account the temporal correlations between process data and information between classes when determining the lower dimensional representations. FDA and ICA require control limits for fault detection devised from the assumption that the measurement signals follow a multivariate Gaussian distribution which may raise false alarms. It is often difficult to interpret the independent latent variables in PLS with a possible risk of overfitting. Several new variations of the basic data-driven monitoring methods have also been proposed and applied to fault detection and diagnosis in industrial processes. However, a large portion of these analytical approaches are limited to linear and some specific nonlinear models. Also, the inherent nonlinear nature of complex process systems render the use of such methods inefficient due to misclassification of large portion of the process data. Nonlinear classification techniques like support vector machine (SVM) improve the fault classification performance for highly overlapped data. However, the corresponding model complexity increases with the process data dimensions. The extent of complex nonlinearities and correlations present between the process data make it difficult for these classical data-driven methods to generalize to all complex process systems, restraining their applicability in practical situations.

The ability of artificial neural networks to approximate nonlinear relationships between the process data and process states by generalizing the knowledge can be successfully applied to diagnose faults in complex chemical process systems. However, in some instances their generalization to multiple faults is not always successful. Recently, deep learning has become a promising tool for smart fault diagnosis, and some deep learning models can achieve high classification accuracy. However, the increasing complexity of industrial process systems requires deeper and more complex neural network architectures to learn process data features, and such complex architectures can consume excessive amounts of computational resources. Feature extractor models can also be computationally intractable to train through classical training algorithms.

SUMMARY

Illustrative embodiments address and overcome the above-described challenges and other problems of conventional practice by providing techniques for quantum computing based deep learning in applications such as fault detection and diagnosis in industrial process systems, electrical power systems and other types of systems.

In one embodiment, a method comprises configuring a machine learning system with a multi-layer network architecture comprising at least one neural network and one or more additional network layers, training the neural network at least in part utilizing quantum sampling performed by a quantum computing device, obtaining data characterizing a monitored system, processing at least a portion of the obtained data through at least a portion of the multi-layer network architecture of the machine learning system to generate a prediction of at least one characteristic of the monitored system from the obtained data, and executing at least one automated action relating to the monitored system based at least in part on the generated prediction.

At least one of the one or more additional network layers in some embodiments comprises an additional network. The term "layer" as used herein is therefore intended to be broadly construed, and can encompass one or more networks and/or other types of layers. Illustrative examples of layers of a multi-layer network architecture as disclosed herein include a fully connected layer, a softmax layer, a rectified linear unit (ReLU) layer, a hyperbolic tangent (tanh) layer, a convolutional layer, a deconvolutional layer, a recurrent layer, and a sigmoid layer, or various combinations thereof. A wide variety of additional or alternative layers can be used in other embodiments.

The neural network in some embodiments more particularly comprises a deep belief network (DBN), with the DBN including, for example, at least first and second restricted Boltzmann machines (RBMs) of respective first and second different types, or at least one conditional restricted Boltzmann machine (CRBM).

It is to be appreciated that the foregoing arrangements are only examples, and numerous alternative arrangements are possible. For example, illustrative embodiments are not limited to use with RBMs or CRBMs, and can instead be implemented using other types of machine learning models, including models based at least in part on other types of networks, such as convolutional neural networks (CNNs), variational autoencoders (VAEs) or other autoencoders (AEs), generative adversarial networks (GANs), and/or many others, as well as combinations of such networks. Additionally or alternatively, a neural network in some embodiments can be implemented at least in part as a quantum neural network (QNN) having an underlying probability distribution of quantum states. The term "neural network" as used herein is therefore also intended to be broadly construed.

Some embodiments disclosed herein advantageously combine quantum sampling and quantum optimization for training DBNs or other types of neural networks, and can be implemented, for example, in any of a wide variety of deep learning applications.

These and other illustrative embodiments include but are not limited to systems, methods, apparatus, processing devices, integrated circuits, and computer program products comprising processor-readable storage media having software program code embodied therein.

BRIEF DESCRIPTION OF THE FIGURES

FIG. 2 illustrates a schematic network of an example RBM and a corresponding contrastive divergence algorithm.

FIG. 24 shows a model architecture used in the hybrid QC-CRBM fault diagnosis framework during the discriminative training phase.

DETAILED DESCRIPTION

Figure 1:
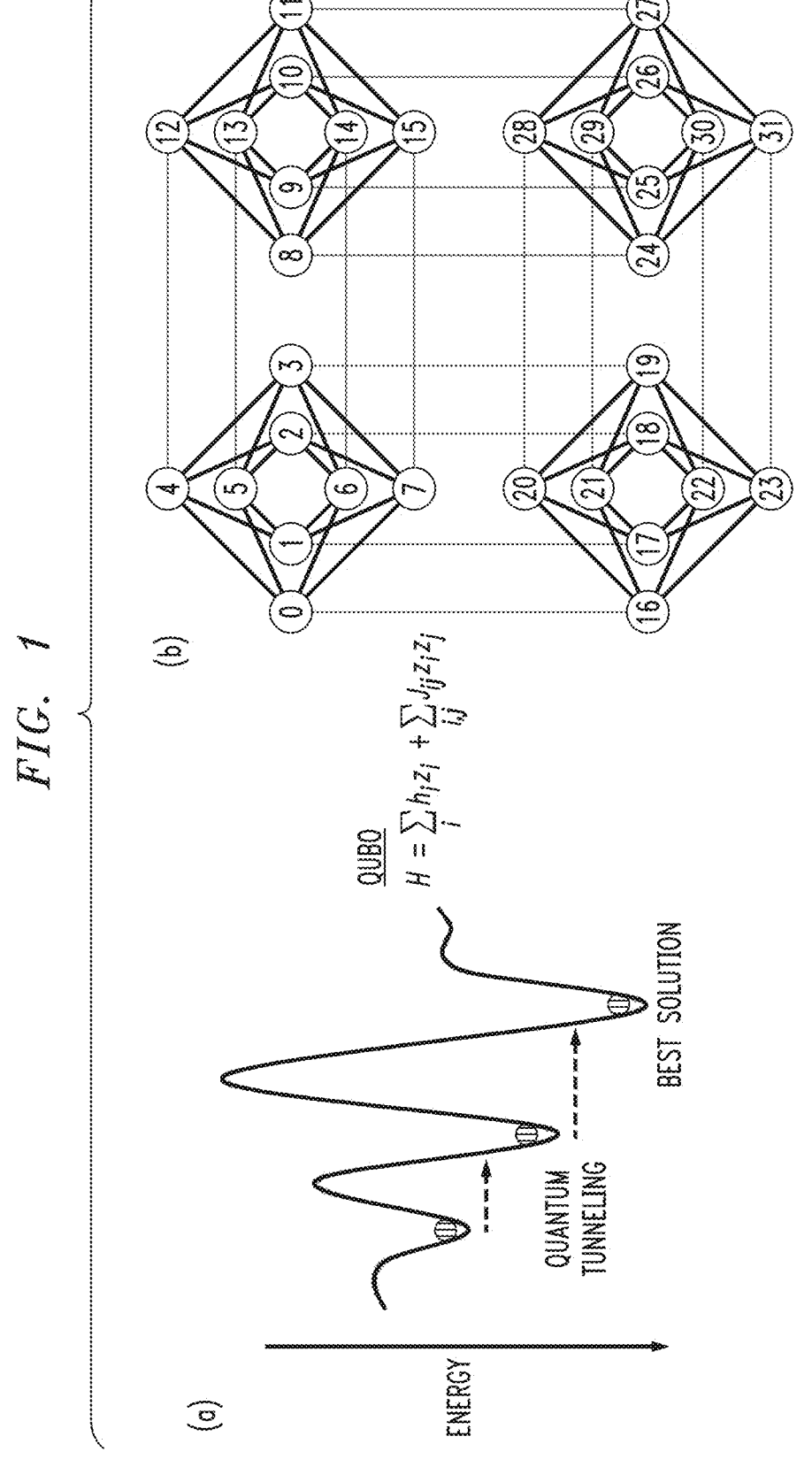
FIG. 1 illustrates an adiabatic quantum optimization and a Chimera architecture of an example quantum processing unit.

Illustrative embodiments can be implemented, for example, in the form of information processing systems or other types of systems comprising one or more processing platforms each having at least one computer, server or other processing device, configured to implement techniques for quantum computing based deep learning in applications such as fault detection and diagnosis. A number of examples of such systems will be described in detail herein. It should be understood, however, that embodiments of the invention are more generally applicable to a wide variety of other types of systems and associated arrangements of computers, servers or other processing devices or other components. Accordingly, terms such as "information processing system," "processing platform" and "processing device" as used herein are intended to be broadly construed. For example, an information processing system can be implemented as part of or otherwise in association with another type of system, such as an industrial process system or an electrical power system, for which quantum computing based deep learning functionality is provided as disclosed herein.

The present inventors recognized a need to develop high-performance deep learning models for fault detection and diagnosis capable of overcoming limitations of the current machine learning paradigms carried out on state-of-the-art classical computers. In achieving this end, the inventors identified several research challenges towards developing QC-based process monitoring techniques that utilize deep learning architectures and ensure effective fault detection and diagnosis performance. One such challenge is to design deep learning models and architectures that can extract faulty features from small datasets, since in most industrial applications large amounts of data for faulty operations are seldom available. A further challenge lies in training of such deep architectures as their complexity increases with the number of hyper-parameters. Faults generally should be detected and diagnosed as quickly as possible, due to safety concerns and other factors, and that implies that the training process should be performed with reasonable computational costs. Limitations of the classical training algorithms for deep learning models and QC devices also pose a computational challenge. The present inventors provide below and herein techniques and solutions to leverage both QC and classical computers to overcome such challenges.

Adiabatic Quantum Computing

An important architecture of quantum computing is the computational model of adiabatic quantum computing (AQC) that started out as an approach to solving optimization problems. AQC permits quantum tunneling to explore low-cost solutions and ultimately yields a global minimum. It also exhibits convergence to the optimal or ground state with larger probability than simulated annealing. AQC devices of the type described herein intrinsically realize quantum annealing algorithms to solve combinatorial optimization problems in accordance with the paradigm of adiabatic quantum optimization (AQO).

FIG. 1 shows aspects of an example AQC device used in some embodiments herein. AQO is an elegant approach that helps escape local minima and overcomes barriers by tunneling through them rather than stochastically overcoming them as shown at (a) on the left side of FIG. 1. AQO can also be referred to as the class of procedures for solving optimization problems using a quantum computer.

In AQC, the computation proceeds by moving from a low-energy eigenstate of the initial Hamiltonian to the ground state of the final Hamiltonian. A Hamiltonian mathematically describes the physical system in terms of its energies, and corresponds to the objective function of an optimization problem in the final Hamiltonian. The adiabatic optimization process evolves the quantum state towards a user-defined final problem Hamiltonian, while simultaneously reducing the influence of initial Hamiltonian in an adiabatic manner. Tunneling between various classical states or the eigenstates of the problem Hamiltonian is governed by the amplitude of the initial Hamiltonian. Decreasing this amplitude from a very large value to zero drives the system into the ground state of the problem Hamiltonian that corresponds to the optimal solution of the objective function.

In order to solve optimization problems with AQC, they need to be formulated as an Ising model or quadratic unconstrained binary optimization (QUBO) problems. Such QC devices that are designed to implement AQO are commercially made available by D-Wave systems. The quantum processing unit on D-Wave devices is represented as a lattice of qubits interconnected in a design known as Chimera graph. Shown at (b) on the right side of FIG. 1 is a subgraph of the Chimera lattice pattern that is typical of the D-Wave systems and their operation. The objective function represented as an Ising model or a QUBO problem is mapped to the qubits and couplers of the Chimera lattice. Mapping of variables to the qubits utilizes a process called minor embedding. Embedding is an important step since the Chimera lattice is not fully connected. The adiabatic optimization process follows after the mapping of the objective function onto the physical quantum processing unit that searches for low-energy solutions of the corresponding problem Hamiltonian. The embedding and annealing schedule dictate the probability of recovering global optimal solutions.

The behavior of AQC systems in the presence of noise highly influences its performance and has been a subject of interest among researchers. Generic results for the Hamiltonian-based algorithm perturbed by particular forms of noise have also been reported. Adiabatic computation generally requires that the gap between the excited states and the ground states is not too small, as adiabatic evolution can be particularly susceptible to noise under such a condition. It has also been shown that under certain conditions, thermal interactions with environment can improve the performance of AQC. Apart from thermal fluctuations, several internal and external factors contribute to the noise in quantum systems. Qubits in such devices can be affected by the electronic control components and material impurities, which give rise to the external and internal sources of noise, respectively. In the context of optimization, noisy qubits deviate the state of the system from a global optimal solution to sub-optimal solution state. However, from a machine learning perspective, such noisy behavior and measurement uncertainty in quantum systems can be exploited to approximate sample distributions that could be used to model the distribution of data, as will be explained in more detail below.

Restricted Boltzmann Machine

FIG. 2 shows aspects of an example RBM used in some embodiments herein. RBMs are interpreted as generative stochastic forms for artificial neural networks used to learn the underlying data distributions. In recent years, RBMs have been widely applied for pattern analysis and generation with applications in image generation, collaborative filtering for movie recommendations, phone recognition, and many more. As the name suggests, RBM is a restricted variant of Boltzmann machine that forms an undirected bipartite graph as shown at (a) on the left side of FIG. 2, between neurons from two groups commonly termed as visible and hidden units. A RBM network comprises m visible neurons of a visible layer and n hidden neurons of a hidden layer to represent the observable data and the dependencies between the observed variables, respectively. The hyper-parameters for this undirected bipartite graph are the weights and biases. For a pair including a visible unit $v_i$ and a hidden unit $h_j$, a real valued weight $w_{ij}$ is associated with the edge between them. Bias terms $b_i$ and $c_j$ are associated with the ith visible unit and jth hidden unit, respectively.

The energy function of a RBM for the joint configuration of binary or Bernoulli visible and hidden units $(v, h) \in \{0, 1\}^{m+n}$ is given by $E(v, h)$ as shown in Eq. (1). Due to the absence of connections between units of the same layer, the state of the hidden variables is independent of the state of the visible variables and vice versa. A probability is assigned by the network to each possible pair of visible and hidden units through the RBM energy function as shown in Eq. (2), where the normalization constant or the partition function Z is defined by summing over all possible pairs of visible and hidden vectors. This joint probability distribution is defined by a Gibbs or a Boltzmann distribution. Due to the conditional independence between the variables in the same layer, the conditional distributions factorize nicely and simple expressions for the marginal distributions of visible variables can be obtained. Eq. (3) gives the probability assigned to a visible vector v obtained by summing over all possible hidden vectors.

$$E(v, h) = -\sum_{i \in visible} b_i v_i - \sum_{j \in hidden} c_j h_j - \sum_{i,j} w_{ij} v_i h_j \tag{1}$$

$$p(v, h) = \frac{1}{Z}\exp(-E(v, h)), \; Z = \sum_{v', h'}\exp(-E(v', h')) \tag{2}$$

$$p(v) = \frac{1}{Z}\sum_h \exp(-E(v, h)) \tag{3}$$

Generative training deals with determining the weights and biases that maximize the likelihood or log-likelihood of the observed data. To maximize the probability $p(v)$ assigned to the training data vector v by the RBM, the weights and biases of the network are updated such that the energy of the training data vector is lowered, while simultaneously raising the energy of the other training data vectors. The gradients of the log-likelihood of the training data with respect to the hyper-parameters of the RBM can be calculated from Eq. (4). The gradients can be interpreted as the difference between the expectation values under the distributions of training data and the underlying model.

$$\frac{\partial \log p(v)}{\partial w_{ij}} = \langle v_j h_j \rangle_{dsta} - \langle v_i h_j \rangle_{model} \tag{4}$$

Learning rules to update the values of weights and biases can be derived from these log-likelihood gradients in order to maximize the log probability with stochastic gradient ascent. Eqs. (5), (6), and (7) describe the update rules where $\varepsilon$ is the learning rate and $\alpha$ is the momentum. The terms $\langle v_i h_j \rangle_{data}$, $\langle v_i \rangle_{data}$, $\langle h_j \rangle_{data}$ are the clamped expectation values with a fixed v and can be efficiently computed from training data using Eq. (8). This equation provides an unbiased sample of the clamped expectations where $\sigma(x)$ is the logistic sigmoid function defined by $\sigma(x)=1/(1+e^{-x})$. Eq. (9) also produces unbiased samples of visible states, give a hidden vector h.

$$w_{ij}^{t+1} = \alpha w_{ij}^t + \varepsilon(\langle v_i h_j \rangle_{data} - \langle v_i h_j \rangle_{model}) \tag{5}$$

$$b_i^{t+1} = \alpha b_i^t + \varepsilon(\langle v_i \rangle_{data} - \langle v_i \rangle_{model}) \tag{6}$$

$$c_j^{t+1} = \alpha c_j^t + \varepsilon(\langle h_j \rangle_{data} - \langle h_j \rangle_{model}) \tag{7}$$

$$P(h_j = 1 \mid v) = \sigma\left(c_j + \sum_{i \in v} w_{ij}, v_i\right) \tag{8}$$

$$P(v_i = 1 \mid h) = \sigma\left(b_i + \sum_{j \in h} w_{ij} h_j\right) \tag{9}$$

The model expectations $\langle v_i h_j \rangle_{model}$, $\langle v_i \rangle_{model}$, $\langle h_j \rangle_{model}$ are difficult to estimate. They can be computed by randomly initializing the visible states and performing Gibbs sampling for a long time. However, this can be computationally intractable as the number of visible and hidden units increases. Hinton proposed a faster learning algorithm called contrastive divergence (CD) learning that has become a standard way to train RBMs. Rather than approximating the model expectations by running a Markov chain until equilibrium is achieved, the k-step CD learning (CD-k) algorithm runs the Gibbs chain for only k steps to yield samples $\langle v_i h_j \rangle^k$, $\langle v_i \rangle^k$, $\langle h_j \rangle^k$ as shown at (b) on the right side of FIG. 2. This learning algorithm works well despite the k-step reconstruction of the training data crudely approximating the model expectations. Theoretically, as k→∞ the update rules converge to the true gradient. However, in practice the updates are computed using a single-step (k=1) reconstruction to achieve good enough performance.

Many significant applications use real-valued data for which the binary RBM would produce poor logistic representations. In such cases, a modified variation of the RBM can be used by replacing Bernoulli visible units with Gaussian visible units. The energy function then takes the form of Eq. (10), where $\sigma_i$ is the standard deviation of the Gaussian noise for the ith visible unit. CD-1 can be used to learn the variance of the noise, but it is much more complicated than the binary case. An easier alternative is to normalize each data component to have zero mean and unit variance, and then use noise-free models. The variance $\sigma^2$ would be unity in this case.

$$E(v, h) = -\sum_{i \in visible} \frac{(v_i - b_i)^2}{2\sigma_i^2} - \sum_{j \in hidden} c_j h_j - \sum_{i,j} \frac{v_i}{\sigma_i} h, w_{ij} \tag{10}$$

Deep architectures can be constructed by stacking layers of RBMs together, as disclosed herein. Such deep architectures are examples of what are more generally referred to herein as "deep belief networks" or DBNs, where in these particular examples each RBM sub-network's hidden layer serves as the visible layer for the following RBM layer. DBNs are trained in a greedy fashion by sequentially training each RBM layer. There have been many implementations and uses of DBNs in real-world applications due to their versatility and effective multiple-level feature extraction capabilities.

A DBN is considered an illustrative example of what is more generally referred to herein as a "neural network." The term "neural network" as used herein is therefore intended to be broadly construed, so as to encompass not only DBNs of the type disclosed herein, but also a wide variety of other types of machine learning networks, including, for example, CNNs, AEs/VAEs, GANs, and/or many others, as well as combinations of such networks. Additionally or alternatively, a neural network in some embodiments can be implemented at least in part as a QNN having an underlying probability distribution of quantum states. Such a QNN as the term is broadly used herein is intended to encompass any computational neural network model which is based at least in part on the principles of quantum mechanics. For example, in some QNN implementations, samples of an unknown underlying probability distribution illustratively correspond to different quantum states.

In some embodiments herein, we develop QC-based model and methods for fault detection and diagnosis of complex process systems that efficiently extract several levels of features for normal and faulty process operations using deep RBM-based architectures. For complex process systems with high number of process measurements, training the RBMs is computationally challenging and might also result in suboptimal hyper-parameters that further affect the classification accuracy of fault detection models. To this end, we train the RBM-based network in the QC-based deep learning model with a quantum assisted training algorithm to overcome such computational challenges. The model in some embodiments effectively detects faults in complex process systems by leveraging the superior feature extraction and deep learning techniques to facilitate proper discrimination between normal and faulty process states. Complexities such as nonlinearities between process variables and correlations between historical data can also be handled by this QC-based fault diagnosis model.

The applicability of this QC-based deep learning method is demonstrated through two case studies on statistical process monitoring of the closed-loop continuous stirred tank reactor (CSTR) and the Tennessee Eastman (TE) process, respectively. These two processes are commonly used in benchmarking applications to measure and compare the performance of the fault diagnosis models. The CSTR simulation deals with a first-order reaction carried out in a tank with seven process variables recorded at each step that has three types of simulated faults, while the TE process is a relatively large industrial chemical manufacturing process with 52 process variables and 20 faults. Computational challenges stemming from the large size of the RBM used for the case studies are effectively overcome by a QC-based training process as disclosed herein. The obtained computational results for detecting anomalies are compared against state-of-the-art data-driven models and deep fault detection models trained on classical computers.

Illustrative embodiments to be described herein provide a QC-based deep learning model for detection and diagnosis of faults in complex process systems. The feature extractor network in the QC-based fault diagnosis model is trained in some embodiments with training process that performs generative training assisted by quantum sampling. Case studies on example implementations using the above-noted CSTR and TE process are also described with comprehensive comparison against state-of-the-art fault detection methods using classical computers.

In the following description, specific details are included to provide a thorough understanding of various systems and methods constituting example QC-based deep learning methods for fault detection and diagnosis. These include the illustrative embodiments shown in FIGS. 3, 4 and 5.

Figure 3:
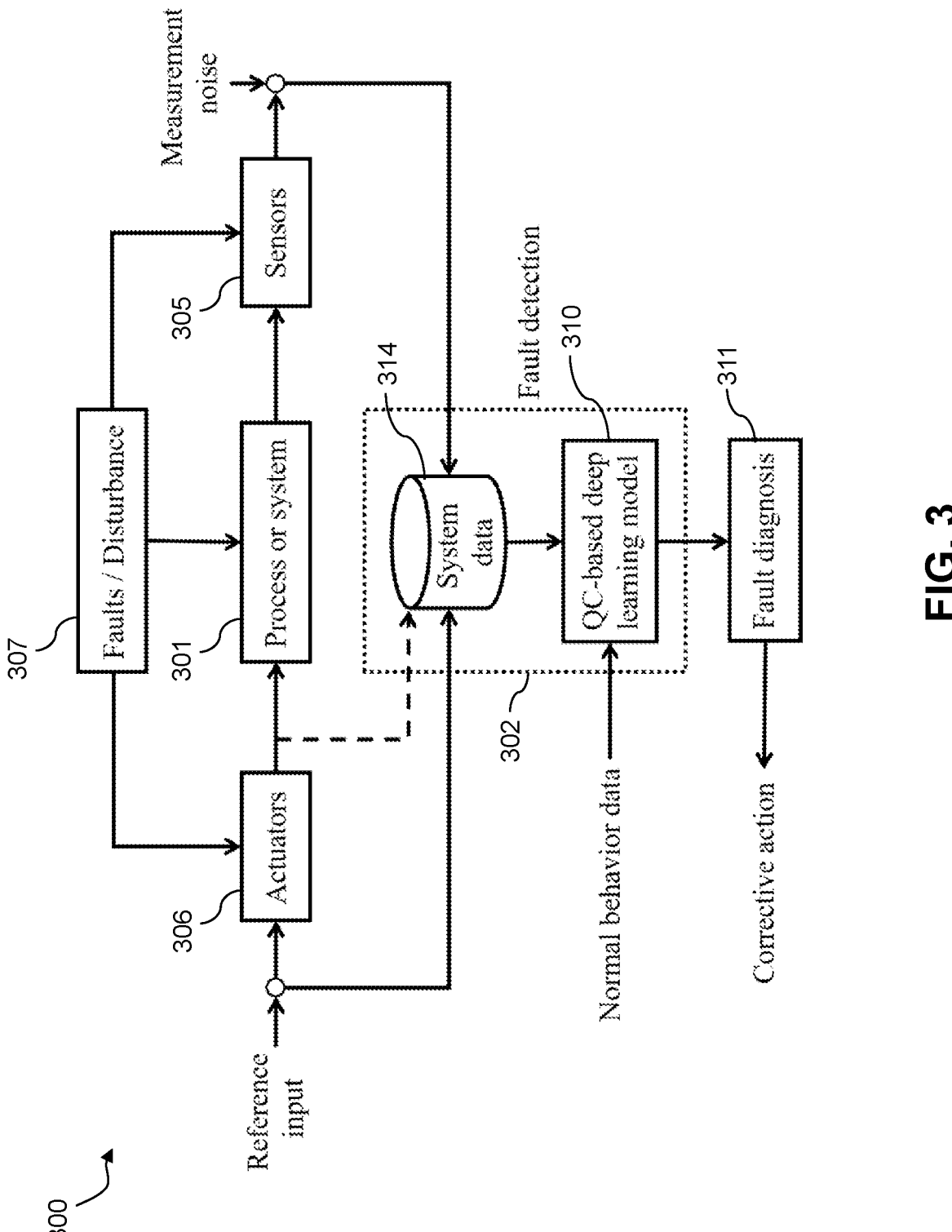
FIG. 3 is a diagram of an example information processing system comprising a monitored system and a QC-based deep learning model in an illustrative embodiment.

FIG. 3 shows an example information processing system 300 that includes a monitored process or system 301 and a processing platform 302. The monitored process or system 301 is monitored by sensors 305 and driven by actuators 306. Faults and/or other disturbances 307 impact the monitored process or system 301 as well as the sensors 305 and the actuators 306. The processing platform 302 comprises a QC-based deep learning model 310 of the type disclosed herein, which operates on system data 314 that can include, for example, reference inputs, actuator outputs, sensor outputs with associated measurement, as well as additional or alternative data. The QC-based deep learning model 310 is trained on at least normal behavior data and is utilized to perform fault detection and also supports fault diagnosis 311 that can be used to drive a corrective action, or other type of remedial action or automated action, as described elsewhere herein. The sensors 305 and actuators 306, although shown separately from the monitored process or system 301 in FIG. 3, can in other embodiments be considered part of the monitored system or process 301. Terms such as "monitored system" as used herein are therefore intended to be broadly construed. Accordingly, references to a monitored process herein should be understood to be broadly encompassed by a monitored system that performs that process. The monitored process or system 301 under consideration in the FIG. 3 embodiment can comprise a process or system in any of the following exemplary applications:

1. Fault detection and diagnosis of processes in oil and gas plants such as refineries, natural gas extraction, energy production, and gasification.

2. Detection and diagnosis of faults in machine components like electrical drives and actuators, bearings, pumps, power transmission systems, and power.

3. Chemical industry and process industry applications for detection of faults in equipment, controls, transportation, and sensors.

4. Detection and diagnosis of faults in electrical or electro-mechanical components in automobiles.

5. Fault detection and diagnosis in building automation systems to control heating, ventilation, air conditioning, and refrigeration for reducing building maintenance costs and energy consumption.

6. Diagnosis of large-scale expert systems for management of health services and intelligent help-desk systems in the healthcare sector.

7. Real-time water quality monitoring to detect and diagnose abnormalities in water quality parameters like water temperature, dissolved oxygen, and ammonia nitrogen.

8. Detecting and identifying faults in system components using the monitoring information in statistical process control systems.

9. Detection of faults in manufacturing systems and isolating their cause to avoid equipment failure or unsatisfactory product further resulting in production loss and dissatisfied customers.

The foregoing applications are only examples of systems that can be configured to incorporate or other utilize QC-based deep learning functionality as disclosed herein. It is to be appreciated that the disclosed techniques are more broadly applicable to numerous other types of systems and applications.

In some embodiments, actuators are responsible for moving and controlling mechanisms or systems using a control signal. Most electrical and semi-electric actuators are subject to faults induced due to abnormal system operation.

Sensors are devices that detect and respond to their physical environment and produce a measurable electrical signal. Such sensors can be automotive, chemical, electrical, acoustic, thermal, pressure, proximity, optical, and environmental, and are used consistently in all applications to record data. Unfortunately, such sensors are also susceptible to faults and may lead to task failure. Measurement noise can also be introduced in the sensors during the measurement process. The reference input data and the measured data obtained through the interactions of actuators, process or system considered, and sensors account for at least portions of the system data 314. This system data 314 is used to train the fault detection and diagnosis models along with the data associated with normal operation of the process or system 301. Based on the detection and diagnosis of faults, respective corrective actions can be taken to rectify the operation of the process or system 301.

Figure 4:
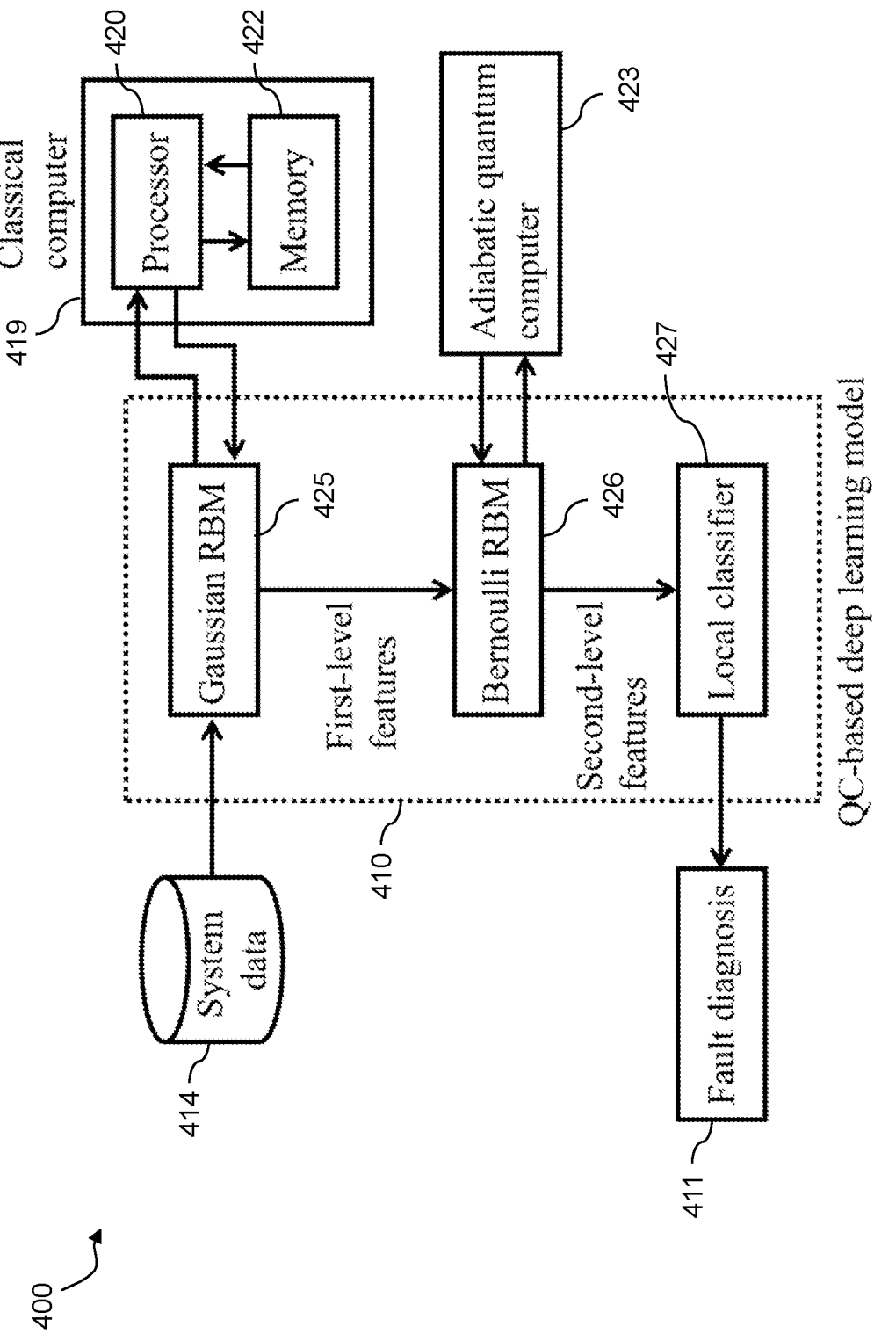
FIG. 4 is a diagram of an example of structural components comprising an exemplary QC-based deep learning model for fault detection and diagnosis in an illustrative embodiment.

FIG. 4 shows another illustrative embodiment of an information processing system 400 implementing a machine learning system 410 that includes a QC-based deep learning model for fault detection and diagnosis. The machine learning system 410 supports fault diagnosis 411 and is driven by system data 414. The information processing system 400 includes a classical computer 419 that comprises a processor 420 coupled to a memory 422, and further includes an adiabatic quantum computer (AQC) 423. The AQC 423 is an example of what is more generally referred to herein as a "quantum computing device," and other types of quantum computing devices can be used in other embodiments. In this embodiment, multiple RBMs form a DBN that is integrated into the example fault diagnosis model and is used to extract features at different levels. Different types of RBMs such as Gaussian RBM, Bernoulli RBM, and/or Gaussian-Bernoulli RBM can be used in a given QC-based deep learning model of the type disclosed herein, depending on factors such as type of process data.

In this particular embodiment, a Gaussian RBM 425 is trained with a training algorithm performed on the classical computer 419. The processor 420 and memory 422 on the classical computer 419 work together to perform this training. A Bernoulli RBM 426 is trained through the AQC 423. Due to lack of memory in the AQC 423, samples are drawn from the AQC 423 to train the Bernoulli RBM 426 using the corresponding RBM energy function. Multiple RBM layers can also be included in the DBN. The Gaussian RBM 425 extracts first-level features, and the Bernoulli RBM 426 extracts second-level features, also referred to herein as high-level abstractions. The high-level abstractions extracted through this network are used to train a local classifier 427 that can detect the state of process data, e.g., normal or faulty. High-level features or other abstractions can also be extracted from other generative models like VAEs and GANs. Outputs from the local classifier 427 can be further used to train a global classifier in order to perform fault identification in conjunction with fault diagnosis 411. In addition to the local and global neural network-based classifier, these classifiers can also be built using methods like multiclass logistic regression, support vector machine, decision trees, clustering, nearest neighbors, and random forests.

In the examples illustrated and described herein, a processor in a classic computing apparatus may execute one or more programmed instructions stored in the memory as illustrated and described in the examples herein, although other types and numbers of functions and/or other operations can be performed. The processor in the classic computing apparatus may include one or more central processing units and/or general purpose processors with one or more processing cores, for example.

A memory in the classic computing apparatus stores the programmed instructions and other data for one or more aspects of the present technology as described and illustrated herein, although some or all of the programmed instructions could be stored and executed elsewhere. A variety of different types of memory storage devices, such as flash, random access memory (RAM), read only memory (ROM), hard disk, solid state disk (SSD), or other computer readable medium which is read from and written to by a magnetic, optical, or other reading and writing system that is coupled to the processor, can be used for the memory.

The classic computing apparatus may include a communication interface that operatively couples and communicates between one or more of the illustrated examples of systems, devices, components, and/or elements, which are all coupled together by one or more of the communication networks, although other types and numbers of communication networks or systems with other types and numbers of connections and configurations to other devices and elements. By way of example only, the communication networks can use TCP/IP over Ethernet and industry-standard protocols, including NFS, CIFS, SOAP, XML, LDAP, SCSI, and SNMP, although other types and numbers of communication networks, can be used. The communication networks in this example may employ any suitable interface mechanisms and network communication technologies, including, for example, any local area network, any wide area network (e.g., Internet), teletraffic in any suitable form (e.g., voice, modem, and the like), Public Switched Telephone Network (PSTNs), Ethernet-based Packet Data Networks (PDNs), and any combinations thereof and the like.

In these examples, an adiabatic quantum computing apparatus is any device for computation that makes use of distinctively quantum mechanical phenomena, such as superposition and entanglement, to perform or otherwise execute instructions or other operations, although other types and/or numbers of quantum computers, quantum processing units or other quantum computing devices may be used.

Although exemplary network environments with a classical computing apparatus and an adiabatic quantum computing apparatus, along with other systems, devices, components, and/or other elements are described and illustrated herein, other types and numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for any one of the systems or devices in any example. Accordingly, principles and advantages of distributed processing, such as redundancy and replication also can be implemented, as desired, to increase the robustness and performance of the devices, apparatuses, and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, 3G, 4G, or 5G traffic networks, Public Switched Telephone Network (PSTNs), Packet Data Networks (PDNs), the Internet, intranets, and combinations thereof.

The examples also may be embodied as a non-transitory computer readable medium having instructions stored thereon for one or more aspects of the present technology as described and illustrated by way of the examples herein, as described herein, which when executed by the processor of the classic computing apparatus and/or the quantum computing apparatus, cause the processor of the classic computing apparatus and/or the quantum computing apparatus to carry out steps to implement the methods of this technology as described and illustrated with the examples herein. Illustrations of examples of different instructions and/or other operations performed by the classic computing apparatus and the adiabatic quantum computing apparatus are illustrated and described elsewhere herein.

Figure 5:
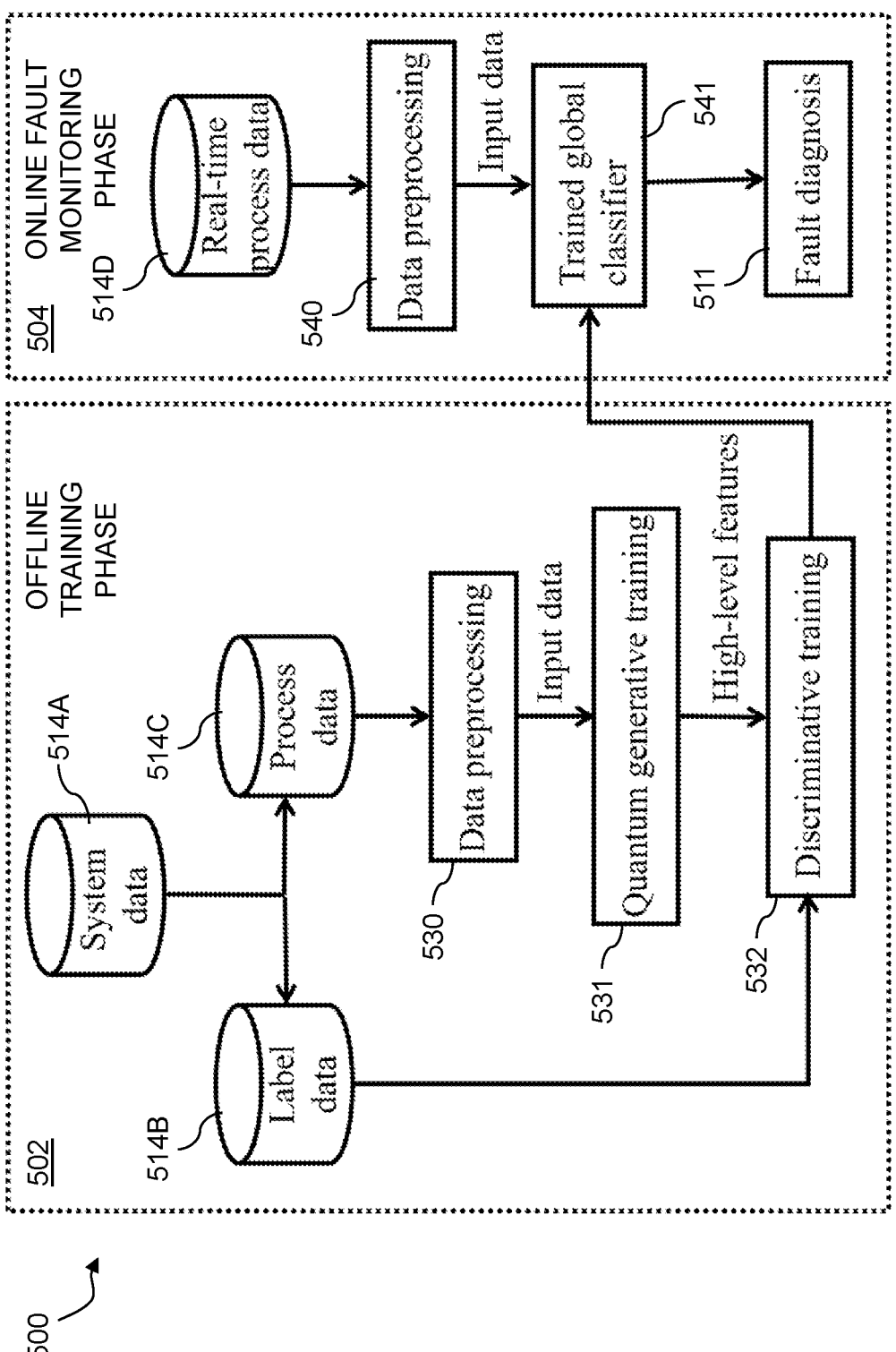
FIG. 5 is a diagram of an exemplary system and method for fault detection and diagnosis in an illustrative embodiment.

FIG. 5 shows an information processing system 500 with QC-based deep learning functionality that illustratively comprises an offline training phase 502 and an online fault monitoring phase 504. The offline training phase 502 utilizes system data 514A, label data 514B and process data 514C. The online fault monitoring phase 504 utilizes real-time process data 514D. The different types of data 514A-514D in this example are illustratively stored in one or more databases of the information processing system 500.

Portions of the obtained system data 514A without labels includes the process data 514C. The process data 514C is subject to data preprocessing 530 to generate input data for quantum generative training 531. The data preprocessing 530 can include operations such as normalization and dynamic data creation. The resulting unlabeled input data is used for generative training achieved through a classical computer and quantum sampling performed on an AQC, as previously described in conjunction with FIG. 4. The high-level abstractions generated are used as input to perform discriminative training 532 of local and global classifiers. The discriminative training 532 is supervised in nature and uses the label data 514B, which comprises original labels from the system data 514A. These operations are part of the offline training phase 502 of the fault detection and diagnosis framework as shown in FIG. 5.

The online fault monitoring phase 504 of the framework shown in FIG. 5 performs fault monitoring of the process or system in real-time. The real-time process data 514D recorded through sensors is subject to data preprocessing 540 and then passed through the pre-trained global classifier 541 for fault diagnosis 511. Results obtained through this fault detection and diagnosis framework clearly discriminate between the normal or faulty process states.

Quantum Computing-Based Fault Diagnosis Model

In some embodiments, a QC-based deep learning model utilizes a two-step strategy, namely quantum generative training followed by supervised discriminative training using class labels. The first step involves using two DBN sub-networks to extract features from historical process data. Features at different levels are extracted for a normal state along with each of one or more faulty states through the quantum generative training process. The DBN sub-networks, namely DBN-N and DBN-F, are trained separately using normal and faulty training datasets, respectively. It is important to note that for each individual fault state, the DBN-F sub-network is trained using the corresponding faulty dataset. The amount of training data required to achieve maximum performance depends both on the model complexity and the complexity of training algorithm. Ten times more data samples than the number of input dimensions can be used as a statistical heuristic. The analysis of dataset size versus model skill is termed as learning curve and can also be conducted to obtain bounds on the size of training dataset for a required precision of performance measurement. The input to the fault diagnosis model is a data vector with d dimensions that correspond to each process variable. In order to classify the state of this data vector, outputs from the pre-trained sub-networks DBN-N and DBN-F that serve as k dimensional approximations of the input data, are combined together.

The second step uses the combined approximate 2k dimensional vector. It is passed on to the local classification sub-network that predicts the state of the original input data vector. The local classification deep neural network based architecture yields the probabilities of two possible states, normal and faulty. The local classifier follows a supervised discriminative learning strategy that uses class labels as an extra output layer.

Figure 6:
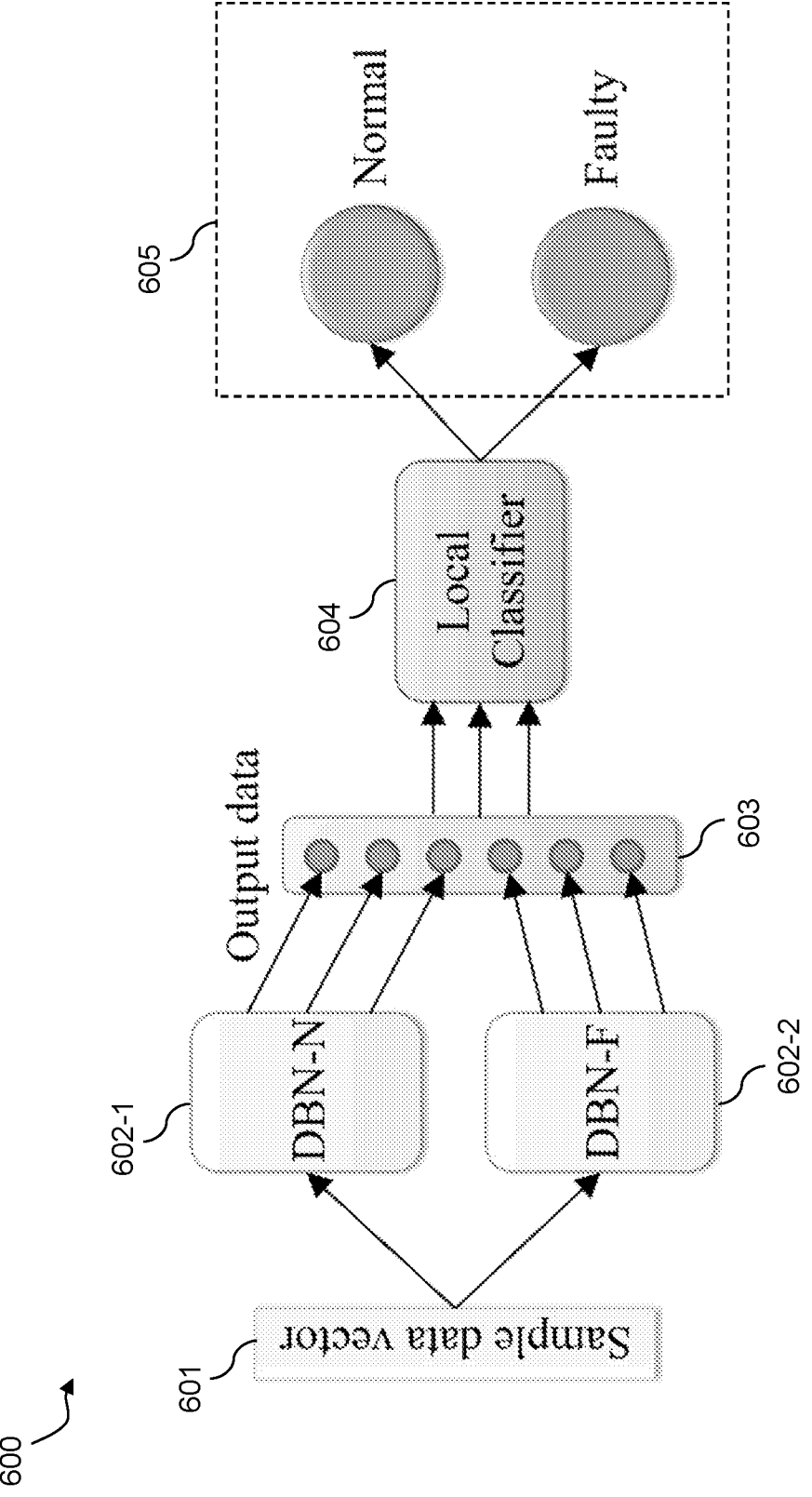
FIG. 6 is a diagram of an exemplary repeating sub-network in an exemplary QC-based fault diagnosis model that uses DBNs and a local classifier to predict the state of input data samples.

FIG. 6 shows an information processing system 600 with QC-based deep learning functionality that implements an example QC-based fault diagnosis model of the type described above. In the information processing system 600, a sample data vector 601 is applied as input to first and second DBNs 602-1 and 602-2 operating in parallel with one another and implementing the previously-mentioned DBN-N and DBN-F. Since the performance of DBN-based networks is known to be sub-optimal due to the presence of several local minima, generative training helps locating a desired local neighborhood near a good optimum while discriminative training further refines the optimum by fine-tuning the model parameters. Output data 603 from the first and second DBNs 602-1 and 602-2 is applied to a local classifier 604 that identifies an output state 605 as either normal or faulty.

Although first and second DBNs 602-1 and 602-2 are configured in this embodiment to operate in parallel with one another, other arrangements are possible. For example, more than two DBNs may be configured to operate in parallel with one another in other embodiments, or at first and second DBNs can be arranged in other embodiments in a sequential configuration. Various combinations of such parallel and/or sequential configurations can also be used. Accordingly, a given multi-level network architecture of a machine learning system in illustrative embodiments can include two or more parallel DBNs followed by one or more additional layers; multiple serial DBNs followed by one or more additional layers; a combination of two or more parallel DBNs and at least one serial DBN followed by one or more additional layers; and numerous other machine learning architectures. The term "multi-layer network architecture" as used herein is therefore intended to be broadly construed, so as to encompass these and a wide variety of other machine learning arrangements.

Quantum Generative Training

Figure 7:
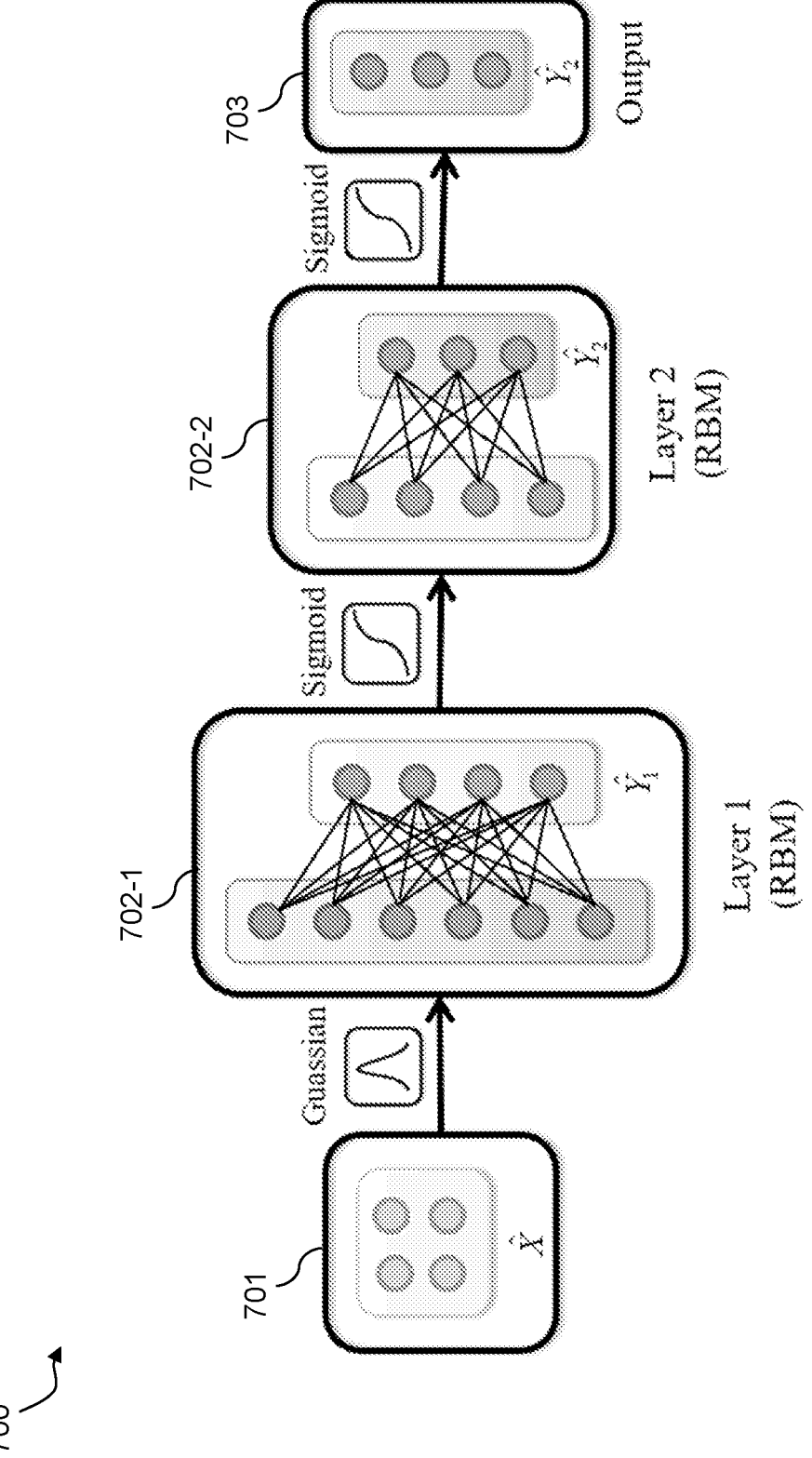
FIG. 7 is a diagram of an exemplary DBN architecture used in a repeating sub-network of a QC-based fault diagnosis model that produces a high level abstraction of the input data.

FIG. 7 shows an example of a DBN sub-network 700 that includes two different RBMs of two different types. As mentioned previously, the two DBN sub-networks DBN-N and DBN-F extract the underlying features for normal and faulty process states through the quantum generative training process. Each DBN sub-network illustratively comprises two RBMs that are arranged in the manner shown in FIG. 7 and that are trained sequentially. In a given such DBN sub-network 700 of FIG. 7, input 701 comprising an input data vector $\hat{X}$ is processed by a first RBM layer 702-1 to generate a vector $\hat{Y}_1$, which is illustratively a binary vector. The vector $\hat{Y}_1$ is processed by a second RBM layer 702-2 to generate output 703 comprising a vector $\hat{Y}_2$. More detailed examples of such vectors are provided in the description below, but it is to be appreciated that alternative vector types and configurations can be used. Also, a "sub-network" as that term is used herein is considered an example of a type of network in a multi-layer network architecture of a machine learning system.

The RBM in illustrative embodiments is extended to handle continuous valued inputs as most complex process systems provide continuous real-valued data. Therefore, the first RBM layer 702-1 uses d Gaussian visible units with m Bernoulli or binary-valued hidden units. Input to this layer more particularly comprises a historical process data vector $\hat{X}_{n \times d}$ with n samples and d process data dimensions. The model parameters for this RBM layer 702-1 are denoted as $W_g$, $B_b$, and $C_g$. $W_g \in \mathbb{R}^{d \times m}$ is the connection weights matrix between the visible and hidden nodes of the RBM, while $B_g \in \mathbb{R}^d$ and $C_g \in \mathbb{R}^m$ are the visible and hidden bias vectors, respectively. This RBM layer 702-1 is trained by the CD-1 algorithm with an appropriate learning rate that prevents the RBM from under-fitting or over-fitting the historical data. The weights and biases for this layer are updated such that the reconstruction loss between the input data vector $\hat{x}$ and the reconstructed data vector $\hat{X}_r$ is minimized. The output from the first RBM layer 702-1, $\hat{Y}_1 \in \{0, 1\}^{n \times m}$, is generated by multiplying the input data vector with the weights matrix and adding the corresponding hidden biases followed by a sigmoid activation function operation given in Eq. (11).

$$\hat{Y}_1 = \sigma(\hat{X} \cdot W_g + C_g) \tag{11}$$

Following the first RBM layer 702-1, the second RBM layer 702-2 in the DBN 700 extracts higher level features from the process data. Deep network architectures are generally preferred over shallow networks, but increasing model complexity requires larger amounts of training data to achieve optimum model skill. Also, increasing the number of layers introduces size constraints on the following layers and might limit the model performance. Computational experiments conducted with one RBM layer yield a lower performance than relatively deeper architectures. Therefore, two RBM layers 702-1 and 702-2 are used in each DBN sub-network 700, although it is to be appreciated that different numbers and types of layers can be used in other embodiments, depending on the performance needs of a given implementation.

Binary vector $\hat{Y}_1$ obtained from the first RBM layer 702-1 serves as input to the second RBM layer 702-2. Therefore, the visible and hidden units of the second RBM are modeled as Bernoulli units. The weights matrix $W_b \in \mathbb{R}^{m \times k}$, visible bias $B_b \in \mathbb{R}^m$, and hidden bias $C_b \in \mathbb{R}^k$ form the model parameters for this layer that need to be optimized. The update rules for these model parameters involve the computation of model expectations $\langle v_i h_j \rangle_{model}$, $\langle v_i \rangle_{model}$, and $\langle h_j \rangle_{model}$. Since the CD algorithm approximates the gradient for the update rules with a larger variance that might not always lead to the maximum likelihood estimate of the model parameters, the model expectations are estimated using quantum sampling implemented through a quantum computer.

The AQC devices are explicitly built for optimization purposes by determining the ground state of the problem Hamiltonian. However, there has been experimental evidence suggesting that under certain conditions such devices sample approximately from a Boltzmann distribution at an effective temperature. The final states of the qubits are effectively described by a Boltzmann distribution when the strengths of the fields and couplings on the device are sufficiently small. Due to the presence of non-ideal interactions between the qubits and the environment, the AQC device can be used as a sampling engine. A natural resemblance exists between the problem Hamiltonian taking the form of a QUBO problem and the energy function of the RBM with Bernoulli units. Quantum sampling exploits this by embedding the RBM energy function onto the AQC device. The distribution of the excited states of the qubits can then be modeled as a Boltzmann distribution given in Eq. (12). An unknown scale parameter $\beta_{eff}$ dictates the effective temperature at which samples are drawn from the underlying Boltzmann distribution. The value of this parameter depends on the operating conditions of the AQC device, and it is a direct link between the problem Hamiltonian and the energy function. Although some techniques have been proposed that estimate the effective temperature, a constant value for $\beta_{eff}$ is empirically selected depending on the size of the RBM.

Figure 8:
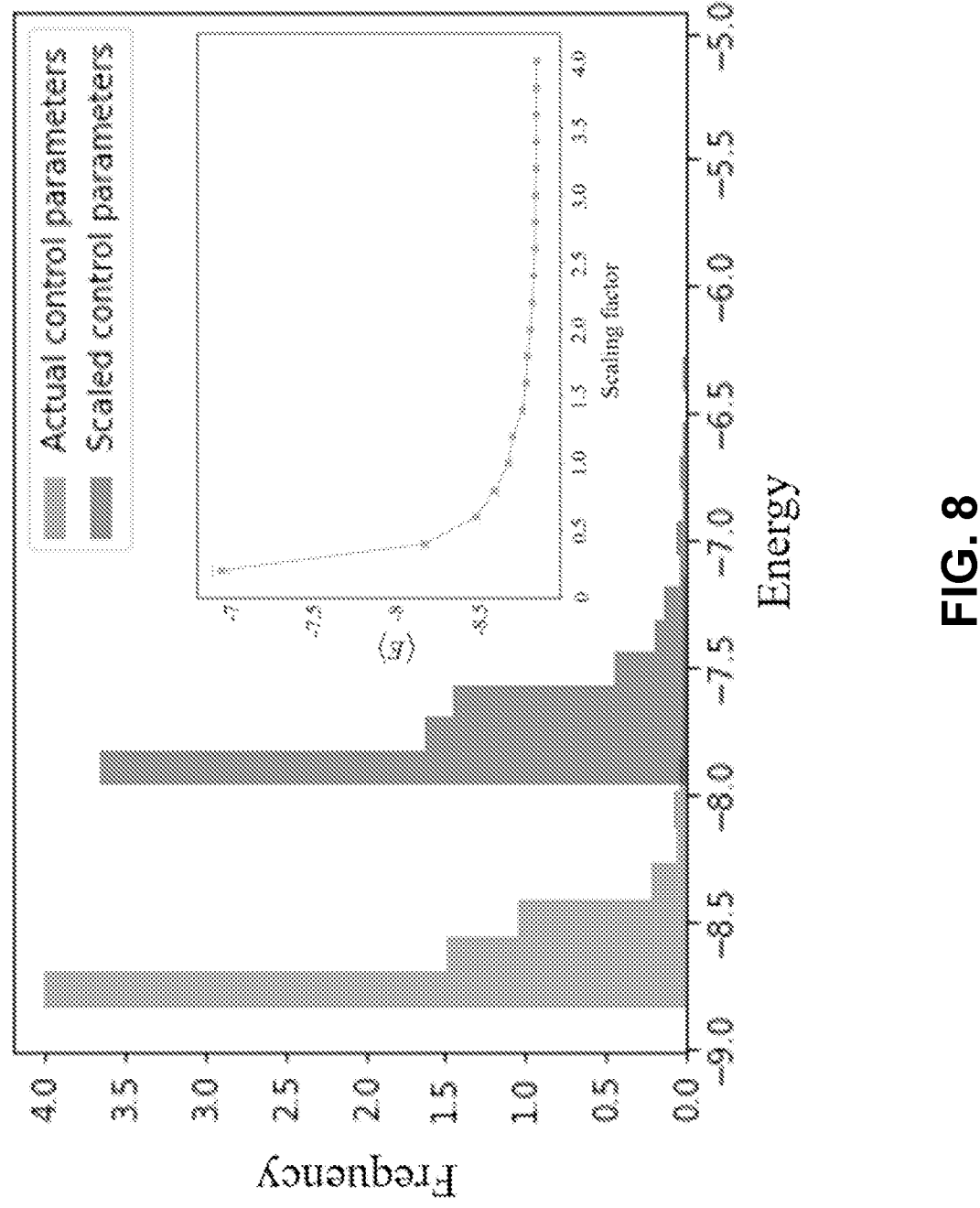
FIG. 8 illustrates a RBM energy histogram obtained for two sets of control parameters obtained by increasing actual parameters by a scaling factor, and also shows the effect of scaling factor on average energy.

FIG. 8 shows an example of a trend followed by samples drawn from an AQC device in an illustrative embodiment.

Control parameters used for the quantum sampling process are equivalent to the weights and biases of the RBM energy function provided that the scale parameter is unity. $\beta_{eff}$ can also be estimated by adjusting the actual control parameters by a user-defined scaling factor and analyzing the difference between the histogram of samples drawn from an AQC device as shown in FIG. 8. Selecting an appropriate scaling factor is a crucial task; increasing the scaling factor tends to reduce the average energy of the samples drawn through quantum sampling. Setting the value of the unknown scale parameter to one eliminates the need for analytically calculating $\beta_{eff}$ at each iteration of the training process, and sparingly reduces the required computational resources and time.

$$P(v, h) = \frac{1}{Z} \exp(-\beta_{eff} E_{RBM}) \tag{12}$$

With the approximate knowledge of the underlying Boltzmann distribution, the model expectations are computed by drawing several samples corresponding to the RBM energy function by quantum sampling. Eqs. (13), (14), and (15) use N samples drawn from adiabatic optimization runs to calculate the corresponding model expectation values utilized to update the model parameters.

Figure 9:
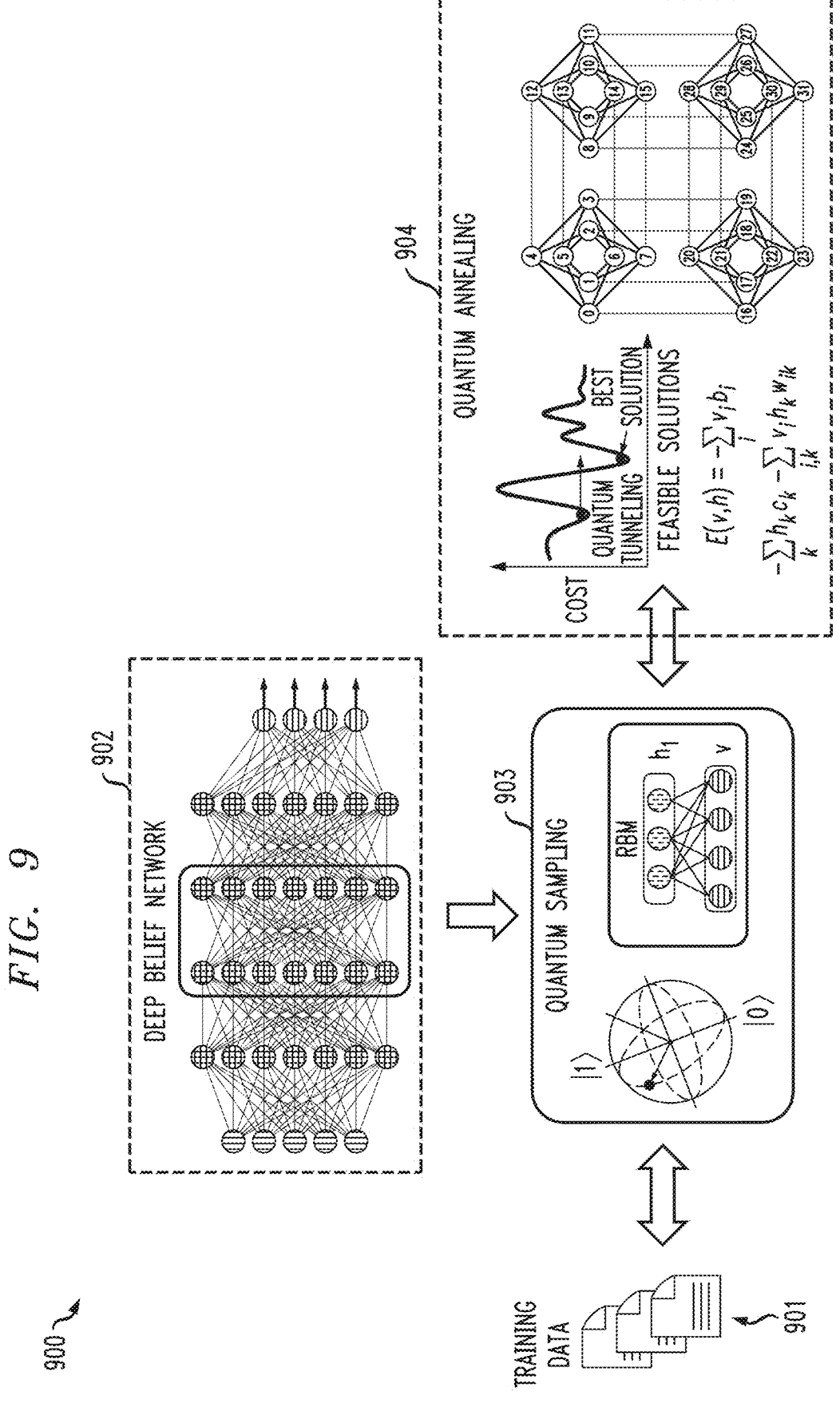
FIG. 9 is a diagram showing exemplary quantum generative training utilizing quantum sampling in an illustrative embodiment.

FIG. 9 illustrates a quantum generative training process 900 performed on a DBN 902 that utilizes training data 901, quantum sampling 903 and quantum annealing 904 to find the maximum likelihood estimates of the corresponding model parameters:

$$\langle v_i h_i \rangle_{model} = \frac{1}{N} \sum_{n=1}^{N} v_i^n h_j^n \tag{13}$$

$$\langle v_i \rangle_{model} = \frac{1}{N} \sum_{n=1}^{N} v_i^n \tag{14}$$

$$\langle h_j \rangle_{model} = \frac{1}{N} \sum_{n=1}^{N} h_j^n \tag{15}$$

The update rules for the weights and biases of the second RBM in the DBN sub-network 700 given in Eq. (5) converge to the minimum cross-entropy loss between the original input and the reconstructed input vector. The output from the second RBM layer $\hat{Y}_2 \in \mathbb{R}^{n \times k}$ bounded by [0, 1] is illustratively obtained by multiplying input data vector with the weights matrix and adding the corresponding hidden biases followed by a sigmoid activation function operation given in Eq. (16). Output of the generative training model $\hat{Y}_2$ is a transformed version of the original input data vector $\hat{X}$. This transformation can be considered as a higher-level abstraction of the historical process data and can be used as an input to the corresponding classifier to determine the state of the input data sample in the QC-based fault diagnosis model.

$$\hat{Y}_2 = \sigma(\hat{Y}_1 \cdot W_b + C_b) \qquad (16)$$

Discriminative Training

Figure 10:
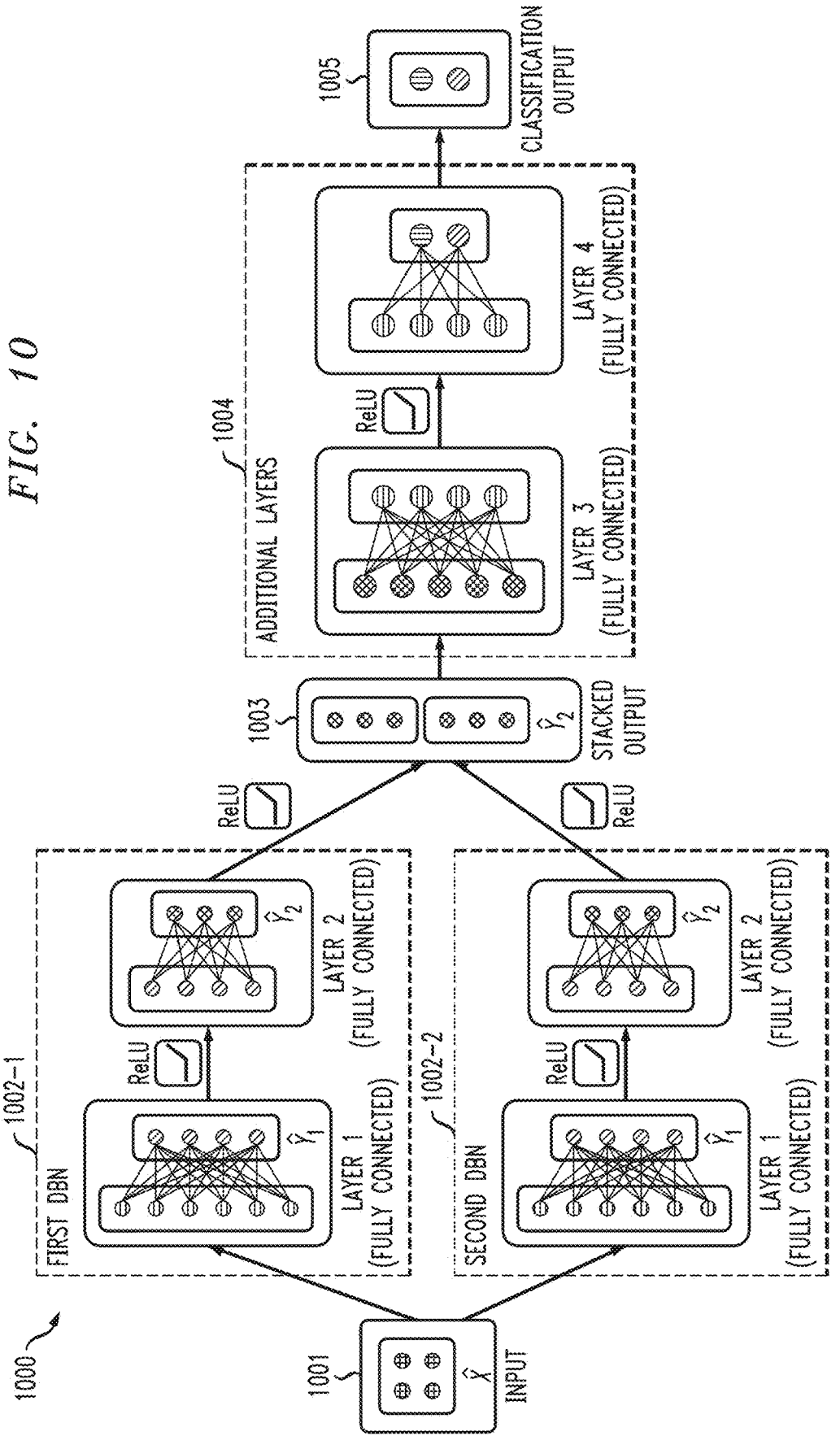
FIG. 10 is a diagram illustrating an exemplary network architecture that identifies normal or faulty data samples.

FIG. 10 shows a multi-layer network architecture 1000 in an illustrative embodiment. Input 1001 comprising an input data vector $\hat{X}$ is applied to pre-trained DBN-N and DBN-F sub-networks 1002-1 and 1002-2, each generally configured in the manner previously described in conjunction with FIG. 7. Again, the particular vector types and configurations shown in this figure and other figures herein are examples only, and can be varied in other embodiments. In the multi-layer network architecture 1000, high-level abstractions of the process data generated by the pre-trained DBN-N and DBN-F sub-networks 1002-1 and 1002-2 are concatenated together as a stacked output 1003 and passed as input to a local classifier sub-network 1004. The local classifier sub-network 1004 comprises a fully connected layer and a softmax layer, and is configured to generate classification output 1005. The DBN-N sub-network 1002-1 produces normal state abstractions while the DBN-F sub-network 1002-2 produces faulty state abstractions. Using class labels for normal and faulty data, discriminative training is performed in a supervised manner. This is accomplished by configuring the local classifier sub-network 1004 to include the fully connected network with a single hidden layer followed by the softmax layer that predicts the probabilities of normal and faulty states.

The weights matrix $W_f \in \mathbb{R}^{2k \times 2k}$ and bias vector $b_f \in \mathbb{R}^{2k}$ form the model parameters for the fully connected layer that connects each input to every hidden neuron. Nonlinear combinations of the extracted features can be easily learned with a fully connected layer which is a major component of the discriminative training process. The output generated by this layer $\hat{Y}_3 \in \mathbb{R}^{n \times 2k}$ is used to predict the score of normal or faulty class at classification output 1005; it is obtained by summing the bias and product of weights matrix with the input vector as shown in Eq. (17) followed by a ReLU activation function operation. As the process data can be in either of the two states, normal or faulty, weights vector $W_s \in \mathbb{R}^{2k \times 2}$ and bias vector $b_s \in \mathbb{R}^2$ predict the final class scores using the softmax activation function in Eq. (18). Model parameters for the DBN-based sub-networks are fine-tuned by retraining the local classifier neural network classically with the backpropagation algorithm that performs supervised learning of neural networks using gradient descent. The gradients of the loss function are estimated with respect to the model parameters of the local classifier sub-network, in order to iteratively update the model parameter values. Minimizing the categorical cross-entropy loss for the classifier yields maximum likelihood estimates of the model parameters.

$$\hat{Y}_3 = \text{Re}LU(\hat{Y}_2 \cdot W_f + b_f) \qquad (17)$$

$$P_i = \frac{\exp(\hat{Y}_3 \cdot W_s^i + b_s^i)}{\sum_i \exp(\hat{Y}_3 \cdot W_s^i + b_s^i)} \qquad (18)$$

A QC-based fault diagnosis model for individual process faults is obtained by following the quantum generative training and discriminative training process. The DBN-N sub-network in the generative model is trained only once and can be re-used for each diagnosis model. To detect the unknown state of the process data sample, both normal state and faulty state abstractions of the data sample generated as the output of the DBN-based generative model are merged. The local classifier then predicts the probabilities that the data sample belongs to normal or faulty states. A threshold probability of 0.5 further detects the state of the new process data sample.

Application: Continuous Stirred Tank Reactor

A closed-loop feedback controlled CSTR is used to evaluate the performance of QC-based deep learning in illustrative embodiments. The CSTR simulation continuously carries out a first-order exothermic reaction in a jacketed tank with constant holdup and records normal and faulty data at specific intervals.

Figure 11:
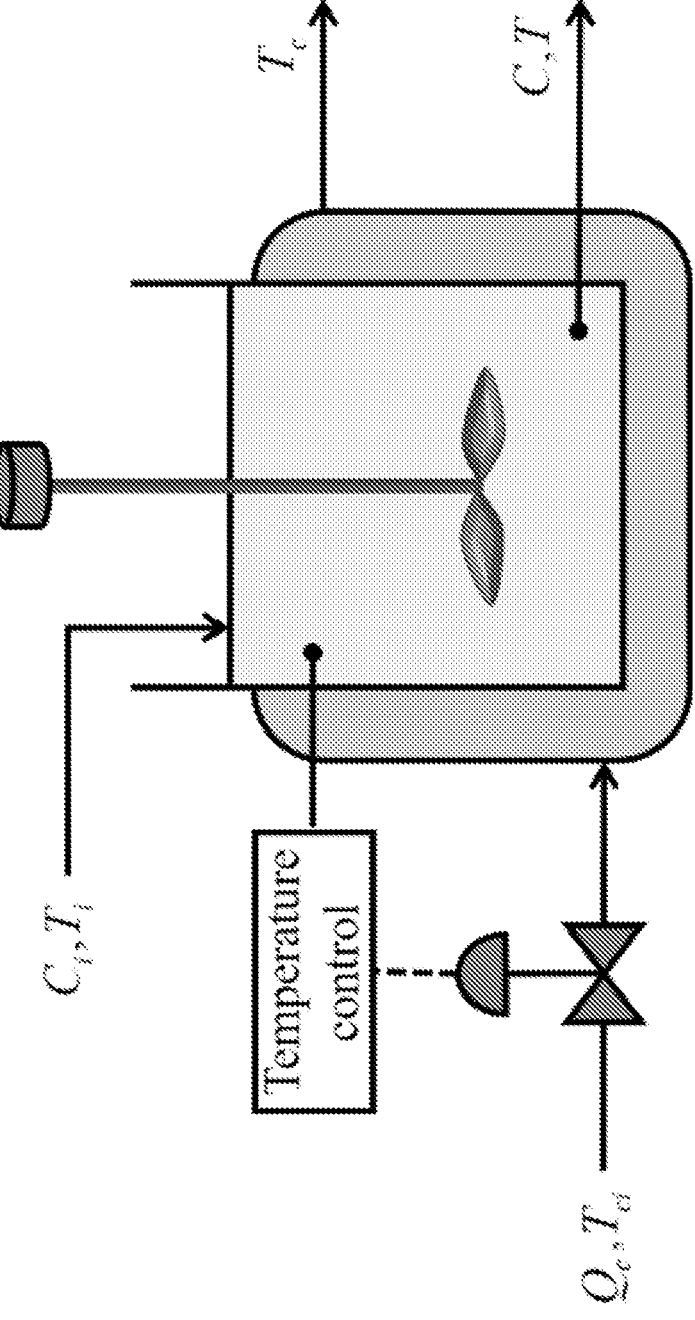
FIG. 11 is a diagram of an exemplary continuous stirred tank reactor (CSTR) utilized as an example monitored system in illustrative embodiments.
Figure 11:
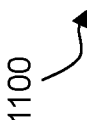

FIG. 11 shows the schematic of an example CSTR 1100 used in the CSTR case study. The concentrations, temperatures, and amount of heat transferred account for the seven process variables in the CSTR process simulation. Three faults are investigated in this case study, where the faults are caused due to errors in the reactor temperature measurement, decay in catalyst activity and fouling in the cooling jacket. Normal and faulty datasets with 1200 samples are recorded at a sampling interval of one minute for training an example QC-based fault diagnosis model as disclosed herein. In faulty datasets, the fault is introduced after 200 minutes of normal operation. A testing set with 600 samples recorded for 10 hours is used to validate the trained model for both normal and faulty states.

Experimental Settings

As the process data has strong temporal correlations, its dynamic characteristics are considered in illustrative embodiments.

Figure 12:
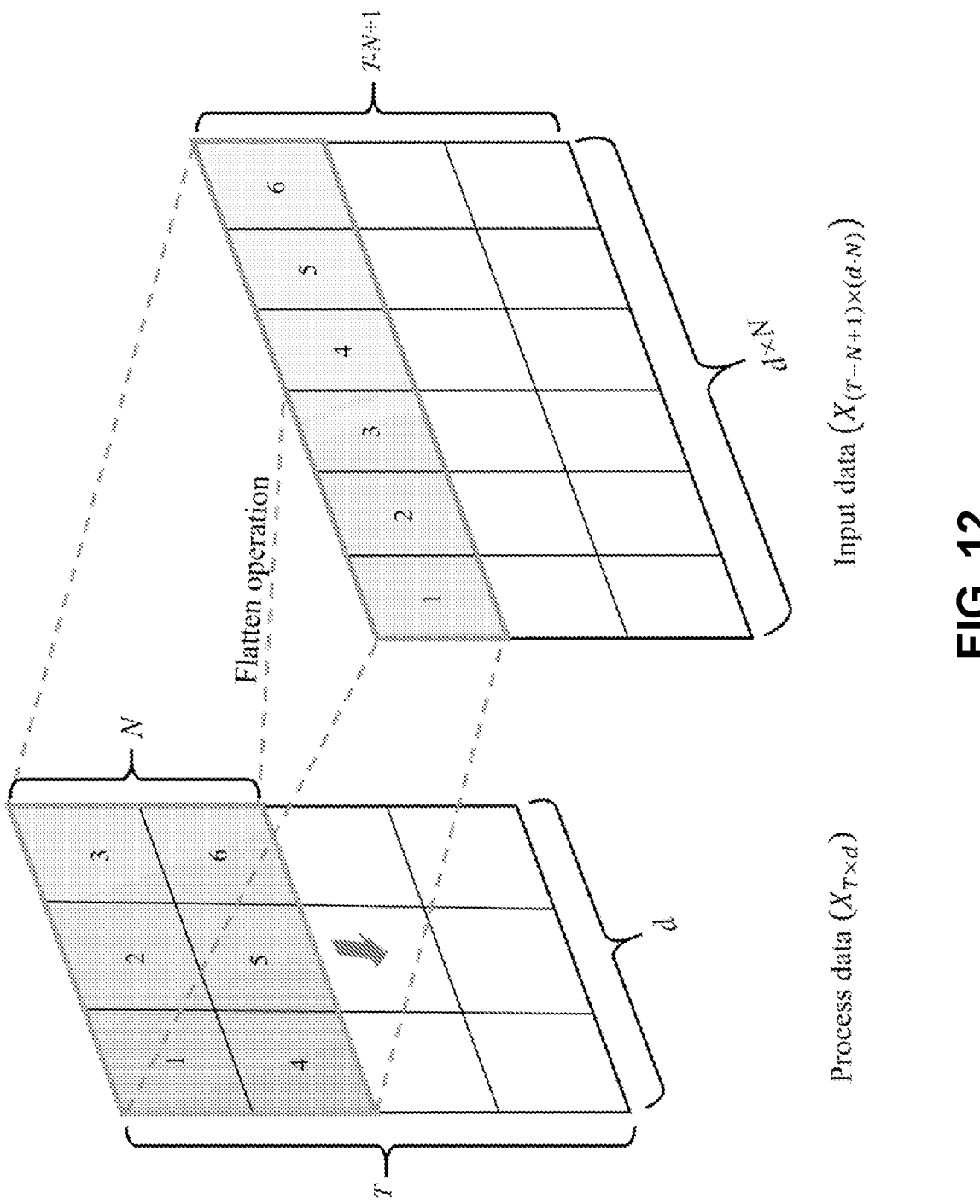
FIG. 12 is a diagram of an exemplary data preprocessing step for an exemplary CSTR case study.

FIG. 12 shows an example data preprocessing step in an illustrative embodiment, which is described as follows. Assuming a d dimensional raw dataset recorded for T time-steps, the length of time window N is a fundamental element of the preprocessing step. The process data matrix of size N×d is expanded into a one dimensional vector and accounts for a single sample in the input data vector. A similar procedure is repeated for the process data labels in order to preserve the size and information corresponding to the input data. This preprocessing is the first step towards dealing with temporal autocorrelations between the process data variables with the size of time window N determined empirically by performing several computational experiments. A RBM with Gaussian visible units interacts with this input data, because the recorded process data are continuous and real-valued. In order to eliminate the complexities encountered during training a RBM with Gaussian visible units, the input data corresponding to normal and three faulty states is normalized to have zero mean and unit variance.

The size of dynamic time window N is set to 4 which implies 28 visible Gaussian units in the first RBM layer of the DBN-based sub-network. This layer consists of 15 Bernoulli hidden units and produces output by applying perceptron operation to the input without sampling from a Gaussian distribution. This output is used as input data vector for the following RBM layer with 15 visible and 8 hidden units. The second RBM layer uses Bernoulli units and generates an output by performing a sigmoid operation on the corresponding perceptron output. Learning rate of 0.001 is used to train the RBM layer with Gaussian visible units and 0.01 for the layer with binary visible and hidden units. The momentum for weight and bias updates is set to unity. Both sub-networks DBN-N and DBN-F follow exactly the same architecture and are trained through the quantum generative training process. Cross-entropy loss is used as a performance metric to track the training progress. Mean square loss can also be used as a viable substitute for cross-entropy loss. The hidden layers or the outputs in the DBN-N and DBN-F sub-networks are merged together as a single layer with 16 neurons. This ensures that the higher level abstractions of the normal and faulty states are processed together. A fully connected layer with 16 neurons followed by a softmax layer is attached to the merged outputs and forms the basis of the discriminative training. With the weights and biases obtained through the quantum generative training as starting points, the complete network is retrained with Adam optimizer to minimize the categorical cross-entropy loss.

In order to draw samples from the AQC-based device, D-wave's 2000Q quantum processing unit is used. Such a device is an illustrative example of what is more generally referred to herein as a "quantum processing unit" or QPU, and other types of quantum processing units can be used in other embodiments. The model expectations utilized to compute the weight and bias updates are calculated with these samples. The example AQC-based device uses 2,048 qubits and 5,600 couplers that limit the size of fully connected RBM energy function with an equal number of visible and hidden units to 52 units in each layer. 1,000 anneal runs are performed with each run lasting for 20 μs on this quantum processing unit. An embedding scheme for the corresponding RBM energy function is determined in a heuristic manner and the obtained graph minor is re-used to eliminate unnecessary complications with the effective temperature parameter $\beta_{eff}$. This parameter is set to a constant value of one for the CSTR case study.

Fault Detection

Several computational experiments are conducted with the aforementioned experimental settings to demonstrate the viability of an example QC-based fault diagnosis model as disclosed herein. The local classifier detects the state of each sample and classifies it as normal or faulty by predicting the likelihood of individual states. A probability control limit of 0.5 is used to classify the input data vector as normal or faulty. The fault detection rate (FDR) and the false alarm rate (FAR) are reported in Table 1 for each fault classified with the example QC-based fault diagnosis model. FDR is defined as the fraction of faulty samples that are accurately detected, and FAR is the fraction of normal data samples that are incorrectly classified as faulty. FDRs for the CSTR case study estimated with canonical variate dissimilarity analysis (CVDA) are also reported in Table 1, where the control limits for fault detection are computed with the $T^2$ statistic.

TABLE 1

Fault detection results of the local classifier in example QC-based deep learning model for the CSTR case study

| Fault | CVDA | QC-based model | |
| | FDR (%) | FDR (%) | FAR (%) |
| --- | --- | --- | --- |
| 1 | 43.83 | 100 | 36.7 |
| 2 | 64.19 | 66.6 | 6.06 |
| 3 | 71.71 | 71.0 | 1.02 |

It can be clearly seen that the FDR rate for the QC-based fault diagnosis model significantly improves for the first faulty state. However, this is also accompanied by an increase in the number of false positives. As for the second and third faulty states, the FDR rates are comparable to that of the detection rates obtained by CVDA. The FAR rates for these faulty states are significantly lower than that of the first fault. It is a well-known fact that the performance of deep architectures depend on the size of the architecture used. Therefore, we also generate contour maps for FDR rates as functions of the number of hidden units in the DBN-N and DBN-F sub-networks.

Figure 13:
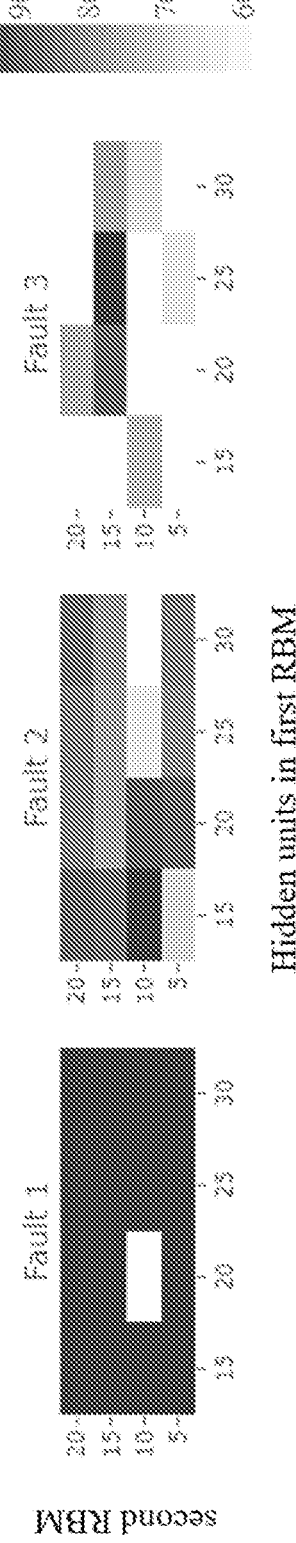
FIG. 13 illustrates exemplary FDR contour maps of a DBN sub-networks for an exemplary CSTR case study.

FIG. 13 shows the FDR maps for all three faults, and the FDR maps indicate that the detection rates for fault one are high for almost all DBN architectures. However, the detection results for fault two and fault three are relatively non-uniform. In case of fault two, for a fixed number of hidden units in the Bernoulli RBM, the FDR rates gradually decrease with an increase in the hidden neurons in the first RBM layer. Alternatively, no discernible pattern is observed in the FDR rates for fault three. The choice of best performing DBN architecture with 15 and 8 hidden units in the first RBM and the second RBM layer, respectively, can be clearly justified from these FDR contour maps.

Among the 1,200 faulty samples in the testing dataset, the local classifier accurately classifies the dynamic input data samples with an average detection rate of 79.2%. This implies that the 21.8% of the faulty samples are missed. Compared to the missed detection rate of 40.42% in the CVDA technique, the QC-based fault diagnosis model clearly outperforms this fault monitoring technique.

Figure 14:
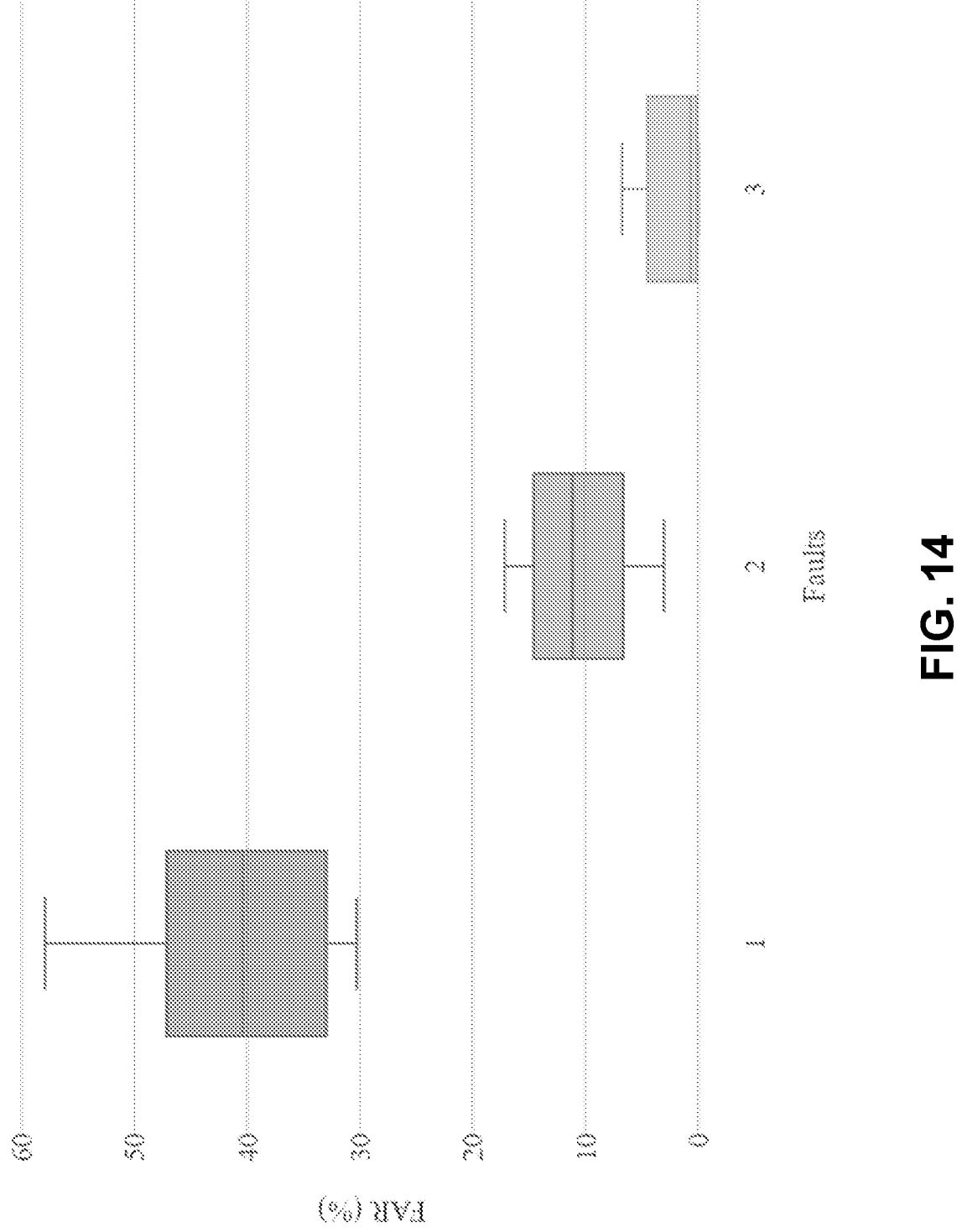
FIG. 14 is a graph of exemplary false alarm rates for a local classifier in an exemplary CSTR case study.

FIG. 14 plots the FAR rates for each individual fault obtained through performing multiple computational experiments. As fault one deviates only slightly from normal operation, it is difficult to differentiate between normal and faulty states and produces higher number of false alarms. In contrast, faults two and three can be distinctly classified from normal state samples, as evident from the low FAR rates. Although the example QC-based fault diagnosis model may not be competitive for faulty state one, it clearly outperforms the classical CVDA technique for the remaining two faults.

Application: Tennessee Eastman Process

Figure 15:
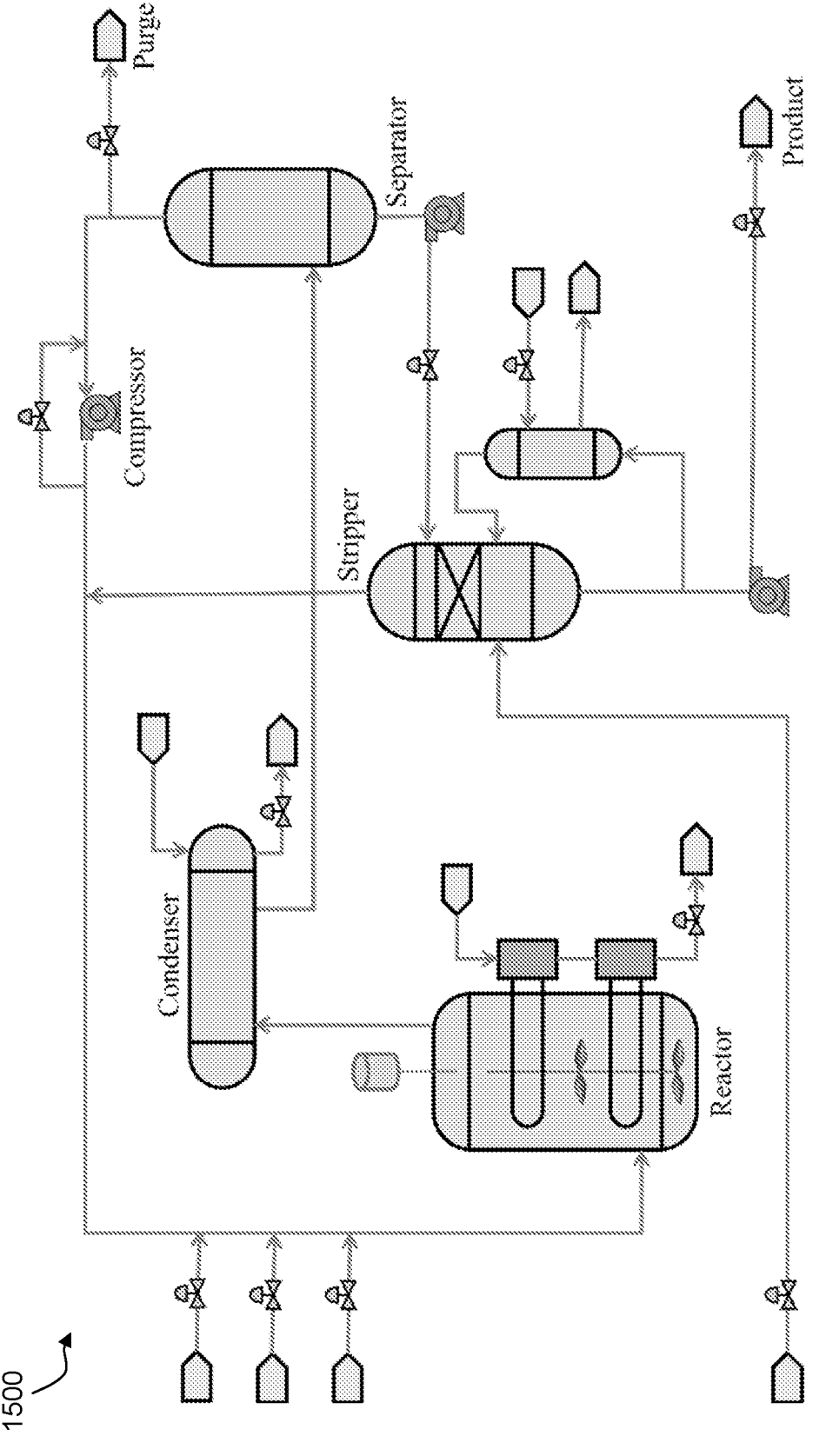
FIG. 15 is a diagram illustrating an exemplary Tennessee Eastman (TE) chemical process utilized as an example monitored system in illustrative embodiments.

FIG. 15 shows an example TE process system 1500 that is utilized as a monitored system in some embodiments. The TE process is one of the popular benchmark problems for process monitoring, so it is used to test the example QC-based fault detection model in this section. The TE process system 1500 implements a chemical process that produces two main products with five major process units, namely reactor, stripper, separator, compressor, and mixer. The TE chemical process simulation has 52 variables, containing 41 measured variables and 11 manipulated variables. In this TE process system, 20 fault states along with a normal state have been simulated, and process data has been recorded for each state. For each fault, 1,200 samples are recorded for 75 hours at a sampling interval of three minutes. Fault is introduced in the system after 10 hours of normal operation, meaning for each faulty dataset the first 200 samples correspond to normal process operation while the remaining 1,000 are faulty data samples. The dataset for normally operated process data is recorded for straight 48 hours without any disturbance. To validate the trained QC-based fault diagnosis model, a testing dataset with 600 samples is also recorded for 30 hours for normal and faulty states with the faults introduced after 10 hours of normal operation. Both training and testing datasets corresponding to normal and faulty states are provided herein.

Experimental Settings

The recorded historical process data for the TE process are continuous and real-valued. Binary models might produce poor representations of such data, so an RBM with Gaussian visible units is the first interaction of the training process data with the example QC-based fault detection model. As mentioned earlier, the CD-1 algorithm might be inefficient in learning the variance of the Gaussian noise associated with each visible unit. In order to eliminate this variance, the training data corresponding to the normal state and the 20 faulty states are normalized to have zero mean and unit variance. Several fault detection methods implement variable selection preprocessing to consider the process variables with the highest influence on the data. However, for this case study all of the 52 process variables are used as input to the example model without eliminating any portion of the recorded dataset.

The sub-networks DBN-N and DBN-F use the same architectural configuration to produce abstractions of the normal and faulty states, respectively. The first RBM layer in the DBN-based sub-networks consists of 52 visible Gaussian units and 26 Bernoulli hidden units. This RBM layer is set up to produce an output by simple perceptron operation without sampling from the underlying Gaussian distribution. The following RBM layer used 26 visible units corresponding to the hidden layer of the first RBM layer along with 20 hidden units. Output obtained from the second RBM layer is produced by sampling from a binomial distribution with the hidden unit values as the means. A learning rate of 0.01 and momentum of one is used to train the DBN sub-networks via quantum generative training. Learning rate for RBM with Gaussian units should be at least one order of magnitude less than the corresponding binary RBM. Cross-entropy loss is used as a performance metric to track the progress of the quantum generative training process. A data vector with 40 dimensions is obtained after the high-level abstractions from the DBN-N and DBN-F sub-network are concatenated. Fully connected layer with 40 neurons is attached to this input and forms the major component of the discriminator sub-network. Fine-tuning of the weights and biases obtained through quantum generative training is performed by training the discriminator with the Adam optimizer to minimize the categorical cross-entropy loss.

The quantum generative training process draws samples from the AQC-based quantum computer for quantum sampling to approximate the model expectations. D-Wave 2000Q quantum processor with 2,048 qubits and 5,600 couplers is used for all computational experiments involving QC-based fault detection model. The anneal schedule runs for 20 μs on this processor. To compute the model expectations, 1000 anneal reads are used implying the drawing of 1000 samples from the quantum computer. For a single RBM instance, an embedding scheme for the corresponding RBM energy function is found through a heuristic technique. Drawing samples from the quantum computer for the energy function utilizes the same embedding scheme. It is important to re-use the same graph-minor in order to minimize the variation in the effective temperature dependent parameter $\beta_{eff}$. For this case study, the value of the unknown scale parameter is set to unity to avoid further complications associated with the hyper-parameter learning rules.

Fault Detection

The above experimental settings are used to conduct several computational experiments for all 20 faults. The output of the local classifier lies between 0 and 1 representing the likelihood of the data sample belonging to either normal or faulty state. A threshold probability of 0.5 is used to detect the state of the sample. The diagnosis results of the local classifier for each fault consist of FDRs and FARs computed for both the training and validation datasets and are given in Table 2 below.

Contour maps of the FDRs determined by the local classifier in the QC-based fault diagnosis model are generated for each fault to perform a grid search for the best performing network architecture.

Figure 16:
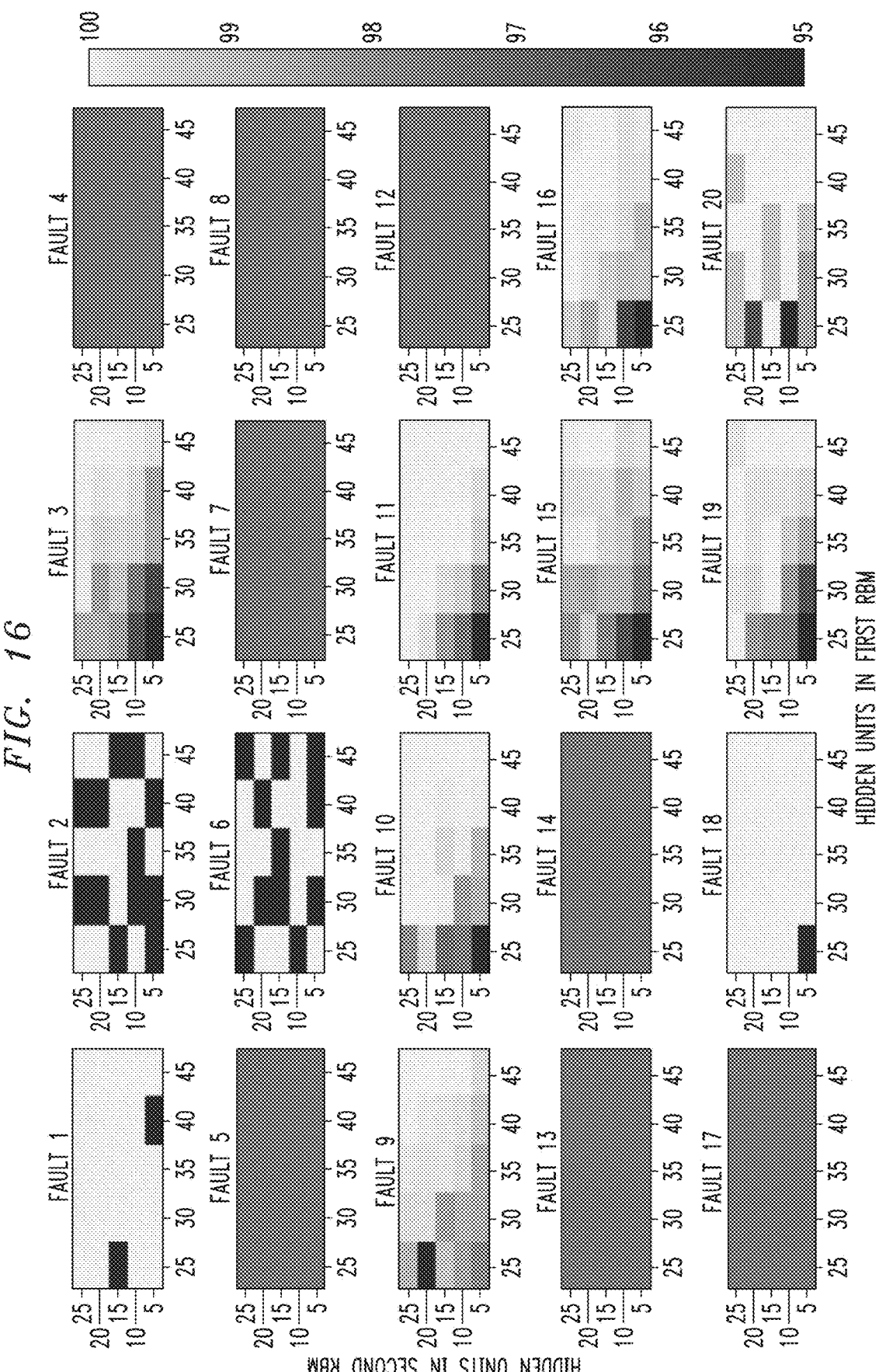
FIG. 16 illustrates exemplary FDR contour maps of a DBN sub-networks for an exemplary TE process case study.

FIG. 16 shows the FDR maps for the TE process as a function of the number of hidden units in the first and second RBM layer of the DBN-N and DBN-F sub-networks. Eight faults simulated in the TE process demonstrate a uniform FDR map irrespective of the size of the DBN architecture used. FDR maps for faults 1 and 18 are uniform with very few exceptions. Faults 2, 10, and 20 show no discernible pattern in the performance of the QC-based model with respect to the DBN-based architectures. As evident from the remaining fault FDR maps, clear patterns emerge corresponding to the number of hidden units in the RBM layers. The FDR rates increase with the number of hidden units. This means that the higher-level abstractions of the input data produced by the DBN-based sub-networks can be better represented by higher dimensions than the original input data. However, this is only true for a few select cases of faults. Based on the FDR contour maps for each fault, an optimal number of hidden units 26 and 20 in the first and second RBM layer, respectively, are selected for further computational experiments.

Among the 8,000 samples in the faulty dataset, a large portion of the samples are accurately classified as faulty. The average detection rate recorded for the local classifier in the QC-based fault diagnosis model is 99.39%, meaning only 0.61% of the faulty samples remain undetected. A major challenge in developing fault diagnosis models is to adjust the trade-off between the FDRs and the FARs. An increase in FDR is usually accompanied by an increase in the FAR. However, the false positive rates for the example QC-based diagnosis model are zero for 14 of the 20 faults. It is important to note that the FARs for all faults in the TE process are less than or equal to 1%. With an average FDR of 99.39% and an average FAR of 0.26%, the performance of the example fault diagnosis model is significantly high and can efficiently differentiate faulty process data from normal states of operation.

TABLE 2

Fault detection results of the local classifier in the example QC-based deep learning model for the TE process case study

| Fault | FDR (%) | | FAR (%) | |
|---|---|---|---|---|
| | Training | Testing | Training | Testing |
| 1 | 100 | 100 | 0 | 0 |
| 2 | 100 | 100 | 0 | 0 |
| 3 | 99.1 | 98.0 | 1.9 | 1.0 |
| 4 | 100 | 100 | 0 | 0 |
| 5 | 100 | 100 | 0 | 2.5 |
| 6 | 100 | 100 | 0 | 0 |
| 7 | 100 | 100 | 0 | 0 |
| 8 | 100 | 100 | 0 | 0 |
| 9 | 96.3 | 95.25 | 1.5 | 0.25 |

TABLE 2-continued

Fault detection results of the local classifier in the example
QC-based deep learning model for the TE process case study

| | FDR (%) | | FAR (%) | |
| Fault | Training | Testing | Training | Testing |
|---|---|---|---|---|
| 10 | 99.7 | 100 | 0.2 | 0.25 |
| 11 | 100 | 100 | 0 | 0 |
| 12 | 100 | 100 | 0 | 0 |
| 13 | 100 | 100 | 0 | 0 |
| 14 | 100 | 100 | 0 | 0 |
| 15 | 97.8 | 97.0 | 1.7 | 0.25 |
| 16 | 99.0 | 98.5 | 0 | 0 |
| 17 | 100 | 100 | 0 | 0 |
| 18 | 100 | 100 | 0 | 0 |
| 19 | 99.5 | 99.0 | 0 | 0 |
| 20 | 100 | 100 | 0 | 1.0 |

Fault Identification

Output probabilities that indicate the state of a data sample generated by the local classifier in the QC-based fault diagnosis model are used as individual inputs for the global classification network. The two-dimensional output vector corresponding to individual fault is merged to generate an input vector with 40 dimensions. These input data samples are used to train and validate the performance of the global classifier network. The global classifier network comprises of a fully connected layer with 40 neurons followed by a softmax layer with 21 neurons. The softmax layer classifies the input data sample as normal or one of the 20 faulty states. The global classifier is trained with standard back-propagation algorithm with the objective of minimizing the categorical cross-entropy loss.

The diagnosis results for the global classification network that identifies the type of faults produced from the likelihood values obtained with the QC-based fault diagnosis model are reported in Table 3. For comparison purposes, the FDRs of some state-of-the-art data-driven and deep neural network based approaches are also reported. The diagnosis results obtained for the TE process using PCA and DBN-based fault diagnosis model are also reported in Table 3. As evident from the diagnosis results, PCA does not effectively detect several of the faults in the TE process. The diagnosis rates for faults 3, 9, and 15 are particularly poor. The inability of PCA to take into account the temporal correlations might be contributing to its poor diagnosis performance. This shortcoming is overcome by the DBN-based fault diagnosis model which strongly augments the diagnosis results for a significant portion of the faulty states. The FDRs for faults 3 and 9 improve with the DBN-based model, but fault 15 performs even worse than that of PCA. None of the faults of types 15 and 16 are diagnosed with the DBN-based model. In the TE process, faults 3, 15, and 16 are particularly hard to detect and usually require significant model tweaking for a mediocre performance improvement. On the other hand, the global classifier in the example QC-based diagnosis model of the present embodiment classifies faults of almost all fault states with a significantly higher accuracy rate than PCA for faults 3 and 9. The resulting FDRs for the rare and hard to detect faults 15 and 16 are higher than those of both PCA and DBN-based models as well. The lowest FDR reported by the QC-based fault diagnosis model is 38.1% for the fault 9. Although, this diagnosis rate for fault 9 is lower than that of the DBN-based model, the diagnostic performance of the example model is clearly superior for faults that are rare and hard to detect. Apart from false positives, misclassification of faulty states is also possible and cannot be overlooked as the cost of repairs required due to detection of particular faults could be expensive. The performance of this fault diagnosis model for fault identification can be represented by a confusion matrix which allows the visualization of the accuracy of classification, and misclassification as well.

Figure 17:
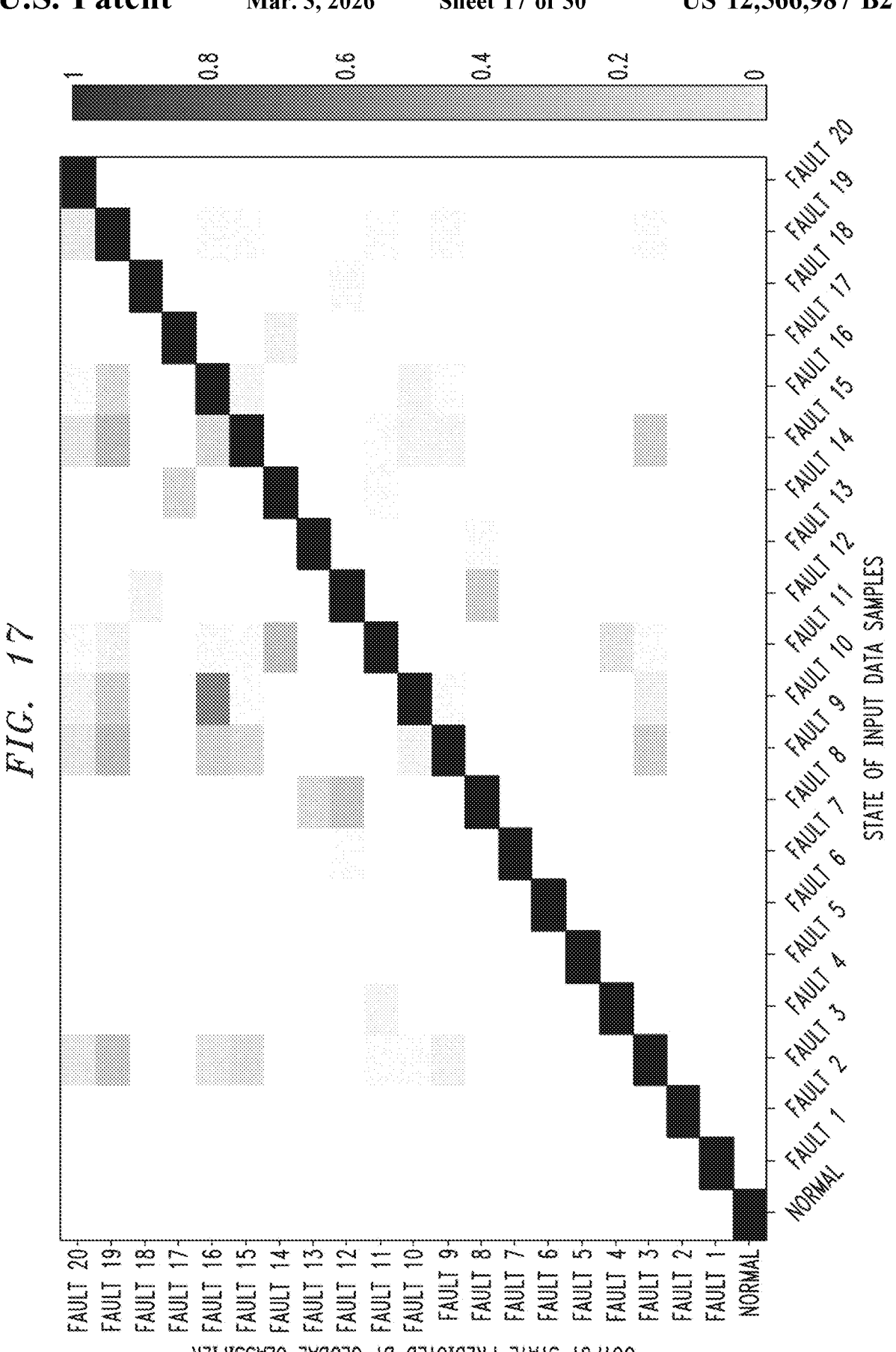
FIG. 17 is an exemplary confusion matrix for exemplary fault diagnosis results obtained by a global classifier.

FIG. 17 represents the diagnosis results of the global classifier in the QC-based fault diagnosis model in the form of a confusion matrix. The diagonal elements in the matrix are the FDR rates for a particular class of samples. The last row in the matrix labeled as normal corresponds to the FAR rates and have some of the lowest values in the confusion matrix. This confusion matrix can also be used to determine the degree of resemblance between classes of samples. Faults with no similarities whatsoever between other faulty or normal states are relatively easy to diagnose with lower chances of misidentification. Faults 1, 2, 5, 6, and 18 are few such faults with the highest FDR recorded with detection rates as high as 100%.

TABLE 3

Comparison between different fault diagnosis models
for the TE process case study with respect to
fault detection rates for each identified fault

| | | FDR (%) |
| Fault | PCA[20] | QC-based model |
|---|---|---|
| 1 | 99.88 | 100 |
| 2 | 98.75 | 100 |
| 3 | 12.88 | 51.1 |
| 4 | 100 | 94.7 |
| 5 | 33.63 | 100 |
| 6 | 100 | 100 |
| 7 | 100 | 95.3 |
| 8 | 98 | 76.3 |
| 9 | 8.38 | 38.1 |
| 10 | 60.5 | 44.6 |
| 11 | 78.88 | 51.5 |
| 12 | 99.13 | 81.3 |
| 13 | 95.38 | 94.7 |
| 14 | 100 | 86.9 |
| 15 | 14.13 | 44.9 |
| 16 | 55.25 | 68.3 |
| 17 | 95.25 | 92.7 |
| 18 | 90.5 | 95.6 |
| 19 | 41.13 | 73.0 |
| 20 | 63.38 | 89.9 |

The low FAR rates produced by the local classifiers in the QC-based fault diagnosis model are maintained for the diagnosis results of the global classifier network. Several computational experiments are performed for the global classifier network in order to estimate the extent of FAR rates for each corresponding fault.

Figure 18:
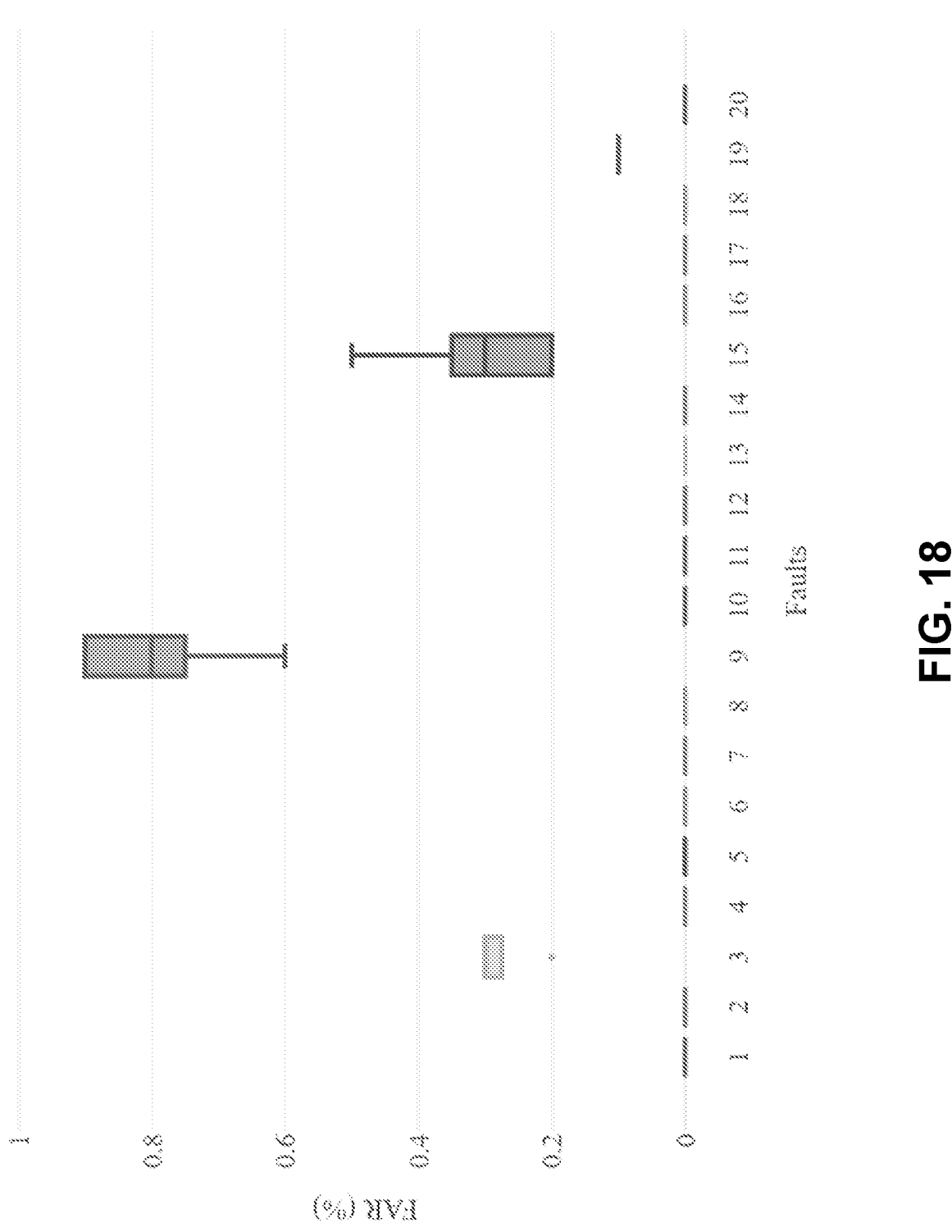
FIG. 18 is a graph illustrating exemplary false alarm rates for a global classifier in an exemplary TE process case study.

FIG. 18 shows the FAR rates for each of the 20 faults simulated in the TE process. It should be noted that the highest FAR rate recorded is lower than one percent. Although an average FDR of 82.1% is reported for the DBN-based model, it should be noted that this framework is developed specifically for complex chemical processes. Its application to the TE process involves several data preprocessing steps like variable sorting, and time length selection that are not considered for this case study performed with the QC-based deep learning model for fault diagnosis. With an average FDR of 80% and a total FAR of 1.3%, the example QC-based fault diagnosis model of the present embodiment can be competitively used against the state-of-the-art fault diagnosis methods implemented with classical computers and for detection and diagnosis of rare faults in complex process systems.

Quantum Advantage

Conventional classical learning techniques to train DBNs crudely approximate the log-likelihood gradients of the training data required for the hyper-parameter update rules. The CD-k algorithm more closely approximates the contrastive divergence that is defined as the difference between Kullback-Liebler divergences. It has also been demonstrated that CD-k algorithm does not follow the gradient of any function. Although CD-k converges to the true gradient after infinite reconstruction steps, it is impractical to run the algorithm for an endless time. Other than the approximation limitations, CD-k may take many iterations to converge due to the inherent noise in Gibbs sampling and slow evolution towards the equilibrium probability distribution.

Quantum generative training circumvents some challenges put forth by the classical training techniques. For machine learning and deep learning applications, a quantum advantage can be quantified with the computation effort require to achieve a particular model performance. Computation time required could also be considered as a factor in demonstrating the efficiency of quantum inspired techniques over classical techniques. In the case studies, the performance profiles given by the loss curves for the second RBM layer in the DBN-F sub-network can be used to compare performance of classical and quantum training techniques.

Figure 19:
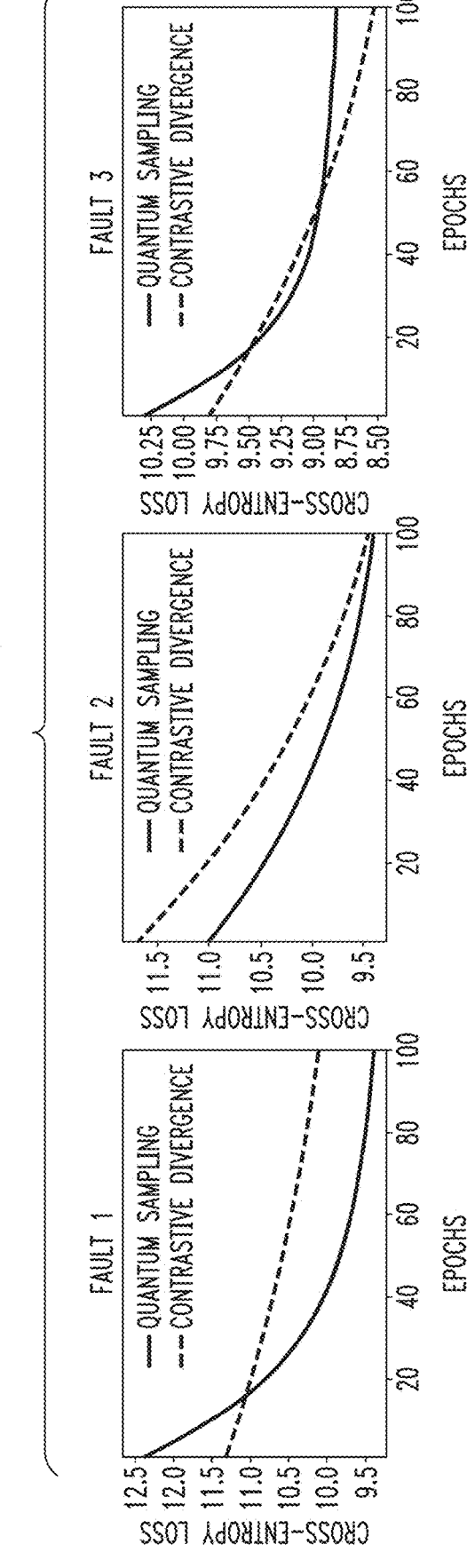
FIG. 19 shows exemplary loss curves for an exemplary DBN trained with quantum and classical methods for an exemplary CSTR case study.

FIG. 19 shows loss curves for all faults in the previously-described CSTR case study for both the CD-1 algorithm and the quantum sampling-based training approach.

Figure 20:
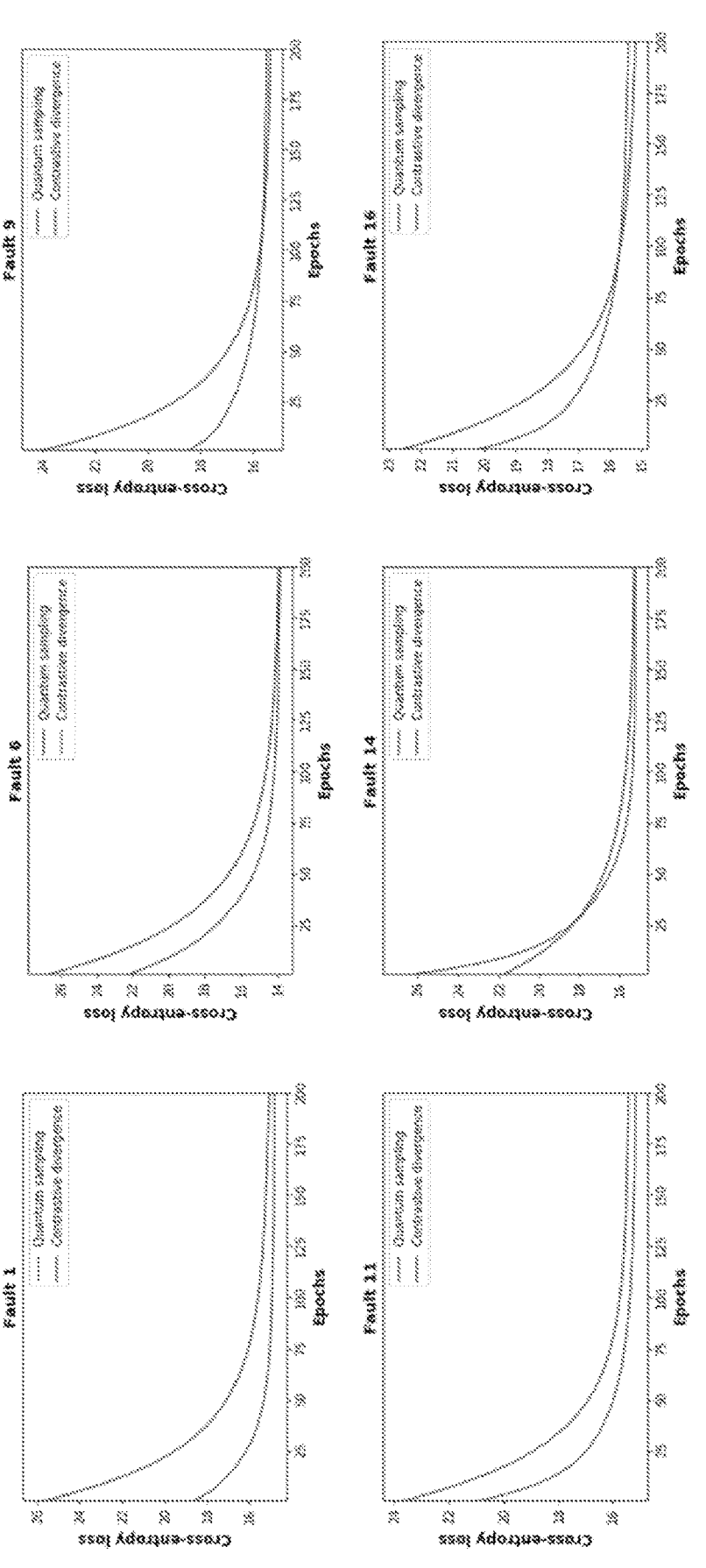
FIG. 20 illustrates exemplary loss curves for an exemplary DBN trained with quantum and classical techniques for an exemplary TE process case study.

FIG. 20 shows similar curves for the TE process case study. These particular representation for faults in the TE process are chosen such that a clear distinction between the classical and quantum techniques can be observed. As seen in the plots, QC-based training algorithm converges faster than the classical CD-1 algorithm. A clear quantum advantage can be perceived with quantum assisted training techniques for the example fault diagnosis model of the present embodiment. The computation time required to calculate gradients with both quantum and classical techniques is negligible in the case of TE process; therefore, this is not an effective criteria to quantify the superiority of quantum inspired techniques over classical training algorithms. In addition, samples are drawn from an AQC device at each step of the quantum sampling process within 20 μs. This sampling time is independent of the size of the RBM network and does not increase with size, unlike classical training techniques. This implies that a computational time advantage could be clearly perceived in case of large networks trained with the quantum generative training process.

The approximation errors for the CD-1 algorithm to train DBNs could have adverse effects on its performance as the size of the RBM sub-networks gets very large. Markov chain based conventional training techniques would not be a feasible choice in such cases either. However, because quantum sampling can draw samples from an underlying approximate Boltzmann distribution that models the joint probability of the RBM, the quantum generative training technique can guarantee an efficient performance. This holds true provided that the size of the RBM energy function does not exceed the scale of current AQC-based computers. As evident from the two case studies of process monitoring in nonlinear complex process systems, the example QC-based fault diagnosis model of the present embodiment effectively detects faults with significantly higher detection rates and lower false positives. This implies that the example fault diagnosis model is a generalized approach and could work for most nonlinear complex process systems with little to no modifications. With the increasing applicability of deep neural networks, a quantum advantage provides an extra edge to such approaches. To this end, it is important to note that computational speed could also contribute towards the quantum advantage as the number of process variables increases. Faster convergence with quantum sampling ensures less computation to achieve the same model performance with that of classical techniques like CD-1 algorithm. High computational speeds coupled with faster convergence can guarantee superior performance of such deep learning models and methods.

Illustrative embodiments described in conjunction with FIGS. 1-20 provide a QC-based fault diagnosis model to distinguish faulty states from normal operating states in complex industrial chemical process systems. We integrated quantum assisted generative training with classical discriminative training to detect and diagnose multiple faults introduced in the system. The sampling abilities of AQC computers were exploited to perform quantum generative training for the DBN-based sub-networks present in the QC-based fault diagnosis model disclosed in illustrative embodiments herein. The applicability of this example model was demonstrated through two applications on a CSTR and TE process, respectively. The obtained detection and diagnosis results indicated that the illustrative QC-based fault diagnosis model clearly outperformed state-of-the-art data-driven approaches and deep neural network based models in most cases. A quantum advantage was also perceived with the quantum generative training while training the DBN-based sub-networks in the example fault diagnosis model in contrast to the classical training approaches.

Additional illustrative embodiments will now be described with reference to FIGS. 21-29. These embodiments more particularly implement QC-based hybrid deep learning for fault diagnosis in electrical power systems, although the disclosed techniques are readily adaptable to a wide variety of other systems and applications.

Energy-Based Deep Learning Models

As described elsewhere herein, RBMs are generative neural networks used to model unknown data distributions. They are known to make nonlinear autoencoders work considerably better than most widely used dimensionality reduction methods, such as principal component analysis and singular value decomposition. RBMs also possess strong capability of modelling joint distributions. As a result, RBMs have been widely applied for pattern generation and analysis with applications in image generation, movie recommendation systems, phone recognition, and others. Due to these advantages offered by RBMs, they can be used to capture the global patterns in fault detection and diagnosis applications. To this end, RBMs have been previously used for fault detection and diagnosis of simple systems with few variables and faults, such as health diagnosis of electric power transformers, industrial chemical processes, and inspection of electromotors.

Figure 21:
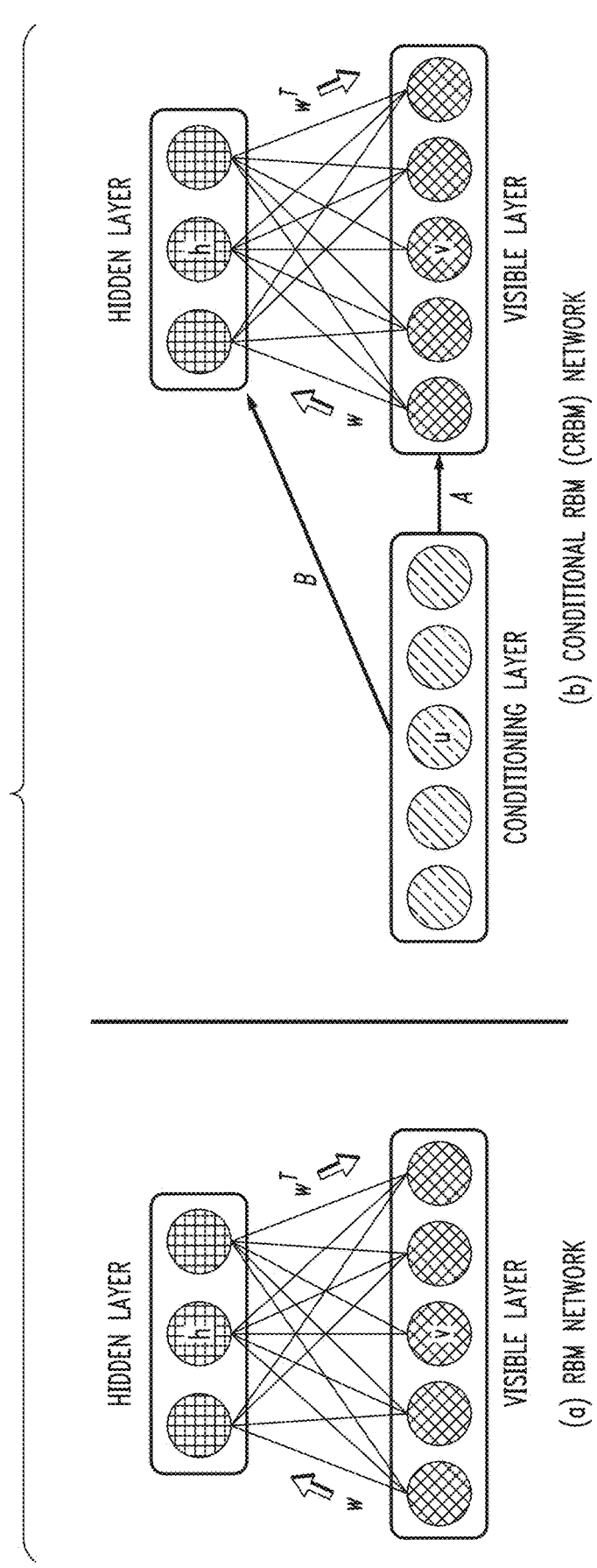
FIG. 21 illustrates schematic networks of an example RBM and an example CRBM.

FIG. 21 illustrates an example RBM network and an example conditional RBM (CRBM) network. As described previously herein, RBMs are a special form of undirected graphs modeled as a two-layer bipartite graph with two types of units termed as visible and hidden units, as illustrated at (a) on the left side of the figure. The hidden variables serve the purpose of modeling higher order and nonlinear regularities of the data. A CRBM is a nonlinear generative model typically used for time-series data. It uses an undirected RBM model with visible neurons and hidden neurons that represent the observable data and dependencies between the latent variables, respectively. CRBMs can also effectively capture higher order regularities in the input feature space. As illustrated at (b) on the right side of FIG. 21, the visible variables v and binary latent variables h receive directed connections from neurons in the conditioning layer that account for the visible data at the last N timesteps. At any timestep, visible variables at the last N timesteps are concatenated into a "history" vector or a conditioning vector, which is denoted by u. Model parameters of the CRBM network are the weight and bias vectors associated with its visible, conditioning, and hidden layers. Like the RBM, an undirected weight $W_{ij}$ is assigned to the edge between the $i^{th}$ visible unit and the $j^{th}$ hidden unit of the CRBM network. Similarly, weights $A_{ki}$ and $B_{kj}$ are directed from the $k^{th}$ conditioning unit to the $i^{th}$ visible unit and the $j^{th}$ hidden unit, respectively. The static bias terms $b_i$ and $c_j$ are associated with the visible and hidden units, respectively. These static biases are utilized to compute the dynamic biases that express the net input from the "history" to the visible and hidden units.

A CRBM models the distribution p(v|u) by using an RBM network to model v and using the conditioning vector u to dynamically calculate the biases of that RBM. The energy function of the CRBM for a joint configuration of visible, hidden, and conditioning units is denoted by E(v, h, u) as given in Eq. (19). This energy function captures the conditional predictive interactions between both visible layer and the conditioning layer, along with the standard RBM interactions between the visible and the latent layer. Interactions between latent hidden layer and the conditioning layer are also captured by the CRBM energy function. A joint probability distribution over v and h and conditional on u is assigned by the CRBM model through its energy function as shown in Eq. (20), where Z(u) is the normalization factor also termed as the partition function. This partition function can be obtained by summing over all possible combinations of visible and hidden variables as shown in Eq. (21), but it is exponentially expensive to compute exactly. The joint probability distribution is analogous to the Gibbs or Boltzmann distribution for describing the probability that a system will be in a certain state as a function of that state's energy.

$$E(v, h, u) = -\sum_{i \in vis} b_i v_i - \sum_{j \in hid} c_j h_j - \tag{19}$$

$$\sum_{i \in vis, j \in hid} w_{ij} v_i h_j - \sum_{k \in cond, i \in vis} A_{ki} u_k v_i - \sum_{k \in cond, j \in hid} B_{kj} u_k h_j$$

$$p(v, h \mid u) = \frac{\exp(-E(v, h, u))}{Z(u)} \tag{20}$$

$$Z(u) = \sum_{v', h'} \exp(-E(v', h', u)) \tag{21}$$

Similar to a standard RBM, the CRBM model enjoys conditional independence properties. Additionally, due to the conditional independence between units of the same layer, the marginal probability of the visible variables conditional on its "history" can be obtained with Eq. (22), where F(v, u) denotes the associated free-energy. Eq. (23) defines the free-energy of the system, and it can be clearly seen that this free-energy can be easily computed without the latent hidden variables.

$$p(v \mid u) = \sum_{h'} \frac{\exp(-E(v, h', u))}{Z(u)} = \frac{\exp(-F(v, u))}{\sum_{v'} \exp(-F(v', u))} \tag{22}$$

28

-continued $$F(v, u) = -\log \sum_h \exp(-E(v, h, u)) = -\sum_{i \in vis} b_i v_i - \tag{23}$$

$$\sum_{k \in cond, i \in vis} A_{ki} u_k v_i - \sum_{j \in hid} \log\left(1 + \exp\left(c_j + \sum_{i \in vis} w_{ij} v_i + \sum_{k \in cond} B_{kj} u_k\right)\right)$$

Learning in CRBMs generally involves performing gradient ascent to maximize the log conditional likelihood of the observed or visible data. The log conditional likelihood can be defined as $\mathcal{L} = \log \Pi_t p(v^t|u)$, where $v^t$ denotes the visible data sample at timestep t. The gradients can be computed by partially differentiating the log conditional likelihood with respect to the model parameters as shown in Eqs. (24)-(28). Learning rules for model parameters can be derived by using these gradients in the gradient ascent step to maximize the log conditional likelihood.

$$\frac{\partial L}{\partial w_{ij}} = \langle v_i h_j \rangle_{data} - \langle v_i h_j \rangle_{model} \tag{24}$$

$$\frac{\partial L}{\partial A_{ki}} = \langle u_k v_i \rangle_{data} - \langle u_k v_i \rangle_{model} \tag{25}$$

$$\frac{\partial L}{\partial B_{kj}} = \langle u_k h_j \rangle_{data} - \langle u_k h_j \rangle_{model} \tag{26}$$

$$\frac{\partial L}{\partial b_i} = \langle v_i \rangle_{data} - \langle v_i \rangle_{model} \tag{27}$$

$$\frac{\partial L}{\partial c_j} = \langle h_j \rangle_{data} - \langle h_j \rangle_{model} \tag{28}$$

The terms $\langle \cdot \rangle_{data}$ and $\langle \cdot \rangle_{model}$ in the log conditional likelihood gradients represent the expectations of the input training data and the CRBM model, respectively. Computing the exact model expectations could be very computationally expensive. These model expectations can be approximately estimated through the contrastive divergence (CD) learning algorithm performed on a classical computer that is extensively used to train RBM and other energy-based models. In CD learning, a Gibbs chain is initialized at a training vector and runs for k steps to yield samples used to compute the model expectations. Although the k-step CD learning (CD-k) converges to the true gradients, a single-step (k=1) reconstruction is commonly implemented in practice for good enough performance. Due to the conditional independence properties of CRBM that lead to p(v|h, u) and p(h|v, u) being factorial over v and u, CD can be used to train a CRBM model. Other targeted algorithms proposed for training RBMs make use of persistent chains and could not be used to train CRBMs. Another important feature of CRBMs is that trained CRBMs can be stacked atop each other to form a DBN of the type disclosed herein. For a previously trained CRBM, the sequence of hidden state vectors generated from input training data samples can be treated as the new observable data for the following CRBM layer. Deeper CRBM levels of the DBN are capable of extracting higher order structure of the data, and could be used for complex applications in feature extraction.

Quantum Sampling

Quantum sampling can be carried out on an adiabatic quantum computing (AQC) device of the type described previously herein. AQC devices intrinsically realize a quantum annealing algorithm and are typically used to solve combinatorial optimization problems. In the context of optimization, AQC yields global minimum by exploring the low-cost solutions on the energy landscape via quantum tunneling. Computation in AQC proceeds by moving gradually from a low-energy state of the physical system to its ground state. This functionality in adiabatic optimization is exploited to evolve the quantum state towards the lowest energy state of the system, and is therefore used commonly to solve optimization problems. Despite some degree of AQC's guarantee of a global optimum under certain conditions, several non-ideal interactions exist between the quantum computer and its environment that highly influences the performance. Adiabatic computation is particularly susceptible to noise if the gap between the excited and ground quantum states is small. This phenomenon can be traced back to the presence of thermal fluctuations, material impurities, irregularities of electronic components, and others in an AQC device. Consequently, noisy and uncertain behavior of AQC devices can be used to approximately model data distributions. The use of AQC devices as a sampling engine has been inspired by some of the previous works in pattern recognition.

To conduct computational experiments, we use an AQC device offered by D-Wave systems that can be accessed over the cloud. These AQC devices adopt a quantum processing unit (QPU) with the quantum units termed as qubits interconnected in a special arrangement termed as the Chimera lattice. This architecture is not a fully connected graph, but instead is a bipartite graph of sparsely connected qubits. The problem formulation step for programming the QPU involves translating the nodes and edges of the objective or energy function to qubits and coupler strengths in the Chimera lattice of the QPU. The energy function in some embodiments takes the form of a quadratic unconstrained binary optimization (QUBO) problem. This process of mapping logical variables to physical qubits is called embedding, and is an important step in drawing samples from the AQC device. Results obtained by sampling the energy function, which describes a bipartite energy model like the RBM from this QPU with a predetermined quantum annealing schedule, are useful in training such energy models.

The embodiments to be described provide a hybrid QC-based deep learning framework for fault diagnosis of electrical power systems that combine the feature extraction capabilities of a CRBM with efficient classification of deep networks. Computational challenges stemming from complexities of such deep learning models are overcome by QC-based training methodologies that effectively leverage the complementary strengths of quantum assisted learning and classical training techniques. The example hybrid QC-based deep learning framework is tested on a simulated electrical power system with 30 buses and wide variations of substation and transmission line faults, to demonstrate the framework's applicability, efficiency, and generalization capabilities. High computational efficiency is enjoyed by the hybrid approach disclosed herein in terms of computational effort required and quality of model parameters over classical training methods. In addition, superior and reliable fault diagnosis performance with faster response time is achieved over state-of-the-art pattern recognition methods based on artificial neural network (ANN) and decision tree (DT) arrangements.

Fault analysis and diagnosis constitute an important aspect of electrical power systems and play a major role in handling severe failures caused by cascading effects of faults. Critical problems like blackouts and unwanted variations in voltages and currents can be avoided by taking timely protective actions, which require fast and accurate fault diagnosis approaches. This need motivates the research and development of new fault detection and diagnosis methods capable of detecting and identifying potential abnormalities in electrical power systems to minimize performance degradation. Several expert systems like rule-based methods for fault diagnosis of power systems have been previously proposed. However, such approaches have some limitations due to their inability to learn from errors and difficulty in acquiring knowledge from experts reliably. On the other hand, process history based fault diagnosis approaches do not require description of the underlying process operations to develop a mapping from inputs to corresponding outputs. Such pattern recognition methods are credited with improved efficiency and robustness to modeling errors in fault diagnosis of power systems.

QC has the potential to impact problems on a global scale and is bringing in a new wave of emerging computational technology. QC, which has attracted widespread attention from the scientific community in recent years, is a field that applies quantum mechanics theories to solve complex problems in a multitude of areas, including computational optimization and machine learning. Quantum computers promise exponential speedup over classical methods on certain problems, and have inspired development of quantum algorithms to solve large-scale real-world problems of practical importance. QC enhanced algorithms are gaining popularity for systems optimization. Apart from optimization, quantum machine learning has also been gaining traction with technological advancements in quantum hardware. Such quantum machine learning algorithms have been applied to pattern recognition, handwriting recognition, and quantum recommendation systems. Fast and accurate fault diagnosis can be achieved by quantum advantages offered by QC in terms of both speed and methods of operations. Despite their advantages and unique features, QC faces several computational limitations due to their rudimentary technological maturity. As a result, harnessing the complementary strengths of both quantum and classical computers to develop hybrid pattern recognition algorithms and overcome such limitations is a promising strategy for fault analysis and diagnosis.

Pattern recognition techniques have been widely used in fault detection and diagnosis of power systems owing to their ability of extracting useful features from process signals. Feature extraction plays an important role in capturing essential information from current and voltage signals to gain better awareness of required mapping for fault classification in pattern recognition techniques. Signal processing techniques based on Fourier transform can be used to extract suitable features and easily detect power system disturbances. Wavelet transform decomposes signals such that their characteristics in multiple frequency bands are revealed, making them a very popular choice of fault diagnosis methods in transmission lines. To ensure reliable operations of such methods, the choice of mother wavelet is fundamentally important and technically challenging. S-transform based techniques provide both temporal and spectral information that is useful in detecting transient disturbances. Fault classification can be performed by setting thresholds on the extracted features and requires over 30 ms in many cases. Therefore, detecting and accurately classifying faults as fast as possible has received significant attention from researchers.

The ability of an ANN and its variants to learn new nonlinear relationships and generalize previously unseen data can be applied to solve complex problems in power systems. ANN and its variants have been popularly used for fault classification in transmission lines and distribution systems. Apart from longer training times required to train such ANN based models, various design and performance parameters should be empirically determined to ensure efficiency of such approaches. SVMs due to their ability to use multiple classes and mapping to higher dimensions have also been used in fault diagnosis of power systems. Other tree like graphs like DTs can accurately classify faults in reasonable reduced times. Hybrid approaches that combine the feature extraction capabilities of signal processing methods with classification techniques demonstrate higher fidelity in fault diagnosis of electrical power systems. Wavelet transform technique integrated with an ANN results in a computationally efficient fault diagnosis method capable of recognizing and classifying different power disturbances efficiently.

Hybrid fault diagnosis approaches that combine effective feature extraction techniques with high fidelity classification space are demonstrated to be more computationally efficient and viable for fault diagnosis applications in power systems. Special types of ANNs like RBMs and CRBMs are state-of-the-art feature extractor models. There arises a need to integrate such feature extractor models with ANNs in classification space to develop more effective deep learning models for fault diagnosis of electrical power systems. To overcome the training inefficiencies of such hybrid models, high-performance training methodologies should be developed that are capable of overcoming limitations of conventional learning paradigms carried out on classical computers.

There are several research challenges associated with developing hybrid QC-based deep learning framework for effective fault diagnosis. The first challenge is to develop a fault diagnosis framework that seamlessly integrates effective feature extractor models with state-of-the-art techniques in decision and classification space to form deep learning architectures. Due to the need for fast and accurate diagnosis performance, a further challenge lies in developing a fast training strategy that leverages both QC and classical computers for obtaining a better quality of estimates for parameters of such deep learning architectures. The third challenge is to overcome shortage of data volume and diversification that could hinder the performance of fault diagnosis models of electrical power systems. The final challenge is to ensure the scalability of the hybrid QC-based deep learning framework, so that their computational performance and effectiveness are not compromised when dealing with large-scale case studies.

The illustrative embodiments to be described provide a hybrid QC-based deep learning framework for fault diagnosis of electrical power systems that effectively extract suitable features from time-series data using a CRBM network. Generatively training the CRBM network using classical learning techniques can be computationally intensive. Therefore, we train the CRBM network with a learning algorithm assisted by a quantum computer that yields better quality of optimal model parameters of the CRBM network. The superior feature extraction capabilities of the CRBM are combined with discriminative learning to identify the unknown state of measured data samples with high fidelity. To demonstrate the applicability of illustrative embodiments of the hybrid QC-based deep learning framework disclosed herein, we use a standard case study based on an IEEE 30-bus system that is commonly used to test concepts and methodologies in power systems. Simulated fault data with wide variations of substation and transmission line faults is used to test the reliability and efficiency of the disclosed framework on large-scale electrical power system. The obtained fault diagnosis results for both case studies are compared against state-of-the-art ANN and DT based fault diagnosis methods implemented on a classical computer.

Aspects of the illustrative embodiments to be described include a hybrid QC-CRBM fault diagnosis framework for accurately identifying faults in electrical power systems. In addition, computational complexities of the classical learning algorithm for the CRBM network are overcome by use of a quantum generative training technique assisted by quantum sampling. A case study on application of illustrative embodiments to the IEEE 30-bus test system is described, with detailed comparisons between classical and quantum machine learning techniques, as well as comparison between the example hybrid framework as disclosed herein and state-of-the-art fault diagnosis techniques.

Hybrid QC-CRBM Fault Diagnosis Framework

Fault diagnosis tasks largely depend on feature extraction from the measured signals. The extracted feature characteristics directly contribute towards the effectiveness of fault detection and identification. Classification accuracy of such fault diagnosis methods may be affected by the different features extracted from different feature extraction methods. This accentuates the need for better and automatic feature learning capabilities in fault diagnosis applications. Energy based models like RBM and CRBM are capable of learning hierarchical representations of measured data and could be used for such feature extraction tasks. CRBMs can effectively model short-term temporal structures and are suitable choices to model multivariate time-series data. Use of such complex models in fault diagnosis requires large amounts of computation and training time, and further increases the computational complexity. To address this challenge, we develop a hybrid QC-based deep learning framework for fault diagnosis that integrates the temporal feature extraction of CRBM with QC-enhanced training strategy without the expense of lower computational efficiency and accuracy.

Implementation and use of the disclosed fault diagnosis framework in illustrative embodiments herein involve two sequential phases, offline training, and online fault classification.

Figure 22:
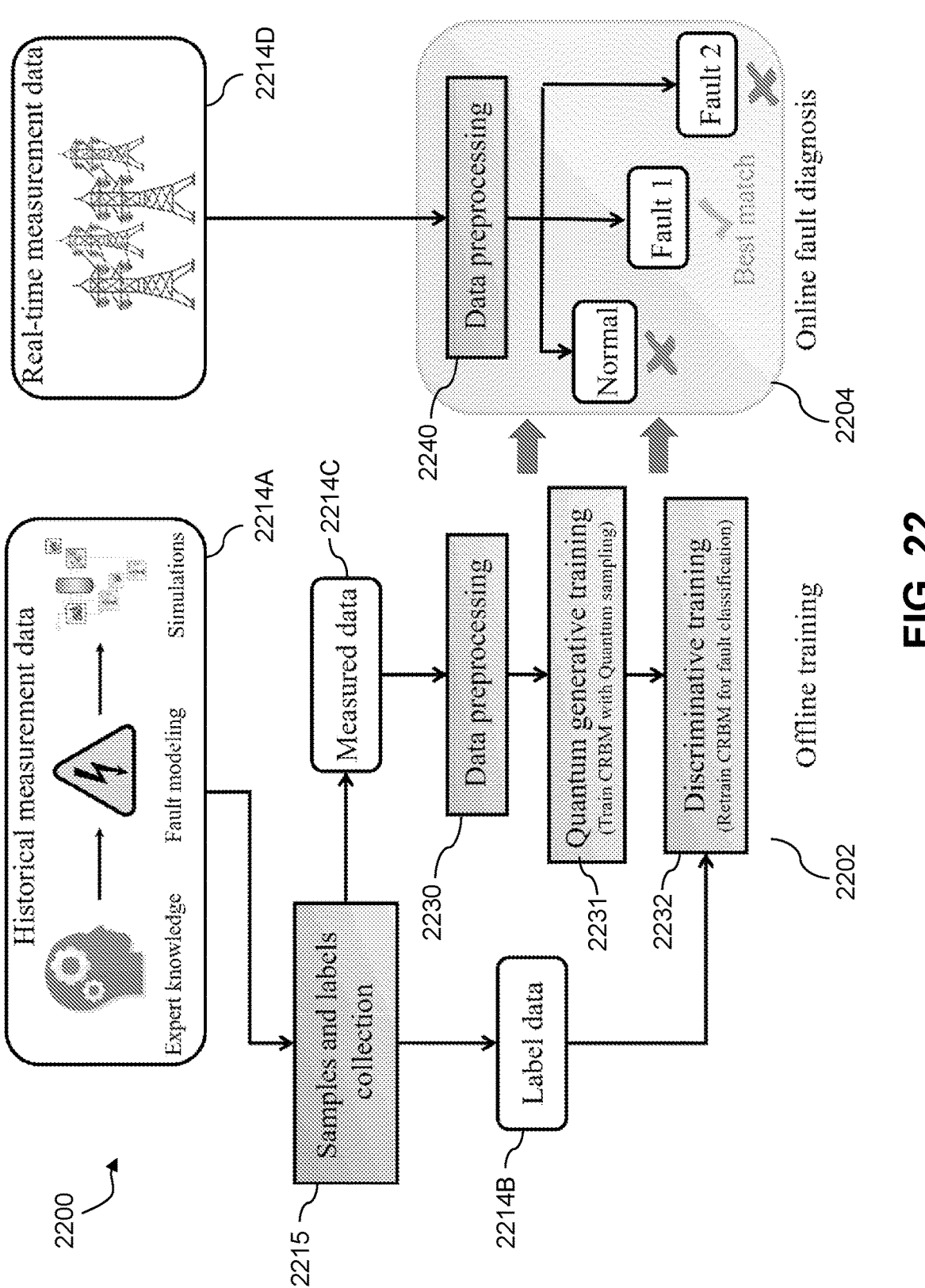
FIG. 22 shows an implementation of an example hybrid QC-CRBM fault diagnosis framework.

FIG. 22 shows an information processing system 2200 that implements a functional flow of an example hybrid QC-CRBM fault diagnosis framework in an illustrative embodiment. The information processing system 2200 utilizes historical measurement data 2214A, label data 2214B, measured data 2214C and real-time measurement data 2214D. A samples and labels collection operation 2215 is used to generate label data 2214B and measured data 2214C using the historical measurement data 2214A. The information processing system 2200 includes an offline training phase 2202 and an online fault diagnosis phase 2204. The offline training phase 2202 includes data preprocessing 2230, quantum generative training 2231 and discriminative training 2232, and the online fault diagnosis phase 2204 includes data preprocessing 2240, and discriminates between a normal state and at least two different fault states as shown.

In this embodiment, dynamic simulations guided by expert knowledge of power systems and fault models are used to collect historical training data for the offline training phase 2202. The simulated data could also be substituted by real-world sensor data recorded during both normal operation and system failures. It is important to note that availability of such real-world labeled data could be scarce, and an informed decision should be made with respect to the type of historical training data used. Labeled measured data samples serve as input for the training process of the hybrid deep learning model.

The architecture of the hybrid QC-CRBM fault diagnosis framework is described in further detail below. The trained fault diagnosis model can be tested on both simulated and real-time measured data samples. Testing on simulated data samples ensures the viability of the trained model in the absence of labeled real-world measured data samples.

Primary components of the offline training phase 2202 in building the hybrid QC-CRBM fault diagnosis framework are quantum generative training 2231 followed by discriminative training 2232. Quantum generative training 2231 is an automatic unsupervised learning technique that uses unlabeled measured data and is also described in detail below. Labeled historical process data samples are used by the discriminative training 2232 for training the hybrid QC-CRBM fault diagnosis framework in a supervised manner to identify their state and classify them into normal or a specific faulty class. Additional description is provided below for the discriminative training 2232 of the offline training phase 2202. The trained fault diagnosis model can then be used to classify the states of the measured data.

Model Architecture

To overcome complexities associated with temporal pattern recognition and classification, a CRBM network architecture is used to extract data abstractions from multi-dimensional time-series measurement data.

Figure 23:
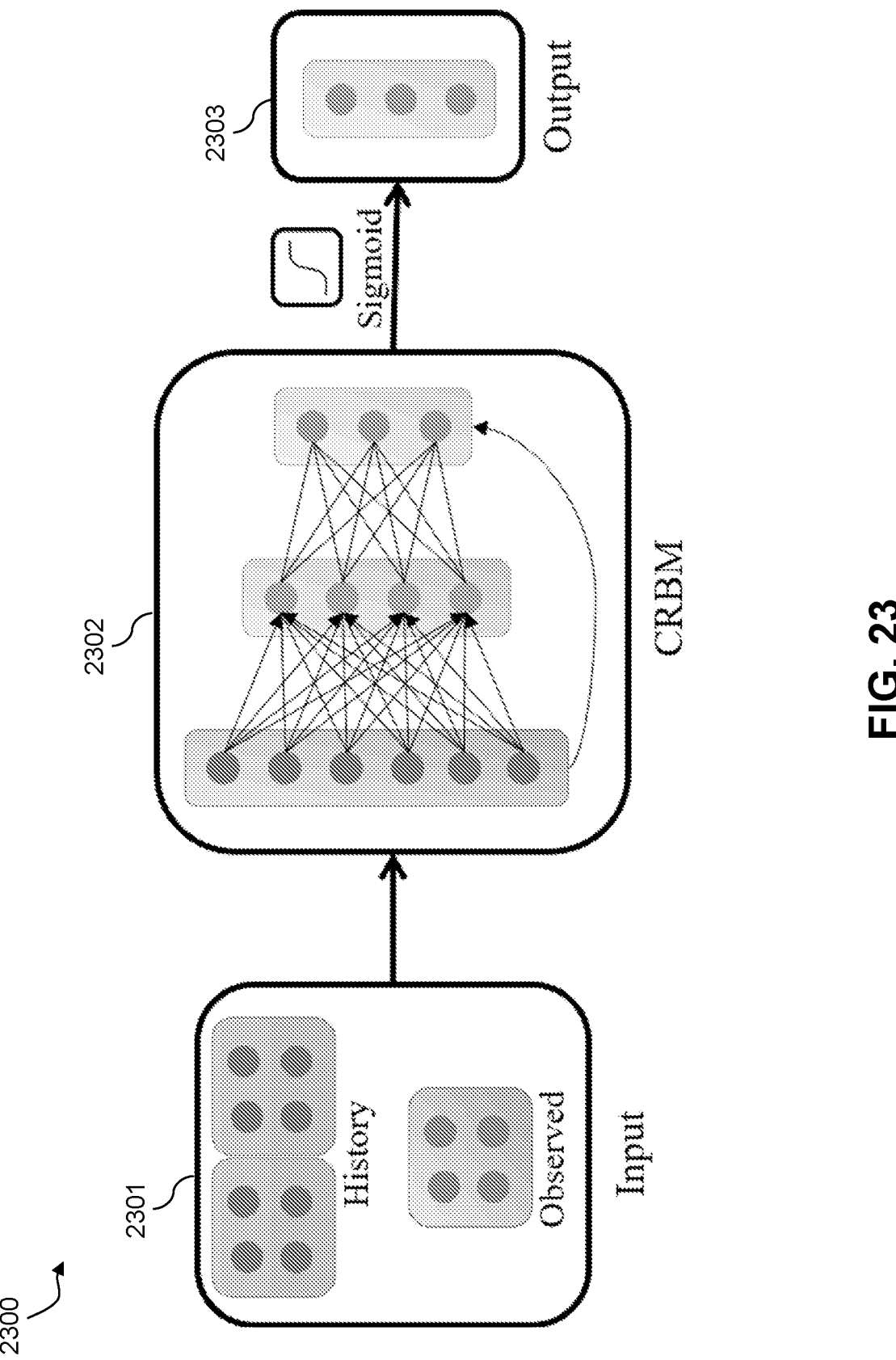
FIG. 23 shows a model architecture used in the hybrid QC-CRBM fault diagnosis framework during the quantum generative training phase.

FIG. 23 shows an example DBN 2300 in which input 2301 is applied to a CRBM 2302 that generates output 2303. The input data to the CRBM 2302 comprises two sets of inputs, namely observed data samples $x_o$ and history data samples $x_h$. The history data samples $x_h$ illustratively comprises a set of N observed data samples immediately prior to the current observed data sample. This pairing of conditional and observed data samples is utilized to allow the CRBM 2302 to learn the temporal aspects of the data representations as mentioned above. The CRBM 2302 is a nonlinear generative model typically used for time-series data. It uses an undirected RBM model with visible neurons and hidden neurons that represent the observable data and dependencies between the latent variables, respectively. The CRBM 2302 can also effectively capture higher order regularities in the input feature space. The CRBM 2302 is also referred to herein as a CRBM network, and is an illustrative example of what is more generally referred to herein as a "deep belief network" or DBN.

As previously described in conjunction with FIG. 21, the visible variables v and binary latent variables h receive directed connections from neurons in the conditioning layer that account for the visible data at the last N timesteps. At any timestep, visible variables at the last N timesteps are concatenated into a "history" vector or a conditioning vector, which is denoted by u. Model parameters of the CRBM network are the weight and bias vectors associated with its visible, conditioning, and hidden layers. Like the RBM, an undirected weight $W_{ij}$ is assigned to the edge between the $i^{th}$ visible unit and the $j^{th}$ hidden unit of the CRBM network. Similarly, weights $A_{ki}$ and $B_{kj}$ are directed from the $k^{th}$ conditioning unit to the $i^{th}$ visible unit and the $j^{th}$ hidden unit, respectively. The static bias terms $b_i$ and $c_j$ are associated with the visible and hidden units, respectively. These static biases are utilized to compute the dynamic biases that express the net input from the "history" to the visible and hidden units.

The CRBM network in the hybrid QC-CRBM fault diagnosis model contains directed conditional links between the conditioning layer and the hidden as well as the visible layers. Undirected links are also present between the hidden and the visible layers to allow for input data reconstruction.

For d dimensional observed data samples and their corresponding Nd dimensional conditional data samples, a CRBM network can be constructed with associated weights and dynamic biases as the model parameters. Weights $A_g \in \mathbb{R}^{Nd \times d}$ and $B_g \in \mathbb{R}^{Nd \times m}$ denote the directed weights between units in the conditional layer and the visible units, and between conditional units and hidden units, respectively, where m latent units are present in the hidden layer. $W_g \in \alpha^{d \times m}$ represent the weight matrix associated with the connections between the visible and the hidden layer. Additionally, the visible and hidden bias vectors $b_g \in \mathbb{R}^d$ and $c_g \in \mathbb{R}^m$ together with the weights form the CRBM model parameters.

$$P(h=1|v,\ u)=\sigma(v \cdot W_g + u \cdot B_g + c_g) \tag{29}$$

$$P(v=1|h,\ u)=\sigma(h \cdot W_g^T + u \cdot A_g + b_g) \tag{30}$$

The local conditional output probabilities can be easily computed using standard sigmoid function as shown in Eqs. (29) and (30), where $\sigma(x)=1/(1+e^{-x})$. Output samples can be obtained by sampling from a binomial distribution with a single trial and success probabilities calculated by Eq. (29). Similarly, conditional probabilities computed through Eq. (30) can be used to draw samples that serve as a reconstruction of the original data vector. With all defined sets of inputs, outputs, and model parameters, the CRBM network in the hybrid QC-CRBM fault diagnosis framework is trained in an unsupervised generative manner.

Figure 24:
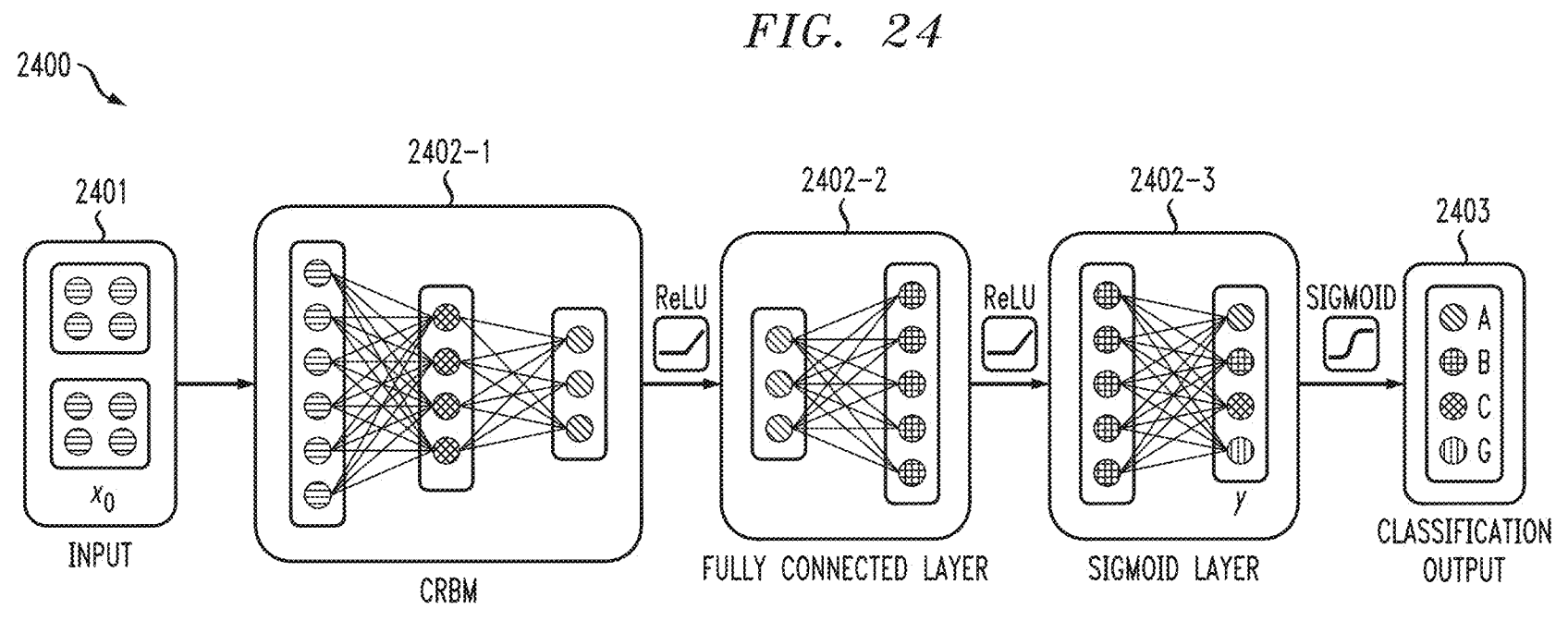

FIG. 24 illustrates an example multi-layer network architecture 2400 that includes a DBN implemented as a CRBM. In the multi-layer network architecture 2400, input 2401 is applied to a CRBM 2402-1 that operates as a DBN. The CRBM 2402-1 generates outputs that are applied to one or more additional network layers, illustratively including a fully connected layer 2402-2 and a sigmoid layer 2402-3, which generate a classification output 2403. The fully connected layer 2402-2 and the sigmoid layer 2402-3 are also referred to as classification layers of the multi-layer network architecture 2400, and collectively provide a classification network within the multi-layer network architecture 2400.

Discriminative training is performed on the classification network that classifies the input data sample into normal or one of the multiple fault types. It is also important to note that the directed links between the conditioning layer and hidden layer in the trained CRBM network are removed during the discriminative training phase. As noted above, the fully connected layer 2402-2 followed by the sigmoid layer 2402-3 constitute the classification layers in this illustrative embodiment. Classification output 2403 of the classification network indicates the fault type associated with the input pattern. We use binary coding to characterize presence (1) or absence (0) of one or more phases A, B and C and of the ground G as shown in classification output 2403. This step is described in detail below. On the model loss landscape, generative training helps locate the local neighborhood of a good optimum, while discriminative training further refines the optimal model parameters.

Quantum Generative Training

Energy based models like the CRBM are often trained with the contrastive divergence (CD) algorithm and its variants. However, CD is a biased algorithm that could result in poor estimates of the log conditional likelihood gradients. In some cases, CD may not even converge and fail to yield maximum likelihood estimates of the model parameters. Although some improved variants of the CD algorithm demonstrate better convergence properties, the improvement is achieved at the expense of added computational cost. To overcome such limitations of the CD algorithm, we train the CRBM network in the hybrid QC-CRBM fault diagnosis framework with a new quantum generative training technique disclosed herein. In this quantum assisted learning technique, model expectations utilized to compute log conditional likelihood gradients are estimated through quantum sampling. Additional detailed description of quantum sampling is provided elsewhere herein.

Figure 25:
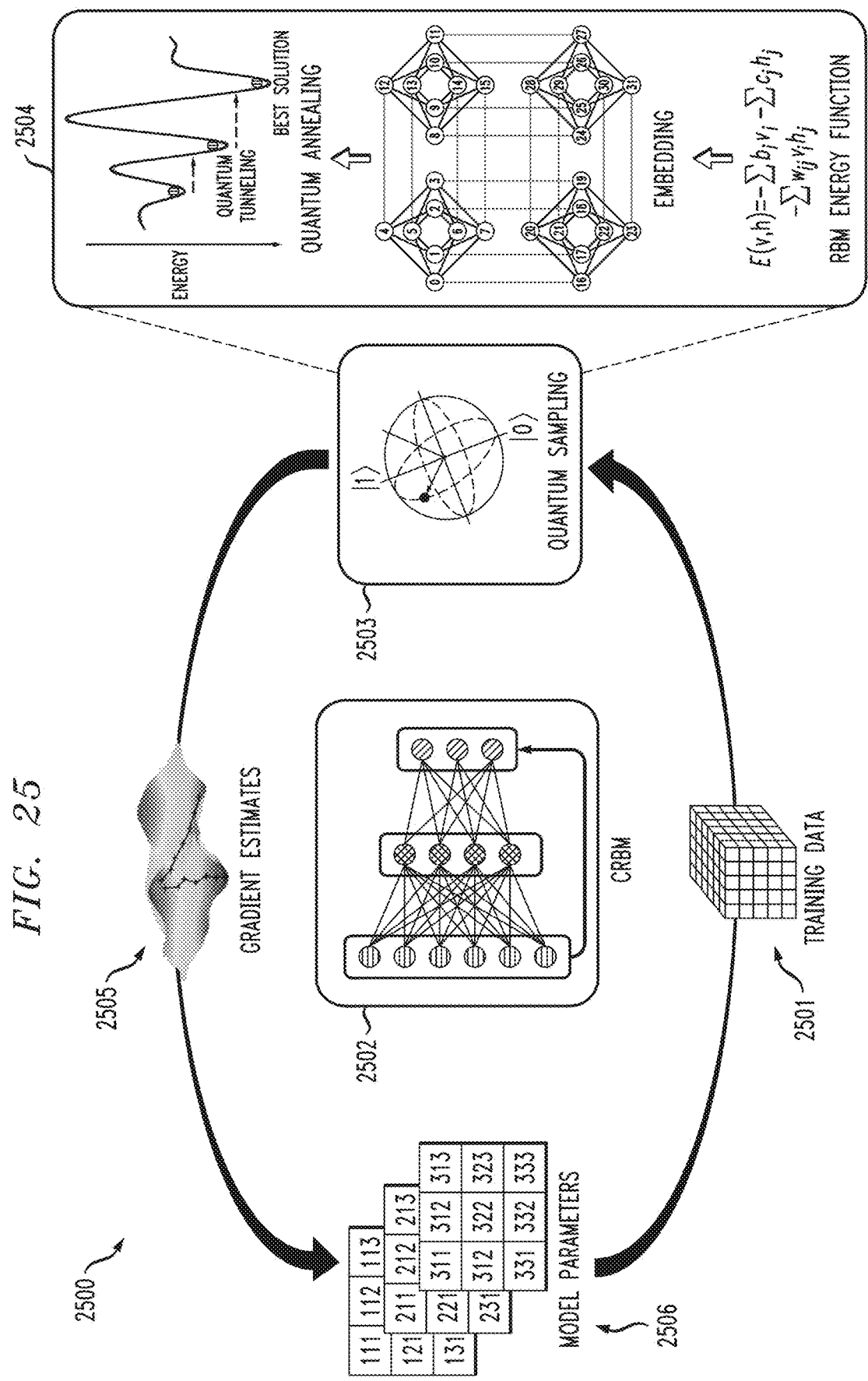
FIG. 25 shows an overview of an example quantum generative training technique.

FIG. 25 provides an overview of the above-noted quantum generative training technique. In this example, a process 2500 is used to provide quantum generative training of a CRBM 2502. The process 2500 makes use of quantum sampling 2503 in conjunction with quantum annealing, embedding and an RBM energy function, as indicated at 2504. The process 2500 further utilizes training data 2501, gradient estimates 2505 and model parameters 2506.

Weights of the CRBM network in the hybrid QC-CRBM fault diagnosis framework are initialized randomly, while the biases are initialized as zero vectors. As mentioned elsewhere herein, the data expectations $\langle \cdot \rangle_{data}$ can be easily calculated by computing the average of the latent output variables of the CRBM network for every pair of observed and historical data vector. Model expectations $\langle \cdot \rangle_{model}$ utilized to estimate the log conditional likelihood gradients are calculated through the quantum sampling technique described elsewhere herein. Evidence from experiments conducted with AQC devices has confirmed that such devices approximately sample from a Boltzmann distribution under certain conditions. A subgraph of the CRBM network is an RBM network with an energy function given in Eq. (31). Sampling the RBM energy function from an AQC device illustratively involves embedding of $E_{RBM}$ on the Chimera lattice of the QPU. As the RBM energy function takes the form of a quadratic unconstrained binary optimization problem, the visible and hidden variables can be mapped as physical qubits on the QPU. Final states of the qubits can be effectively described by a Boltzmann distribution, which allows us to approximately model the joint probability distribution of visible and hidden units as shown in Eq. (32).

$$E_{RBM}(v,h) = -\sum_{i \in vis} b_g^i v_i - \sum_{j \in hid} c_g^j h_j - \sum_{i \in vis, j \in hid} W_g^{ij} v_i h_j \quad (31)$$

$$p(v,h|u) \propto \exp(-E_{RBM}(v,h)) \quad (32)$$

It is important to note that, the strength of couplings and fields that translate to the weights and biases of the RBM should be sufficiently small for approximation by quantum sampling. It is also a good idea to use the same embedding scheme as described elsewhere herein for every step of the training process to maintain the quality of the drawn samples. Assuming that $N_q$ samples are drawn from the QPU for the corresponding energy function, the model parameters of the CRBM network are updated based on Eqs. (33)-(37). At every step of the quantum generative training process, the model parameters are updated for every mini-batch of training data to introduce stochasticity in gradient ascent. This ensures that the model parameters are not stuck at a local optimum and utilizes less physical memory.

$$W_g^{ij} \leftarrow \alpha W_g^{ij} + \varepsilon \left( \langle v_i h_j \rangle_{data} - \frac{1}{N_q} \sum_{QC} v_i h_j \right) \quad (33)$$

-continued $$A_g^{ki} \leftarrow \alpha A_g^{ki} + \varepsilon \left( \langle u_k v_i \rangle_{data} - \langle u_k \rangle_{data} \frac{1}{N_q} \sum_{QC} v_i \right) \quad (34)$$

$$B_g^{kj} \leftarrow \alpha B_g^{kj} + \varepsilon \left( \langle u_k h_j \rangle_{data} - \langle u_k \rangle_{data} \frac{1}{N_q} \sum_{QC} h_j \right) \quad (35)$$

$$b_g^i \leftarrow \alpha b_g^i + \varepsilon \left( \langle v_i \rangle_{data} - \frac{1}{N_q} \sum_{QC} v_i \right) \quad (36)$$

$$c_g^j \leftarrow \alpha c_g^j + \varepsilon \left( \langle h_j \rangle_{data} - \frac{1}{N_q} \sum_{QC} h_j \right) \quad (37)$$

Discriminative Training

Following the quantum generative training of the CRBM network, discriminative training is performed in a supervised manner to refine the obtained model parameters, and is also referred to as fine-tuning. The abstractions extracted from the CRBM network that describe the measured data representations and their conditional dependence on historical data are used to identify the state of the input measured data samples.

The architecture of the classification network of the hybrid QC-CRBM fault diagnosis framework used to detect the state of the measured data was previously described in conjunction with FIG. 24. Only windowed measurement data and their labels are considered for discriminatively training the classification network. The CRBM network with model parameters $A_g \in \mathbb{R}^{Nd \times d}$, $b_g \in \mathbb{R}^d$, $W_g \in \mathbb{R}^{d \times m}$, and $c_g \in \mathbb{R}^m$ forms the first fully connected layer of the classification network. It should be noted that these have already been relatively optimized through the quantum generative training and will be fine-tuned through discriminative training. After removing the directed links between conditioning layer and the hidden layer, the CRBM network is treated as a feed-forward neural network with a rectified linear unit (ReLU) as the activation. An additional fully connected layer is connected to the CRBM network, where each input neuron is connected to every hidden unit, in order to learn nonlinear combinations of the extracted features. $W_d \in \mathbb{R}^{m \times p}$ and $c_d \in \mathbb{R}^p$ form the weights and biases of the second fully connected layer. A ReLU is used as the activation function for this fully connected layer in the classification network. Finally, a sigmoid layer with weights $W_s \in \mathbb{R}^{p \times 4}$ and biases $c_s \in \mathbb{R}^4$ is used to predict class scores for each category that the observed data sample could belong to. The final sigmoid layer uses four units that correspond to the three phases and ground to indicate whether that particular component is involved in the fault or not.

$$y = W_s(\text{ReLU}(W_d(\text{ReLU}(W_g x_o + c_g)) + c_d)) + c_s \quad (38)$$

$$P_i = \frac{1}{1 + \exp(-y_i)} \quad (39)$$

Model parameters of the classification network are fine-tuned and optimized by updating them sequentially, utilizing the gradients of the loss function computed at each step with the backpropagation technique. State of the input training pattern $x_o$ is predicted using calculated probabilities as shown in Eqs. (38) and (39). A threshold of 0.5 is used to determine the four binary labels associated with the presence of one or more phases and ground in the corresponding fault type. In supervised learning, binary cross entropy between the predicted and true labels is minimized. Discriminatively training the classifier network in the hybrid QC-CRBM network yields the model parameters that minimize the total binary cross entropy loss. The trained model can then be used to predict the unknown state of measured data samples by identifying the presence of phases and ground in the faults. Hyperparameters of the hybrid QC-CRBM fault diagnosis framework also need to be optimized to yield the best model performance denoted by higher fault detection rates and lower false alarm rates. Hyperparameters like number of hidden units in the CRBM network, size of fully connected layers, number of training steps, and others can be chosen with a standard grid search approach.

Case Study: IEEE 30-Bus System

To demonstrate the scalability and performance of illustrative embodiments of the hybrid QC-CRBM fault diagnosis framework for large-scale electric power systems, we apply the disclosed fault diagnosis framework to an IEEE 30-bus test system. This electrical power system is widely used to test ideas and concepts by researchers.

Figure 26:
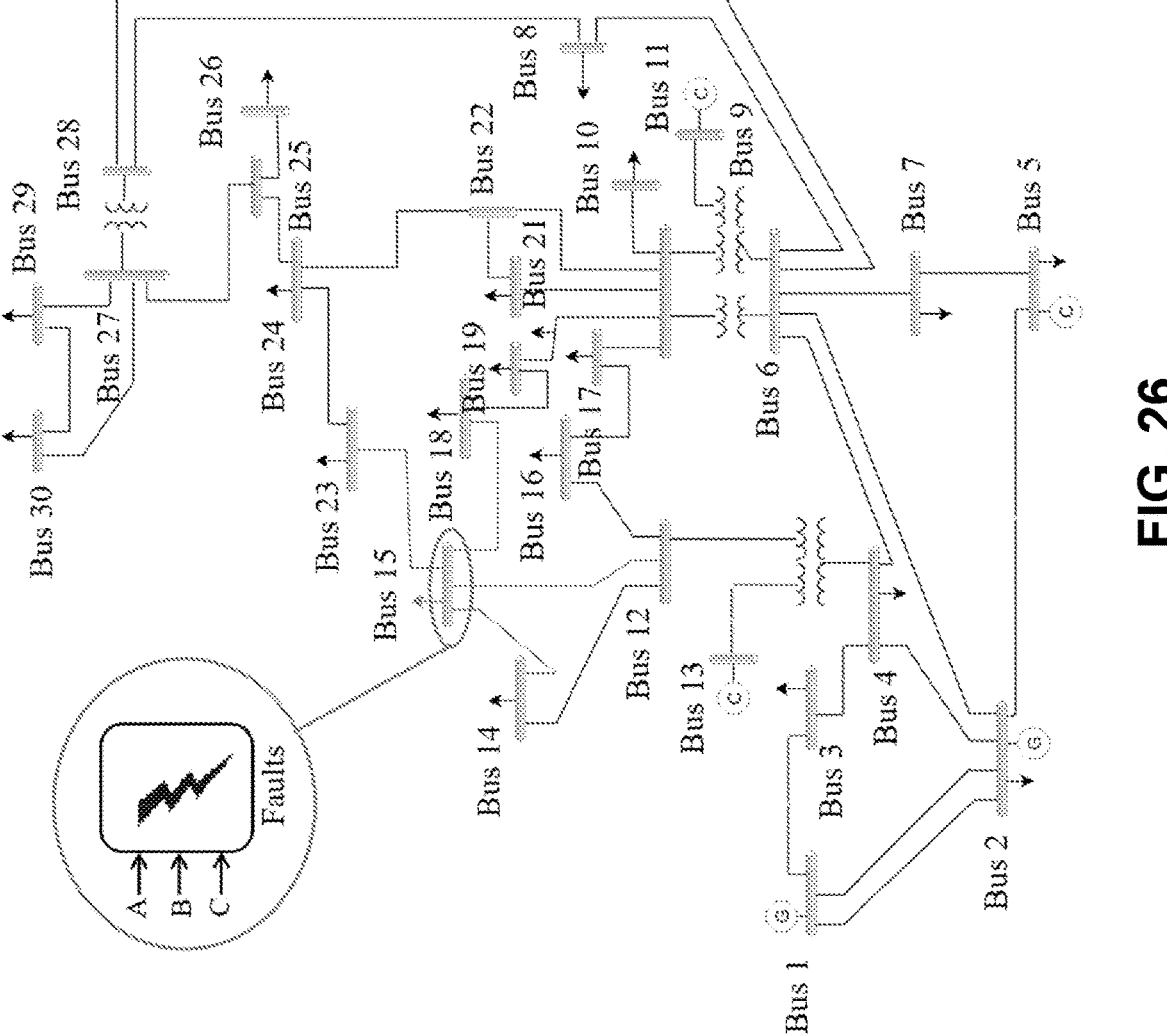
FIG. 26 shows an IEEE 30-bus system utilized as an example monitored system in illustrative embodiments.

FIG. 26 shows the configuration of the IEEE 30-bus test system 2600. The IEEE 30-bus system consists of 30 buses, 41 transmission lines, five generators and synchronous condensers, and transformers. Data for the IEEE 30-bus test system is available in the IEEE power systems test case archive. These data are used to build a simulation for the IEEE 30-bus system with the Simulink tool in MATLAB. This power system is operated at 50 Hz. A sampling frequency of 1000 Hz is used to record voltage and current samples at each substation generating 20 samples in one cycle duration. Specifically, ten different types of symmetrical and unsymmetrical faults are simulated in the case study as shown in FIG. 26 to collect labeled faulty data along with normal measured data samples.

Training and Testing Procedures

Both training and testing data are collected from simulations to train and evaluate the hybrid QC-CRBM fault diagnosis model, respectively. Three phase voltage and current data recorded at each bus account for the process variables in the IEEE 30-bus simulation. Along with substation faults at bus 15, transmission line faults are also created on lines connecting bus 15 to substations 12, 14, 18, and 23. For the training scenarios, faults are generated at 5, 10, 15, . . . , 95% of their overall transmission length. During the simulation, the fault resistances are varied over 1, 5, 10, 50, 100Ω. Overall 385 training scenarios are generated for each fault type. Similarly, faulty testing scenarios are generated at 10 random distances on each of the four transmission lines with fault resistances varied over 2.5, 25, and 75Ω. The number of test patterns generated is 123 for each fault type. Input patterns for both training and testing set are generated by windowing consecutive voltage and current samples for a fixed window length at a specific interval. This is done to ensure that fault classification remains accurate even if the disclosed hybrid QC-CRBM fault diagnosis model in some embodiments makes a mistake for some windows. Finally, the training dataset comprises of 5,320 measured input data samples for normal and faulty states of each fault type. Similarly, the testing dataset comprises of 1,080 measured data samples for each faulty state.

Model Formulation

Simulated measurement data including both normal and faulty operations are normalized by the value of smallest and largest observations during the normal operation. These datasets are further processed to form observed and historical sets, and are used to train the CRBM network of the hybrid QC-CRBM fault diagnosis framework. The historical dataset is generated by concatenating normalized measured data at N=5 previous timesteps for every observed measured data sample. Based on the dimensions of the training data, hyperparameters for the hybrid QC-CRBM fault diagnosis framework to detect and diagnose faults in the IEEE 30-bus system are adjusted. There are 90 visible units corresponding to three phase voltage measurements at all buses, and 450 conditioning units accounting for conditioning layer of the CRBM network. The total number of latent units in the hidden layer is set to 20. The CRBM network is then trained in an unsupervised generative manner to learn data representations of the time-series data. The unsupervised generative training is carried out by sampling the corresponding RBM energy function on an AQC device. The RBM energy function is embedded on the QPU by determining the Chimera embedding in a heuristic manner. However, an empty embedding may be returned in some instances due to the larger size of the energy function. Therefore, in some embodiments, a valid embedding scheme is recorded for future use. Training data is divided into mini-batches of size 1000, and a learning rate of $\varepsilon=0.01$ is used for the generative training. The momentum for weight update rules is set to $\alpha=0.9$. The previously recorded Chimera embedding scheme is reused to sample the RBM energy function from the QPU in order to minimize unnecessary variance in the log conditional likelihood gradient estimates. To visualize the training progress of the CRBM network, difference between free-energy F(v, u) of the network for training data and reconstructed training data is computed and recorded at each step of the quantum generative training process.

Discriminatively training the classifier network of the hybrid QC-CRBM fault diagnosis framework in a supervised manner utilizes labeled data samples, which are collected through simulations. Following the CRBM network as a feedforward network, 64 units are used for the next fully connected layer. Classifier network is then trained to identify the state of the windowed measured data samples by minimizing the binary cross entropy loss between the predicted and true labels. A learning rate of 0.001 is used by the Adam optimizer to achieve this. Discriminative training proceeds until training loss converges. After that, the trained hybrid QC-CRBM fault diagnosis framework is evaluated with the previously collected testing measurement data.

Computational Results

The scalability and applicability of the formulated hybrid QC-CRBM fault diagnosis framework is illustrated by conducting computational experiments with the IEEE 30-bus test system. Generative training of the CRBM network is carried out by performing quantum sampling on a D-Wave 2000Q quantum processor. This QPU provides access to 2,048 qubits and 5,600 couplers that can be used to sample the energy function. At every step of the quantum generative training, the number of samples drawn is equal to the size of mini-batch by running the QPU for an anneal time of 20 μs. Discriminative training of the classifier network in the formulated hybrid QC-CRBM fault diagnosis framework is carried out on a Dell Optiplex system with Intel Core™ i7-6700 3.40 GHz CPU and 32 GB RAM. The same classical computing system is used to carry out other programming functions as well.

As previously stated, performing generative learning exactly is a computationally intensive task. To demonstrate that an illustrative embodiment of the quantum generative training technique scales with the size of the CRBM network, we compare its training performance with the CD algorithm. For comparison purposes, another instance of the CRBM network is trained with the CD algorithm implemented on a classical computer.

Figure 27:
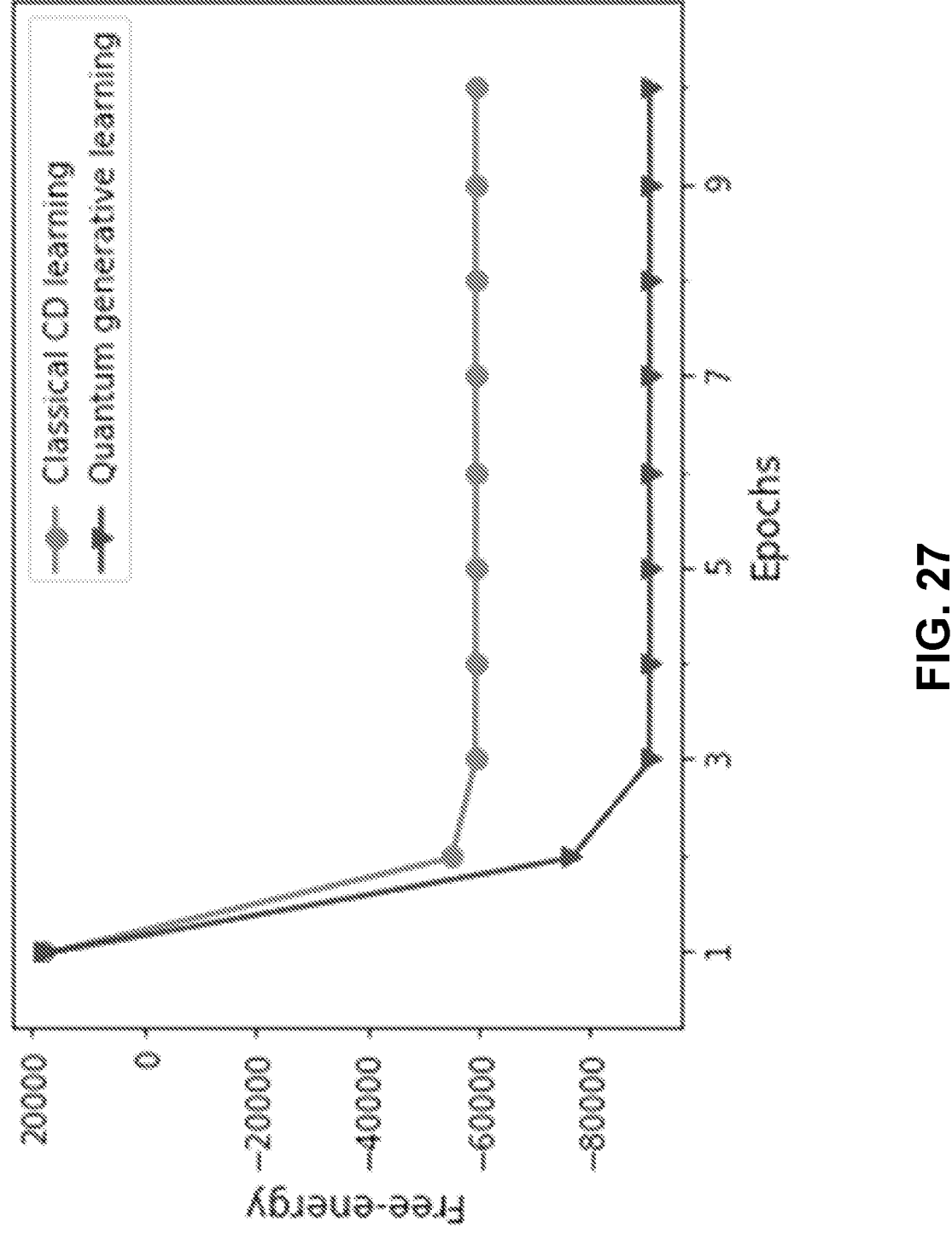
FIG. 27 illustrates a comparison between free energy curves obtained with quantum generative training and classical contrastive divergence (CD) learning.

FIG. 27 shows loss curves representing the free-energy difference between training data and reconstructed data for both quantum generative training and classical CD learning. Although the loss curves converge to different free-energy values, their profiles are fairly similar. The different free-energy values at convergence play an important role in determining the quality of learning. Clearly, the CD algorithm converges to a free-energy significantly higher than fault along with the corresponding FARs, and are reported in Table 4. We also compare the hybrid QC-CRBM fault diagnosis framework with an ANN-based fault classification method along with a DT-based method for the fault diagnosis of IEEE 30-bus test system. Fault diagnosis results for the hybrid QC-CRBM fault diagnosis framework generatively trained classically with CD are also presented in Table 4.

TABLE 4

| Computational results of the IEEE 30-bus system case study | | | | | | | |
|---|---|---|---|---|---|---|---|
| | | | | | | Hybrid QC-CRBM fault diagnosis model | |
| | Artificial neural network | | Decision tree | | Classical CD learning | | Quantum generative training | |
| Fault type | MDR (%) | FAR (%) | MDR (%) | FAR (%) | MDR (%) | FAR (%) | MDR (%) | FAR (%) |
| ABC/BCG | 2.2 | 95.3 | 3.1 | 85.83 | 100 | 0 | 0.37 | 0 |
| AG | 2.9 | 0 | 20.0 | 0 | 100 | 0 | 0 | 0 |
| BG | 29.4 | 0 | 20.0 | 0 | 100 | 0 | 0 | 0 |
| CG | 18.8 | 0 | 7.6 | 0.33 | 100 | 0 | 0 | 0 |
| AB | 0.2 | 0 | 20.0 | 8.33 | 100 | 0 | 0.09 | 0 |
| AC | 0 | 1.75 | 92.3 | 1.0 | 100 | 0 | 0 | 0 |
| BC | 0.09 | 2.87 | 20.0 | 4.5 | 100 | 0 | 0 | 0 |
| ABG | 9.5 | 0 | 0 | 0 | 100 | 0 | 0.09 | 0 |
| ACG | 10.1 | 0 | 18.2 | 0 | 100 | 0 | 1.75 | 0 |
| BCG | 2.9 | 0 | 9.3 | 0 | 100 | 0 | 0 | 0 | that of quantum generative training. Due to poor estimates of the gradient in the CD technique, it gets stuck at a local optimum. On the other hand, the disclosed quantum generative training method provides better quality estimates of log conditional likelihood gradients and converges to a better optimum. This yields better quality of the maximum likelihood estimates of the CRBM model parameters.

Figure 28:
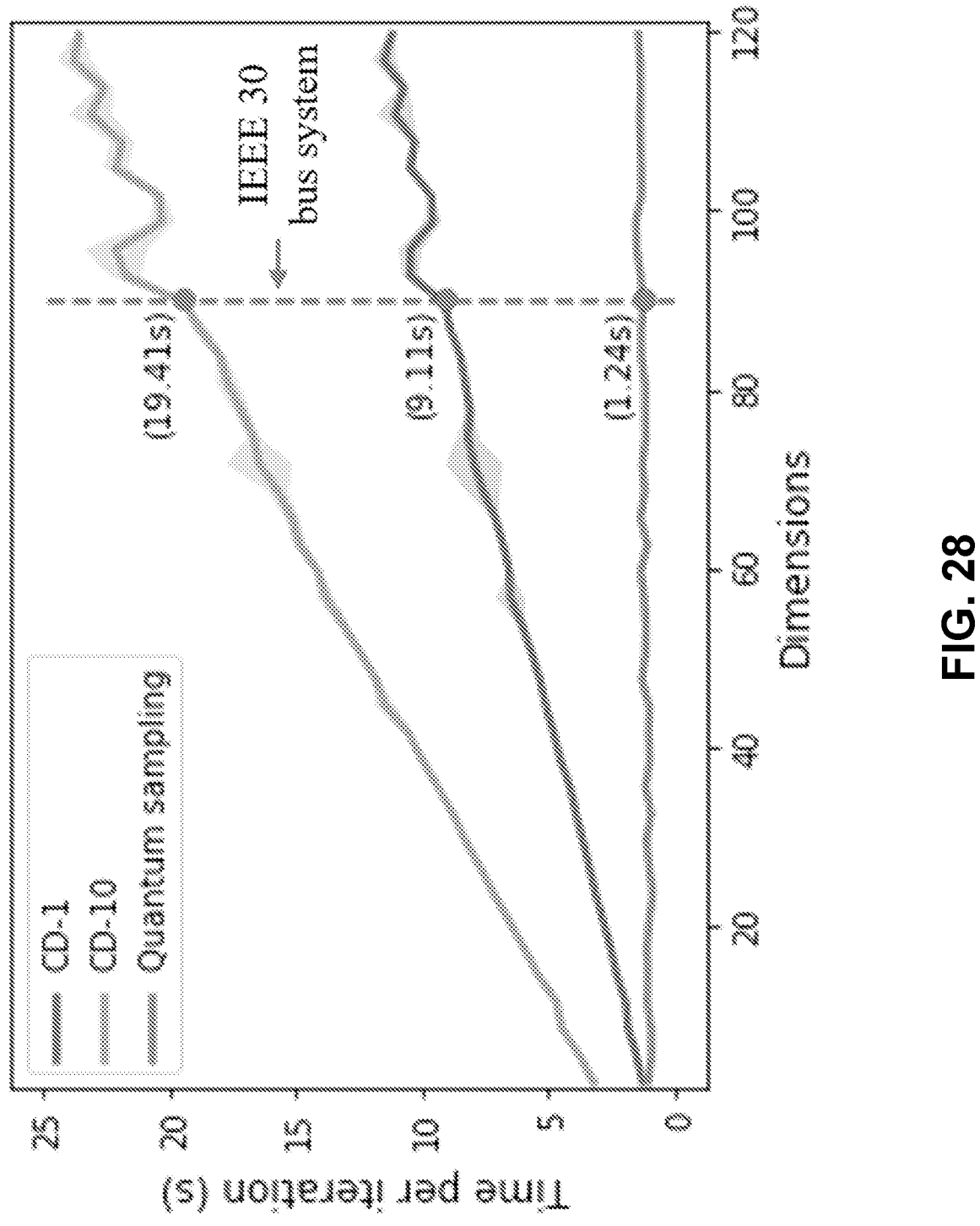
FIG. 28 illustrates a timing performance comparison between quantum sampling in quantum generative training and Gibbs sampling in classical CD learning.

FIG. 28 shows the results of an analysis of timing performance between the use of sampling techniques used in quantum generative training and CD learning against the size of the CRBM network. Variations of CD, namely CD-1 and CD-10 with one and ten Gibbs sampling iterations performed, respectively are used for comparison with quantum sampling. As is apparent from FIG. 28, the computational time required for quantum sampling remains fairly constant irrespective of network size as compared to CD learning where the computational time scales up with the network size. Even with a relatively medium-sized CRBM network used in the IEEE 30-bus, a quantum advantage can be clearly perceived in terms of both quality of obtained CRBM model parameters that yield lower free energies and computational training time required in the hybrid QC-CRBM fault diagnosis model.

The performance of the trained hybrid QC-CRBM fault diagnosis framework for the IEEE 30-bus system is evaluated by identifying the unknown states of the measured data samples in the testing dataset. The missed detection rate (MDR) is defined as the ratio of the measured data samples belonging to a particular fault class that are inaccurately classified as normally operated state or other faulty states by the hybrid QC-CRBM fault diagnosis framework. False alarm rates (FARs), which denote the fraction of normal samples incorrectly classified into the corresponding fault class, are also computed for individual faults. Lower MDRs and FARs mark the superior performance of any fault diagnosis method. MDRs are calculated for every simulated The hybrid model trained with CD learning performs extremely poorly with 100% MDRs for all fault types. Symmetrical faults ABC and ABCG are easily detected by both classical ANN and DT based methods as well as the disclosed hybrid QC-CRBM framework generatively trained with quantum sampling. However, FARs observed for the classical techniques are significantly higher for these faults. For the most commonly occurring line-to-ground faults AG, BG, and CG, the MDRs obtained with the hybrid QC-CRBM fault diagnosis framework are zero as compared to higher MDRs in ANN and DT based fault diagnosis methods. FARs for these system faults are similar for all three methods. Diagnosis of line-to-line faults AB, AC, and BC suffers from higher MDRs and FARs with DT method. This shortcoming is overcome by the hybrid QC-CRBM fault diagnosis framework with zero FARs and a significant improvement to the corresponding MDRs. Similarly, for the more severe double line-to-ground system faults ABG, ACG, and BCG, the detection rates reported for the hybrid QC-CRBM fault diagnosis framework show significant improvement over ANN and DT methods without the expense of poor FARs.

The highest MDR recorded for the hybrid QC-CRBM fault diagnosis framework in the computational experiments is less than 2% for all simulated system faults. This is also accompanied by the lowest FARs observed and are zero for all fault types. Both MDRs and FARs recorded by the hybrid fault diagnosis framework show significant improvement as compared to the rates obtained with the ANN and DT based fault diagnosis methods.

Figure 29:
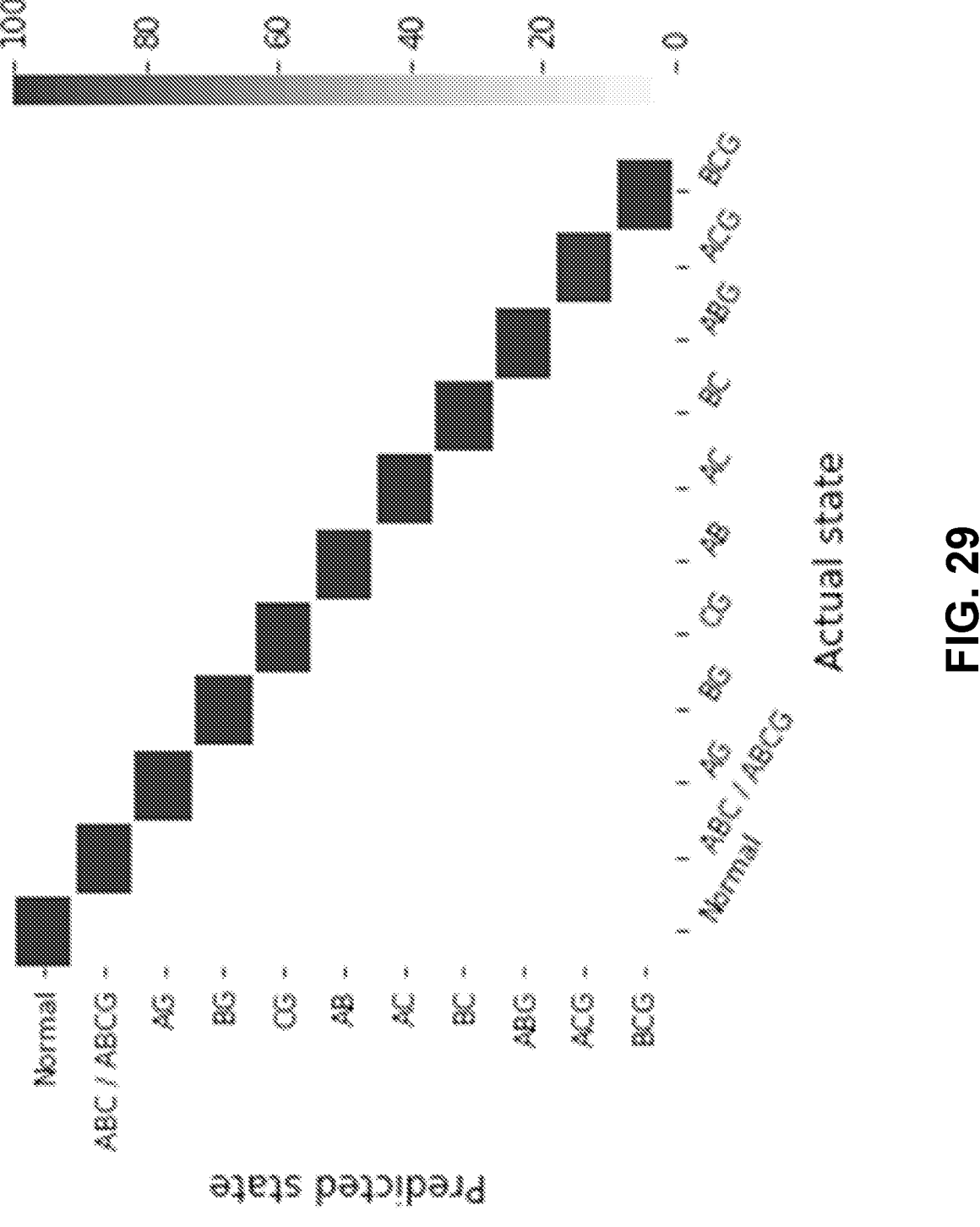
FIG. 29 shows a confusion matrix for the obtained classification results of the IEEE 30-bus system case study.

FIG. 29 shows a confusion matrix that represents the classification results obtained by an illustrative embodiment of the hybrid QC-CRBM fault diagnosis framework. The high fault identification accuracies indicating low MDRs can be located at the diagonal elements of the confusion matrix, while the first column represents the lower FARs. The first row of the confusion matrix also indicates the proportion of faulty samples misclassified as normal. The other elements of the confusion matrix indicate the ratio of data samples belonging to a particular faulty state misclassified as other fault classes.

The response time of the example hybrid QC-CRBM fault diagnosis framework is 5 ms, whereas times needed for classification of faults for ANN and DT methods are 10 ms and 5 ms, respectively. Hybrid QC-CRBM framework trained generatively with CD learning suffers from sub-optimal CRBM model parameters further resulting in poor fault identification rates. For a larger IEEE 30-bus test case, lower MDRs and FARs are obtained with the disclosed hybrid QC-CRBM fault diagnosis framework generatively trained with quantum sampling, thus demonstrating its superior performance over classical ANN and DT based methods, as well as its ability to scale up without loss of performance.

Illustrative embodiments described above with reference to FIGS. 21-29 provide a hybrid QC-CRBM fault diagnosis framework for analysis and diagnosis of faults in electrical power systems. We performed unsupervised learning of the CRBM network using quantum generative training with quantum sampling facilitated by an AQC device. Discriminative training of the classifier network in the hybrid QC-CRBM fault diagnosis framework further allowed us to identify several types of faults from normal operating states. The applicability of this hybrid model was demonstrated through a case study on IEEE 30-bus test system. Comparison between free-energy loss curves obtained during the generative training process indicated that the quantum generative training performed better in terms of both computational effort required and quality of CRBM network training. Comparison with the diagnosis performance of hybrid framework trained with classical CD learning also revealed the quantum advantage offered by quantum generative training. The obtained fault diagnosis results showed that the disclosed hybrid QC-CRBM fault diagnosis framework clearly outperformed state-of-the-art classical fault diagnosis methods like ANN and DT with low MDRs, significantly lower FARs as well as faster response time. Computational experiments performed on the large case study also demonstrated that the disclosed framework can be scaled efficiently for fault diagnosis in larger power systems without loss of performance.

A system implementing QC-based deep learning as disclosed herein can comprise an information processing system implemented using a processing platform comprising one or more processing devices. An example of such a system will now be described in conjunction with FIG. 30, although it is to be appreciated that this particular embodiment, like the other embodiments disclosed herein, is non-limiting.

Figure 30:
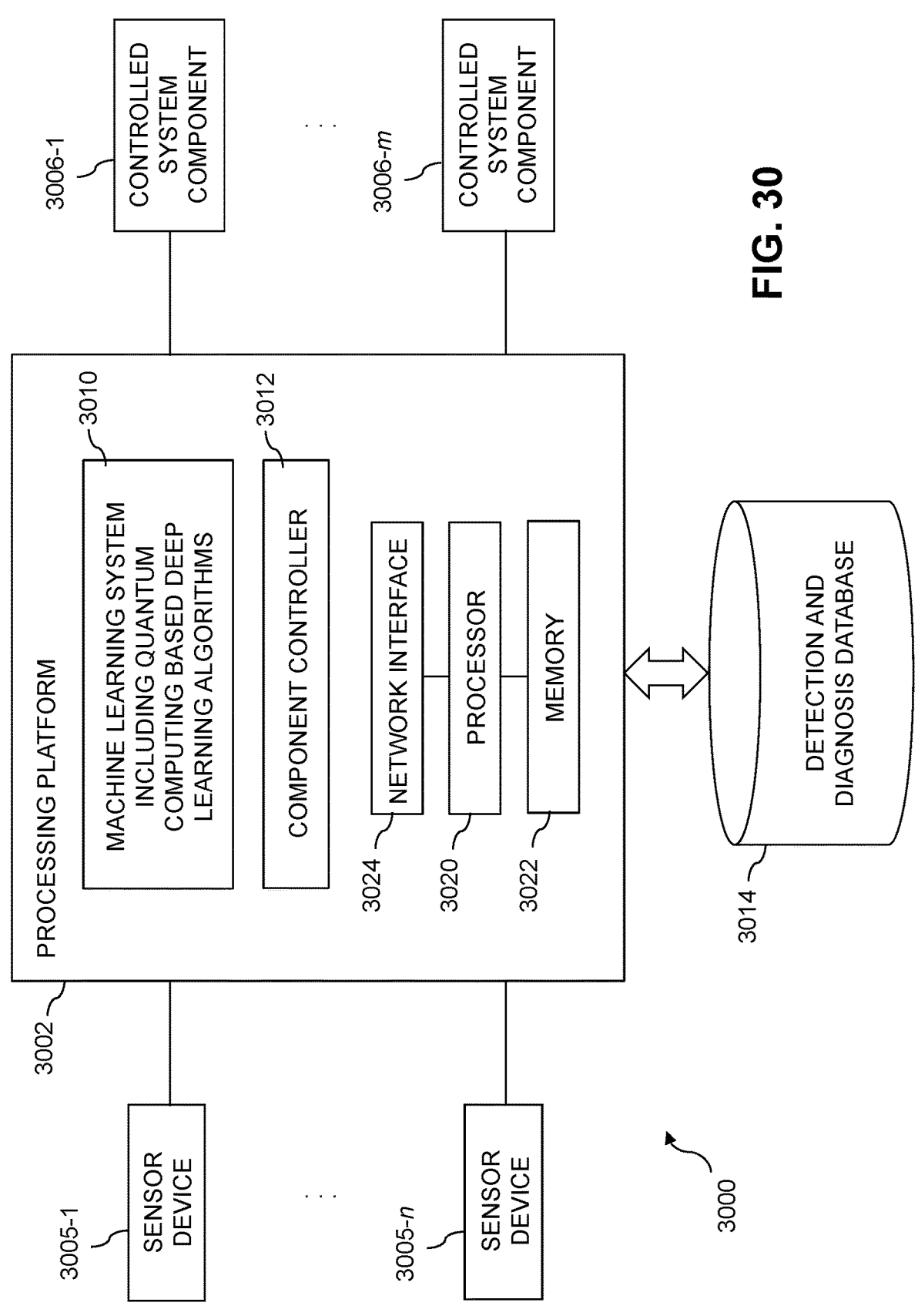
FIG. 30 shows an information processing system comprising a processing platform implementing quantum computing assisted deep learning in conjunction with controlled components of an industrial process system or an electrical power system in an illustrative embodiment.

FIG. 30 shows an information processing system 3000 implementing a machine learning system 3010 comprising at least one DBN or other neural network adapted to prediction in contexts such as fault detection and diagnosis in an industrial process system or an electrical power system. The information processing system 3000 comprises a processing platform 3002 that interacts with sensor devices 3005-1, . . . 3005-$n$ and controlled system components 3006-1, . . . 3006-$m$, where n and m are arbitrary integers greater than or equal to two and may but need not be equal. Other embodiments can include only a single sensor device and/or only a single controlled system component. The processing platform 3002 implements a machine learning system 3010 that includes one or more QC-based deep learning algorithms, and further implements at least one component controller 3012. The machine learning system 3010 including QC-based deep learning algorithms in the present embodiment more particularly has multi-layer network architecture comprising at least one DBN or other neural network and at least one additional layer, although other arrangements are possible.

In one possible mode of operation, the processing platform 3002 is illustratively configured to obtain, from one or more of the sensor devices 3005, data characterizing a given monitored system, to apply at least a portion of the obtained data to the machine learning system 3010 to detect at least one fault in the monitored system from the obtained data, and to execute at least one automated remedial action or other type of automated action relating to the monitored system based at least in part on the detected fault, illustratively via the component controller 3012.

In some embodiments, the machine learning system 3010 is configured with a multi-layer network architecture comprising at least one neural network and one or more additional network layers. The neural network is trained at least in part utilizing quantum sampling performed by a quantum computing device, as disclosed in more detail elsewhere herein.

The processing platform 3002 in illustrative embodiments obtains, from one or more of the sensor devices 3005, and possibly one or more additional or alternative data sources, data characterizing the monitored system, and processes at least a portion of the obtained data through at least a portion of the multi-layer network architecture of the machine learning system 3010 to generate a prediction of at least one characteristic of the monitored system from the obtained data. At least one automated action relating to the monitored system is illustratively executed under the control of the processing platform 3002 based at least in part on the generated prediction.

The neural network of the multi-layer network architecture of the machine learning system 3010 in some embodiments more particularly comprises at least one DBN, with the DBN including, for example, at least first and second RBMs of respective first and second different types, or at least one CRBM, as previously described.

At least one of the one or more additional network layers of the multi-layer network architecture of the machine learning system 3010 in some embodiments comprises an additional network. The term "layer" as used herein is therefore intended to be broadly construed, and can encompass one or more networks and/or other types of layers. Illustrative examples of layers of a multi-layer network architecture as disclosed herein include a fully connected layer, a softmax layer, a rectified linear unit (ReLU) layer, a hyperbolic tangent (tanh) layer, a convolutional layer, a deconvolutional layer, a recurrent layer, and a sigmoid layer, or various combinations thereof. A wide variety of additional or alternative layers can be used in other embodiments.

It is to be appreciated that these multi-layer network architecture arrangements are only examples, and numerous alternative arrangements are possible. For example, illustrative embodiments are not limited to use with RBMs or CRBMs, and can instead be implemented using other types of machine learning models, including models based at least in part on other types of networks, such as CNNs, AEs/VAEs, GANs, and/or many others, as well as combinations of such networks. Additionally or alternatively, a neural network in some embodiments can be implemented at least in part as a QNN having an underlying probability distribution of quantum states. The term "neural network" as used herein is therefore also intended to be broadly construed.

The term "multi-layer network architecture" as used herein is similarly intended to be broadly construed, so as to encompass a wide range of machine learning arrangements that include at least one neural network and at least one additional layer, where the additional layer may itself illustratively comprise an additional neural network, or another type of layer. For example, such a multi-layer network architecture of a machine learning system in illustrative embodiments herein can comprise two or more parallel DBNs followed by one or more additional layers; multiple serial DBNs followed by one or more additional layers; a combination of two or more parallel DBNs and at least one serial DBN followed by one or more additional layers; and numerous other machine learning architectures.

In some embodiments, the processing platform 3002 comprises or is otherwise associated with the above-noted quantum computing device that performs quantum sampling for use in training the neural network. Such a quantum computing device can be part of the same processing platform that implements the machine learning system 3010, or can be part of a separate processing platform.

The term "quantum computing device" as used herein is intended to be broadly construed, so as to encompass, for example, one or more AQCs, QPUs or other types of quantum computing devices, as well as combinations of multiple such devices, suitable for performing quantum optimization or other similar quantum operations.

As described in more detail elsewhere herein, illustrative embodiments n advantageously combine quantum sampling and quantum optimization for training DBNs or other types of neural networks, in machine learning systems such as machine learning system 3010 of processing platform 3002, and can be implemented, for example, in any of a wide variety of deep learning applications.

A given QC-based deep learning algorithm implemented in processing platform 3002 is illustratively configured to learn one or more fault detection thresholds.

The learning of the QC-based deep learning algorithm is illustratively performed across multiple distinct features characterizing a monitored system, as described in more detail elsewhere herein. Predictions generated by such an algorithm illustratively comprise indicators of the likely presence of one or more anomalies, or other specified conditions, relating to a given monitored system.

The term "prediction" as used herein is therefore intended to be broadly construed, and may indicate, for example, a possible or likely presence or absence of a fault or other anomaly, or a set of anomalies, where "possible or likely" is also intended to be broadly construed, to encompass, for example, statistically possible, statistically probable, more probable than not, and other arrangements.

In some embodiments, the generated prediction is illustratively associated with one or more predicted changes in operation of the monitored system.

Numerous other arrangements of multiple distinct features and associated generated predictions are possible.

It is to be appreciated that the term "QC-based deep learning algorithm" as used herein is intended to be broadly construed to encompass a prediction algorithm and/or a remediation algorithm operating at least in part utilizing a multi-layer network architecture comprising at least one DBN or other neural network and at least one additional layer which can be an additional network. Detailed examples of particular implementations of QC-based deep learning algorithms and their associated multi-layer network architectures in illustrative embodiments are described elsewhere herein.

The component controller 3012 generates one or more control signals for adjusting, triggering or otherwise controlling various operating parameters associated with the controlled system components 3006 based at least in part on predictions generated by the QC-based deep learning algorithms of the machine learning system 3010. A wide variety of different type of devices or other components can be controlled by component controller 3012, possibly by applying control signals or other signals or information thereto, including additional or alternative components that are part of the same processing device or set of processing devices that implement the processing platform 3002. Such control signals, and additionally or alternatively other types of signals and/or information, can be communicated over one or more networks to other processing devices, such as user terminals associated with respective system users.

The processing platform 3002 is configured to utilize a detection and diagnosis database 3014. Such a database illustratively stores system operating parameters, operating history and a wide variety of other types of information, including measurements or other monitoring data from one or more of the sensor devices 3005. Such information is illustratively utilized by the QC-based deep learning algorithms of machine learning system 3010 in performing prediction and remediation operations. The detection and diagnosis database 3014 is also configured to store related information, including various processing results, such as predictions or other outputs generated by the QC-based deep learning algorithms of machine learning system 3010.

The component controller 3012 utilizes outputs generated by the QC-based deep learning algorithms of the machine learning system 3010 to control one or more of the controlled system components 3006. The controlled system components 3006 in some embodiments therefore comprise system components that are driven at least in part by outputs generated by the QC-based deep learning algorithms of the machine learning system 3010. For example, a controlled component can comprise a processing device such as a computer or mobile telephone that presents a display to a user and/or directs a user to adjust its behavior in a particular manner responsive to an output of a QC-based deep learning algorithm. These and numerous other different types of controlled system components 3006 can make use of outputs generated by the QC-based deep learning algorithms of the machine learning system 3010, including various types of equipment and other systems associated with one or more of the example use cases described elsewhere herein.

Although the machine learning system 3010 and the component controller 3012 are both shown as being implemented on processing platform 3002 in the present embodiment, this is by way of illustrative example only. In other embodiments, the machine learning system 3010 and the component controller 3012 can each be implemented on a separate processing platform. A given such processing platform is assumed to include at least one processing device comprising a processor coupled to a memory.

Examples of such processing devices include computers, servers or other processing devices arranged to communicate over a network. Storage devices such as storage arrays or cloud-based storage systems used for implementation of detection and diagnosis database 3014 are also considered "processing devices" as that term is broadly used herein.

The network can comprise, for example, a global computer network such as the Internet, a wide area network (WAN), a local area network (LAN), a satellite network, a telephone or cable network, a cellular network such as a 3G, 4G or 5G network, a wireless network implemented using a wireless protocol such as Bluetooth, WiFi or WiMAX, or various portions or combinations of these and other types of communication networks.

It is also possible that at least portions of other system elements such as one or more of the sensor devices 3005 and/or the controlled system components 3006 can be implemented as part of the processing platform 3002, although shown as being separate from the processing platform 3002 in the figure.

For example, in some embodiments, the information processing system 3000 can comprise a laptop computer, tablet computer or desktop personal computer, a mobile telephone, or another type of computer or communication device, as well as combinations of multiple such processing devices, configured to incorporate at least one sensor device and to execute a QC-based deep learning algorithm for controlling at least one system component.

Examples of automated remedial actions that may be taken in the processing platform 3002 responsive to outputs generated by the QC-based deep learning algorithms of the machine learning system 3010 include generating in the component controller 3012 at least one control signal for controlling at least one of the controlled system components 3006 over a network, generating at least a portion of at least one output display for presentation on at least one user terminal, generating an alert for delivery to at least user terminal over a network, and/or storing the outputs in the detection and diagnosis database 3014.

A wide variety of additional or alternative automated remedial actions may be taken in other embodiments. The particular automated remedial action or actions will tend to vary depending upon the particular use case in which the information processing system 3000 is deployed. Such automated remedial actions are examples of what are more generally referred to herein as "automated action" relating to a monitored system.

For example, some embodiments implement QC-based deep learning algorithms to at least partially automate various aspects of fault detection and diagnosis in industrial process systems, electrical power systems, and other types of systems. Such applications illustratively involve a wide variety of different types of monitoring and control.

An example of an automated remedial action in this particular context includes generating at least one output signal, such as a prediction visualization signal for presentation on a user terminal, or diagnosis information transmitted over a network to an engineer, manager or other system professional.

Additional examples of such use cases are provided elsewhere herein. It is to be appreciated that the term "automated remedial action" as used herein is intended to be broadly construed, so as to encompass the above-described automated remedial actions, as well as numerous other actions that are automatically driven based at least in part on one or more predictions generated using a QC-based deep learning algorithm as disclosed herein, with such actions being configured to address or otherwise remediate various conditions indicated by the corresponding predictions.

The processing platform 3002 in the present embodiment further comprises a processor 3020, a memory 3022 and a network interface 3024. The processor 3020 is assumed to be operatively coupled to the memory 3022 and to the network interface 3024 as illustrated by the interconnections shown in the figure.

The processor 3020 may comprise, for example, a microprocessor, an application-specific integrated circuit (ASIC), a field-programmable gate array (FPGA), a central processing unit (CPU), a tensor processing unit (TPU), a graphics processing unit (GPU), an arithmetic logic unit (ALU), a digital signal processor (DSP), or other similar processing device component, as well as other types and arrangements of processing circuitry, in any combination. At least a portion of the functionality of at least one neural network and an associated QC-based deep learning algorithm provided by one or more processing devices as disclosed herein can be implemented using such processing circuitry.

In some embodiments, the processor 3020 comprises one or more machine learning integrated circuits. Such machine learning integrated circuits are illustratively implemented in the form of one or more TPUs and/or one or more GPUs, or other types of processing devices. Accordingly, in some embodiments, information processing system 3000 is configured to include a TPU-based processing platform and/or a GPU-based processing platform. Such a TPU-based processing platform or GPU-based processing platform can comprise cloud infrastructure configured to implement one or more DBNs or other types of neural networks for processing data associated with one or more monitored systems, such as industrial process systems, electrical power systems and other types of systems. Other embodiments can be implemented using alternative arrangements of one or more TPUs, GPUs or other types of processing devices, in any combination.

Such processing platforms or other arrangements comprising TPUs, GPUs or other types of processing devices can further comprise or otherwise be coupled to or associated with one or more AQCs, QPUs or other types of quantum computing devices. Accordingly, a "processing platform" as that term is broadly used herein can comprise a combination of classical computing devices and quantum computing devices.

Numerous other arrangements are possible. For example, in some embodiments, at least one DBN or other neural network and its associated QC-based deep learning algorithm can be implemented on a single processor-based device, such as a smartphone, client computer or other user device, utilizing one or more processors of that device. Such embodiments are examples of "on-device" implementations of QC-based deep learning algorithms.

The memory 3022 stores software program code for execution by the processor 3020 in implementing portions of the functionality of the processing platform 3002. For example, at least portions of the functionality of the machine learning system 3010 and component controller 3012 can be implemented using program code stored in memory 3022.

A given such memory that stores such program code for execution by a corresponding processor is an example of what is more generally referred to herein as a processor-readable storage medium having program code embodied therein, and may comprise, for example, electronic memory such as SRAM, DRAM or other types of random access memory, flash memory, read-only memory (ROM), magnetic memory, optical memory, or other types of storage devices in any combination.

Articles of manufacture comprising such processor-readable storage media are considered embodiments of the invention. The term "article of manufacture" as used herein should be understood to exclude transitory, propagating signals.

Other types of computer program products comprising processor-readable storage media can be implemented in other embodiments.

In addition, illustrative embodiments may be implemented in the form of integrated circuits comprising processing circuitry configured to implement processing operations associated with one or both of the machine learning system 3010 and the component controller 3012 as well as other related functionality. For example, at least a portion of at least one DBN or other neural network of the machine learning system 3010 of information processing system 3000 is illustratively implemented in at least one neural network integrated circuit of a processing device of the processing platform 3002.

The network interface 3024 is configured to allow the processing platform 3002 to communicate over one or more networks with other system elements, and may comprise one or more conventional transceivers.

It is to be appreciated that the particular arrangement of components and other system elements shown in FIG. 30 is presented by way of illustrative example only, and numerous alternative embodiments are possible. For example, other embodiments of information processing systems can be configured to implement QC-based deep learning algorithm functionality of the type disclosed herein.

Also, terms such as "sensor device" and "controlled system component" as used herein are intended to be broadly construed. For example, a given set of sensor devices in some embodiments can comprise one or more IoT devices of a monitored system. Additionally or alternatively, sensor devices can comprise video cameras, sensor arrays or other types of imaging or data capture devices. Sensor data obtained from one or more sensor devices can be stored in various types of databases or other storage systems accessible over a network. A wide variety of different types of sensor devices or other types of data sources can be used to provide input data to a QC-based deep learning algorithm in illustrative embodiments. A given controlled component can illustratively comprise a computer, an actuator or other type of processing device that receives an output from a QC-based deep learning algorithm and performs at least one automated action in response thereto.

Additional details regarding the operation of example QC-based deep learning algorithms suitable for use in the machine learning system 3010 can be found elsewhere herein. Their particular configuration as shown in the figures is non-limiting and should be considered illustrative examples only. Numerous other types and arrangements of DBNs or other types of neural networks and associated algorithms can be used in other embodiments. Also, other types of machine learning architectures, illustratively implementing additional or alternative neural networks configured with different layered arrangements, can be used in other embodiments. Accordingly, illustrative embodiments herein are not limited to use with specific neural networks or associated network architectures.

The information processing system 3000 can be configured to support a wide variety of distinct applications, in numerous diverse contexts. For example, as indicated previously, the information processing system 3000 in illustrative embodiments is configured to perform fault detection and diagnosis for at least one monitored system, such as an industrial process system and/or an electrical power system, but can be deployed in a wide variety of other applications.

It is to be appreciated that the particular use cases described herein are examples only, intended to demonstrate utility of illustrative embodiments, and should not be viewed as limiting in any way. Automated remedial actions taken based on outputs generated by a QC-based deep learning algorithm of the type disclosed herein can include particular actions involving interaction between a processing platform implementing the QC-based deep learning algorithm and other related equipment utilized in one or more of the use cases described above. For example, outputs generated by a QC-based deep learning algorithm can control one or more components of a related system. In some embodiments, the QC-based deep learning algorithm and the related equipment are implemented on the same processing platform, which may comprise a computer, mobile telephone, handheld sensor device or other type of processing device.

It should also be understood that the particular arrangements shown and described in conjunction with FIGS. 1-30 are presented by way of illustrative example only, and numerous alternative embodiments are possible. The various embodiments disclosed herein should therefore not be construed as limiting in any way. Numerous alternative arrangements of QC-based deep learning algorithms can be utilized in other embodiments. Those skilled in the art will also recognize that alternative processing operations and associated system entity configurations can be used in other embodiments.

It is therefore possible that other embodiments may include additional or alternative system elements, relative to the entities of the illustrative embodiments. Accordingly, the particular system configurations and associated algorithm implementations can be varied in other embodiments.

Examples of additional illustrative embodiments include the following. It is to be appreciated that these arrangements, like others disclosed herein, are non-limiting and presented by way of illustrative example only.

EXAMPLE 1

A fault detection system includes a QC-based deep learning module comprising a first RBM layer to extract first-level features from input system data, a second RBM layer to extract second-level features from the system data, and a classifier to predict a state of data samples output by the second RBM layer. The fault detection system further includes a computer comprising a processor, a memory, and one or more I/O devices, with the computer being operatively connected to the first RBM layer, and an adiabatic quantum computer operatively connected to the second RBM layer.

The fault detection system in some embodiments further comprises a data store for system data, the system data comprising sensor data. Other examples of system data include reference input data, fault or disturbance data, actuator data, process data, and/or system data for a physical system of interest.

The fault detection system illustratively comprises a first communication device to receive the system data from the data store, with the data store being disposed remotely from the QC-based deep learning module.

In some embodiments, at least one of the QC-based deep learning module, the computer, and the adiabatic quantum computer is disposed remotely from at least one of another of the QC-based deep learning module, the computer, and the adiabatic quantum computer.

For example, at least two of the QC-based deep learning module, the computer, and the adiabatic quantum computer are disposed locally relatively to one another.

In some embodiments, the first RBM layer comprises a Gaussian RBM and the second RBM layer comprises a Bernoulli RBM. The first RBM layer may be operatively connected to output at least to the second RBM layer and wherein the second RBM layer may be operatively connected to output at least to the classifier.

The fault detection system in some embodiments comprises a second communication device to receive state data from the classifier.

The classifier in some embodiments is illustratively configured to output state data to the first communication device.

Additionally or alternatively, the classifier is illustratively configured to output state data to the computer or to another processing device configure to perform fault diagnostics on the state data.

EXAMPLE 2

A method of fault detection includes steps of using a computer comprising a processor, a memory, and one or more I/O devices, to perform a first-level feature extraction on input system data via a first RBM layer of a QC-based deep learning module, using an adiabatic quantum computer to extract second-level features from the system data via a second RBM layer of the QC-based deep learning module, and using a classifier to predict a state of data samples output by the second RBM layer.

In some embodiments, the first RBM layer comprises Gaussian RBM and the second RBM layer comprises a Bernoulli RBM.

The method of fault detection in some embodiments further comprises outputting the state data from the classifier to at least one of a communication device, a physical storage medium, a computer or a processing device.

EXAMPLE 3

A method for QC-based based deep learning detection and diagnosis of faults in complex process systems comprises extracting, by a classical computing apparatus of a QC-based deep learning system, first level features from obtained historical data for a process, wherein the first level features are extracted using a first RBM, and applying, by an adiabatic quantum computing apparatus of the QC-based deep learning system, a second RBM to the extracted first level features to extract second level features from the historical data. The method further comprises training, by the QC-based deep learning system, a classifier as to a state of the process based on the extracted second level features, and applying, by the QC-based deep learning system, the trained classifier to obtained real-time data for the process to generate and output a predicted probability that the obtained real-time process data corresponds to a normal state or a faulty state of the process.

In some embodiments, the first RBM comprises a Gaussian RBM and the second RBM comprises a Bernoulli RBM.

In some embodiments, the first level features are extracted from a normal training dataset of the historical data and the first and second level features are for the normal state of the process.

The method in some embodiments further comprises extracting, by the classical computing apparatus, additional first level features from a faulty training dataset of the obtained historical data, wherein the additional first level features are extracted using a third RBM, applying, by the adiabatic quantum computing apparatus, a fourth RBM to the extracted additional first level features to extract additional second level features from the faulty training dataset of the obtained historical data, and training, by the QC-based deep learning system, the classifier as to a state of the process further based on the extracted additional second level features.

In some embodiments, the first and second RBMs collectively comprise a first DBN trained using the normal training dataset and the third and fourth RBMs collectively comprise a second DBN trained using the faulty training dataset.

In some embodiments, the classifier is configured to predict the state of the process for a data vector having d dimensions corresponding to d variables for the process that is input to each of the first and second DBNs.

Additionally or alternatively, first and second dimensional vectors are combined together and output from the first and second DBNs, respectively, to the classifier for classification of the data vector as corresponding to one of the normal state or the faulty state.

Examples of the obtained historical data include one or more of reference input data, fault data, disturbance data, actuator data, sensor data, process data, or system data for a physical system of interest.

In some embodiments, the obtained historical data comprises a process data vector and, to generate the first level extracted using the first RBM, the method further comprises multiplying, by the QC-based deep learning system, the process data vector with a connection weights matrix comprising weights between visible and hidden nodes of the first RBM, adding, by the QC-based deep learning system, a hidden bias vector encapsulating a plurality of hidden biases associated with the first RBM, and applying, by the QC-based deep learning system, a sigmoid activation function operation to a result of the addition.

Additionally or alternatively, the method in some embodiments further comprises utilizing, by the adiabatic quantum computing apparatus, a quantum sampling process to extract the second level features from the historical data.

EXAMPLE 4

A QC-based deep learning system comprises a classical computing apparatus and an adiabatic quantum computing apparatus communicatively coupled to the classical computing apparatus. The classical computing apparatus includes memory comprising instructions stored thereon and one or more processors coupled to the memory and configured to execute the stored instructions to extract first level features from obtained historical data for a process, wherein the first level features are extracted using a first RBM. The adiabatic quantum computing apparatus communicatively coupled to the classical computing apparatus is configured to apply a second RBM to the extracted first level features to extract second level features from the historical data. The QC-based deep learning system is further configured to train a classifier as to a state of the process based on the extracted second level features, and to apply the trained classifier to obtained real-time data for the process to generate and output a predicted probability that the obtained real-time process data corresponds to a normal state or a faulty state of the process.

In some embodiments, the first RBM comprises a Gaussian RBM and the second RBM comprises a Bernoulli RBM.

In some embodiments, the first level features are extracted from a normal training dataset of the historical data and the first and second level features are for the normal state of the process.

The one or more processors of the system in some embodiments are further configured to executed the stored instructions to extract additional first level features from a faulty training dataset of the obtained historical data, wherein the additional first level features are extracted using a third RBM, and the adiabatic quantum computing apparatus is further configured to apply a fourth RBM to the extracted additional first level features to extract additional second level features from the faulty training dataset of the obtained historical data. The QC-based deep learning system is further configured to train the classifier as to a state of the process further based on the extracted additional second level features.

In some embodiments, the first and second RBMs collectively comprise a first DBN trained using the normal training dataset and the third and fourth RBMs collectively comprise a second DBN trained using the faulty training dataset.

In some embodiments, the classifier is configured to predict the state of the process for a data vector having d dimensions corresponding to d variables for the process that is input to each of the first and second DBNs.

Additionally or alternatively, first and second dimensional vectors are combined together and output from the first and second DBNs, respectively, to the classifier for classification of the data vector as corresponding to one of the normal state or the faulty state.

Examples of the obtained historical data include one or more of reference input data, fault data, disturbance data, actuator data, sensor data, process data, or system data for a physical system of interest.

In some embodiments, the obtained historical data comprises a process data vector and, to generate the first level extracted using the first RBM, the QC-based deep learning system is further configured to multiply the process data vector with a connection weights matrix comprising weights between visible and hidden nodes of the first RBM, add a hidden bias vector encapsulating a plurality of hidden biases associated with the first RBM, and apply a sigmoid activation function operation to a result of the addition.

Additionally or alternatively, the adiabatic quantum computing apparatus in some embodiments is further configured to utilize a quantum sampling process to extract the second level features from the historical data.

Again, the foregoing examples, and other illustrative embodiments herein, are to be considered non-limiting. Additional or alternative system components and/or method steps can be used in other embodiments. For example, the ordering of the method steps can be varied, and one or more of the steps can be performed at least in part in parallel with one or more other ones of the steps.

A given processing device or other component of an information processing system as described herein is illustratively configured utilizing a corresponding processing device comprising a processor coupled to a memory. The processor executes software program code stored in the memory in order to control the performance of processing operations and other functionality. The processing device also comprises a network interface that supports communication over one or more networks.

The processor may comprise, for example, a microprocessor, an ASIC, an FPGA, a CPU, a TPU, a GPU, an ALU, a DSP, or other similar processing device component, as well as other types and arrangements of processing circuitry, in any combination. For example, at least a portion of the functionality of at least one DBN or an associated QC-based deep learning algorithm provided by one or more processing devices as disclosed herein can be implemented using such circuitry.

The memory stores software program code for execution by the processor in implementing portions of the functionality of the processing device. A given such memory that stores such program code for execution by a corresponding processor is an example of what is more generally referred to herein as a processor-readable storage medium having program code embodied therein, and may comprise, for example, electronic memory such as SRAM, DRAM or other types of random access memory, ROM, flash memory, magnetic memory, optical memory, or other types of storage devices in any combination.

As mentioned previously, articles of manufacture comprising such processor-readable storage media are considered embodiments of the invention. The term "article of manufacture" as used herein should be understood to exclude transitory, propagating signals. Other types of computer program products comprising processor-readable storage media can be implemented in other embodiments.

In addition, embodiments of the invention may be implemented in the form of integrated circuits comprising processing circuitry configured to implement processing operations associated with implementation of a QC-based deep learning algorithm.

An information processing system as disclosed herein may be implemented using one or more processing platforms, or portions thereof.

For example, one illustrative embodiment of a processing platform that may be used to implement at least a portion of an information processing system comprises cloud infrastructure including virtual machines implemented using a hypervisor that runs on physical infrastructure. Such virtual machines may comprise respective processing devices that communicate with one another over one or more networks.

The cloud infrastructure in such an embodiment may further comprise one or more sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the information processing system.

Another illustrative embodiment of a processing platform that may be used to implement at least a portion of an information processing system as disclosed herein comprises a plurality of processing devices which communicate with one another over at least one network. Each processing device of the processing platform is assumed to comprise a processor coupled to a memory. A given such network can illustratively include, for example, a global computer network such as the Internet, a WAN, a LAN, a satellite network, a telephone or cable network, a cellular network such as a 3G, 4G or 5G network, a wireless network implemented using a wireless protocol such as Bluetooth, WiFi or WiMAX, or various portions or combinations of these and other types of communication networks.

Again, these particular processing platforms are presented by way of example only, and an information processing system may include additional or alternative processing platforms, as well as numerous distinct processing platforms in any combination, with each such platform comprising one or more computers, servers, storage devices or other processing devices.

A given processing platform implementing a QC-based deep learning algorithm as disclosed herein can alternatively comprise a single processing device, such as a computer, mobile telephone or handheld sensor device, that implements not only the QC-based deep learning algorithm but also at least one sensor device and one or more controlled components. It is also possible in some embodiments that one or more such system elements can run on or be otherwise supported by cloud infrastructure or other types of virtualization infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system. Such components can communicate with other elements of the information processing system over any type of network or other communication media.

As indicated previously, components of the system as disclosed herein can be implemented at least in part in the form of one or more software programs stored in memory and executed by a processor of a processing device. For example, certain functionality disclosed herein can be implemented at least in part in the form of software.

The particular configurations of information processing systems described herein are exemplary only, and a given such system in other embodiments may include other elements in addition to or in place of those specifically shown, including one or more elements of a type commonly found in a conventional implementation of such a system.

For example, in some embodiments, an information processing system may be configured to utilize the disclosed techniques to provide additional or alternative functionality in other contexts.

Having thus described illustrative embodiments of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Other embodiments of the invention can be implemented utilizing a wide variety of different types and arrangements of systems, neural networks and processing devices than those utilized in the particular illustrative embodiments described herein, and in numerous alternative processing contexts. In addition, the particular assumptions made herein in the context of describing certain embodiments need not apply in other embodiments. Additionally, the recited order of processing elements or sequences, or the use of numbers, letters, or other designations therefore, is not intended to limit the claimed processes to any order except as may be specified in the claims. These and numerous other alternative embodiments will be readily apparent to those skilled in the art. Accordingly, the invention is limited only by the following claims and equivalents thereto.

What is claimed is:

1. A method comprising:
configuring a machine learning system with a multi-layer network architecture comprising at least one neural network and one or more additional network layers;
training the neural network at least in part utilizing quantum sampling performed by a quantum computing device, wherein the neural network comprises at least one of (i) a first restricted Boltzmann machine (RBM) of a first type coupled to a second RBM of a second type different than the first type, each of the first and second RBMs being trained using a different dataset of a different type, and (ii) a conditional RBM (CRBM) comprising at least one conditioning layer coupled to respective hidden and visible layers of the CRBM;
obtaining data characterizing a monitored system from at least one sensor device of the monitored system;
processing at least a portion of the obtained data through at least a portion of the multi-layer network architecture of the machine learning system to generate a prediction of at least one characteristic of the monitored system from the obtained data; and
executing at least one automated action relating to the monitored system based at least in part on the generated prediction, wherein executing at least one automated action comprises generating at least one control signal for application to at least one controlled system component of the monitored system in a feedback control loop comprising the at least one sensor device and the at least one controlled system component;
wherein the method is performed by at least one processing device comprising a processor coupled to a memory.

2. The method of claim 1 wherein at least one of the one or more additional network layers comprises an additional network.

3. The method of claim 1 wherein the quantum computing device comprises a quantum processing unit configured to perform quantum optimization.

4. The method of claim 1 wherein the neural network comprises a deep belief network that includes at least the first and second RBMs of respective first and second different types.

5. The method of claim 4 wherein the first RBM comprises a Gaussian RBM and the second RBM comprises a Bernoulli RBM.

6. The method of claim 4 wherein training the neural network comprises:
training the first RBM using a first type of unsupervised training; and
training the second RBM using a second type of unsupervised training different than the first type of unsupervised training;
wherein one of the first and second types of unsupervised training comprises quantum generative training that is based at least in part on outputs of the quantum sampling performed by the quantum computing device.

7. The method of claim 1 wherein the neural network comprises at least first and second deep belief networks, with the first and second deep belief networks being arranged in one of a sequential configuration and a parallel configuration.

8. The method of claim 7 wherein training the neural network comprises training one of the first and second deep belief networks using data of a first type and training the other of the first and second deep belief networks using data of a second type different than the first type.

9. The method of claim 1 wherein the neural network comprises a deep belief network that includes at least the CRBM.

10. The method of claim 9 wherein training the neural network comprises training the CRBM using unsupervised quantum generative training that is based at least in part on outputs of the quantum sampling performed by the quantum computing device.

11. The method of claim 1 wherein the one or more additional network layers comprise at least one of a fully connected layer, a softmax layer, a rectified linear unit (ReLU) layer, a hyperbolic tangent (tanh) layer, a convolutional layer, a deconvolutional layer, a recurrent layer, and a sigmoid layer.

12. The method of claim 1 wherein the neural network comprises a deep belief network and wherein training the neural network comprises:

extracting first level features from obtained historical data of the monitored system using a first layer of the deep belief network; and extracting second level features from the extracted first level features using a second layer of the deep belief network; and training a classifier as to a state of the monitored system based at least in part on the extracted second level features;

wherein the generated prediction of at least one characteristic of the monitored system comprises a predicted probability that the obtained data is indicative of a first state or a second state of the monitored system, the second state being different than the first state.

13. The method of claim 12 wherein at least one of the first level features and the second level features are extracted at least in part utilizing a classical computing device.

14. The method of claim 12 wherein at least one of the first level features and the second level features are extracted at least in part utilizing the quantum computing device.

15. The method of claim 1 wherein executing at least one automated action relating to the monitored system based at least in part on the generated prediction further comprises at least one of generating at least a portion of at least one output display for presentation on at least one user terminal and generating an alert for delivery to at least user terminal.

16. The method of claim 1 wherein processing at least a portion of the obtained data through at least a portion of the multi-layer network architecture of the machine learning system to generate a prediction of at least one characteristic of the monitored system from the obtained data comprises generating predictions of at least one characteristic of each of a plurality of components of the monitored system to determine presence or absence of multiple distinct fault types associated with respective ones of the plurality of components.

17. A system comprising:

at least one processing device comprising a processor coupled to a memory;

the processing device being configured:

to configure a machine learning system with a multi-layer network architecture comprising at least one neural network and one or more additional network layers;

to train the neural network at least in part utilizing quantum sampling performed by a quantum computing device, wherein the neural network comprises at least one of (i) a first restricted Boltzmann machine (RBM) of a first type coupled to a second RBM of a second type different than the first type, each of the first and second RBMs being trained using a different dataset of a different type, and (ii) a conditional RBM (CRBM) comprising at least one conditioning layer coupled to respective hidden and visible layers of the CRBM;

to obtain data characterizing a monitored system from at least one sensor device of the monitored system;

to process at least a portion of the obtained data through at least a portion of the multi-layer network architecture of the machine learning system to generate a prediction of at least one characteristic of the monitored system from the obtained data; and to execute at least one automated action relating to the monitored system based at least in part on the generated prediction, wherein executing at least one automated action comprises generating at least one control signal for application to at least one controlled system component of the monitored system in a feedback control loop comprising the at least one sensor device and the at least one controlled system component.

18. The system of claim 17 wherein the neural network comprises a deep belief network that includes at least the first and second RBMs of respective first and second different types.

19. The system of claim 17 wherein the one or more additional network layers comprise at least one of a fully connected layer, a softmax layer, a rectified linear unit (ReLU) layer, a hyperbolic tangent (tanh) layer, a convolutional layer, a deconvolutional layer, a recurrent layer, and a sigmoid layer.

20. A computer program product comprising a non-transitory processor-readable storage medium having stored therein program code of one or more software programs, wherein the program code, when executed by at least one processing device comprising a processor coupled to a memory, causes the processing device:

to configure a machine learning system with a multi-layer network architecture comprising at least one neural network and one or more additional network layers;

to train the neural network at least in part utilizing quantum sampling performed by a quantum computing device, wherein the neural network comprises at least one of (i) a first restricted Boltzmann machine (RBM) of a first type coupled to a second RBM of a second type different than the first type, each of the first and second RBMs being trained using a different dataset of a different type, and (ii) a conditional RBM (CRBM) comprising at least one conditioning layer coupled to respective hidden and visible layers of the CRBM;

to obtain data characterizing a monitored system from at least one sensor device of the monitored system;

to process at least a portion of the obtained data through at least a portion of the multi-layer network architecture of the machine learning system to generate a prediction of at least one characteristic of the monitored system from the obtained data; and to execute at least one automated action relating to the monitored system based at least in part on the generated prediction, wherein executing at least one automated action comprises generating at least one control signal for application to at least one controlled system component of the monitored system in a feedback control loop comprising the at least one sensor device and the at least one controlled system component.

21. The computer program product of claim 20 wherein the neural network comprises a deep belief network that includes at least the first and second RBMs of respective first and second different types.

22. The computer program product of claim 20 wherein the one or more additional network layers comprise at least one of a fully connected layer, a softmax layer, a rectified linear unit (ReLU) layer, a hyperbolic tangent (tanh) layer, a convolutional layer, a deconvolutional layer, a recurrent layer, and a sigmoid layer.

* * * * *